US010327132B2

(12) United States Patent
Jitsukawa et al.

(10) Patent No.: US 10,327,132 B2
(45) Date of Patent: Jun. 18, 2019

(54) WIRELESS COMMUNICATIONS SYSTEM, BASE STATION, TERMINAL, AND PROCESS METHOD

(71) Applicant: FUJITSU CONNECTED TECHNOLOGIES LIMITED, Kawasaki-shi, Kanagawa (JP)

(72) Inventors: Daisuke Jitsukawa, Adachi (JP); Yoshihiro Kawasaki, Kawasaki (JP); Kenji Suda, Yokohama (JP)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 205 days.

(21) Appl. No.: 15/247,015

(22) Filed: Aug. 25, 2016

(65) Prior Publication Data

US 2016/0366584 A1  Dec. 15, 2016

Related U.S. Application Data

(63) Continuation of application No. PCT/JP2014/059372, filed on Mar. 28, 2014.

(51) Int. Cl.
*H04W 52/02* (2009.01)
*H04W 8/22* (2009.01)
(Continued)

(52) U.S. Cl.
CPC .............. *H04W 8/22* (2013.01); *H04L 1/1812* (2013.01); *H04L 1/1825* (2013.01);
(Continued)

(58) Field of Classification Search
CPC .. H04W 52/02; H04W 52/0203; H04W 84/12
See application file for complete search history.

(56) References Cited

U.S. PATENT DOCUMENTS

2010/0061247 A1* 3/2010 He ..................... H04L 12/189
370/241
2010/0220623 A1 9/2010 Cave et al.
(Continued)

FOREIGN PATENT DOCUMENTS

EP  2 265 077 A1  12/2010
EP  2 443 895     12/2010
(Continued)

OTHER PUBLICATIONS

Communication pursuant to Article 94(3) EPC issued by the European Patent Office for corresponding European Patent Application No. 14 887 523.0, dated Oct. 9, 2017.
(Continued)

*Primary Examiner* — Hassan A Phillips
*Assistant Examiner* — Prenell P Jones
(74) *Attorney, Agent, or Firm* — Myers Wolin, LLC

(57) ABSTRACT

A wireless communications system includes a base station configured to switch a first state of storing to control information transmitted to a terminal, a value instructing a transmission power of the terminal, and a second state of storing to the control information, a value instructing a transmission count of multiple transmissions of a same data by the terminal; and the terminal configured to switch a third state of adjusting the transmission power based on the value stored to the control information received from the base station in the first state, and a fourth state of adjusting the transmission count of multiple transmissions of the same data by the terminal, based on the value stored to the control information received from the base station in the second state.

20 Claims, 49 Drawing Sheets

(51) Int. Cl.
  *H04W 52/58* (2009.01)
  *H04L 1/18* (2006.01)
  *H04W 52/36* (2009.01)
  *H04W 52/14* (2009.01)

(52) U.S. Cl.
  CPC ... *H04W 52/0212* (2013.01); *H04W 52/0216* (2013.01); *H04W 52/367* (2013.01); *H04W 52/58* (2013.01); *H04W 52/146* (2013.01); *H04W 52/365* (2013.01); *Y02D 70/1262* (2018.01); *Y02D 70/23* (2018.01)

(56) References Cited

U.S. PATENT DOCUMENTS

| | | |
|---|---|---|
| 2011/0200020 A1 | 8/2011 | Xu et al. |
| 2012/0002616 A1 | 1/2012 | Ishii et al. |
| 2012/0147830 A1 | 6/2012 | Lohr et al. |
| 2013/0111288 A1 | 5/2013 | Sagfors et al. |
| 2014/0185534 A1* | 7/2014 | Vos ............... H04W 72/042 370/329 |
| 2015/0085726 A1* | 3/2015 | Terai ............... H04Q 9/00 370/311 |

FOREIGN PATENT DOCUMENTS

| | | |
|---|---|---|
| EP | 2 635 082 A1 | 9/2013 |
| JP | 2012-165471 A | 8/2012 |
| JP | 2012-530434 A | 11/2012 |
| JP | 2013-009401 A | 1/2013 |
| JP | 2013-520140 A | 5/2013 |
| WO | 2010/087449 A1 | 8/2010 |
| WO | 2010/145799 A1 | 12/2010 |
| WO | 2012/068141 A1 | 5/2012 |

OTHER PUBLICATIONS

International Search Report issued for corresponding International Patent Application No. PCT/JP2014/059372, dated Apr. 22, 2014, with an English translation.

3GPP TR 36.824 V11.0.0, "3rd Generation Partnership Project Technical Specification Group Radio Access Network Evolved Universal Terrestrial Radio Access (E-UTRA) LTE coverage enhancements (Release 11)", Jun. 26, 2012.

Extended European search report with supplementary European search report and the European search opinion issued by the European Patent Office for corresponding European Patent Application No. 14887523.0, dated Feb. 14, 2017.

Notice of Preliminary Rejection issued by the Korean Intellectual Property Office for corresponding Korean Patent Application No. 10-2016-7026329, dated Oct. 31, 2017, with English translation.

First Notification of Office Action and Search Report issued by the China National Intellectual Property Administration for corresponding Chinese Patent Application No. 201480077549.9, dated Jan. 29, 2019, with an English translation.

* cited by examiner

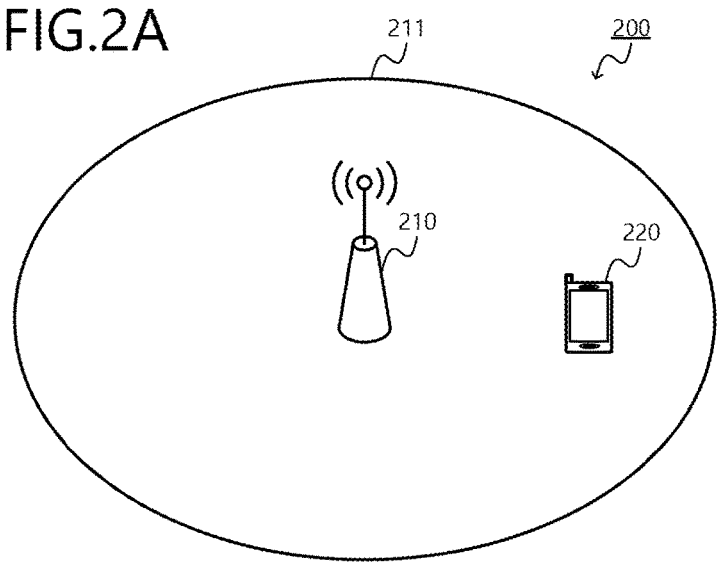

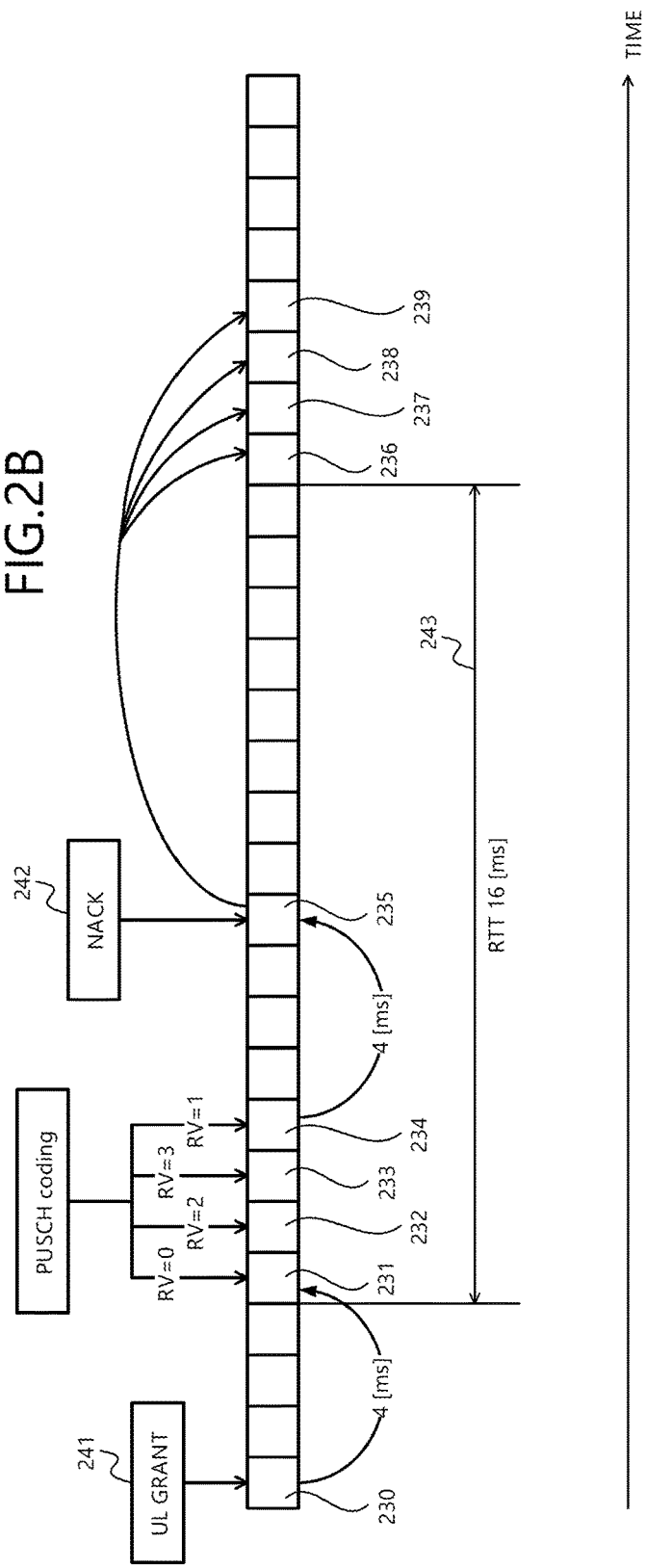

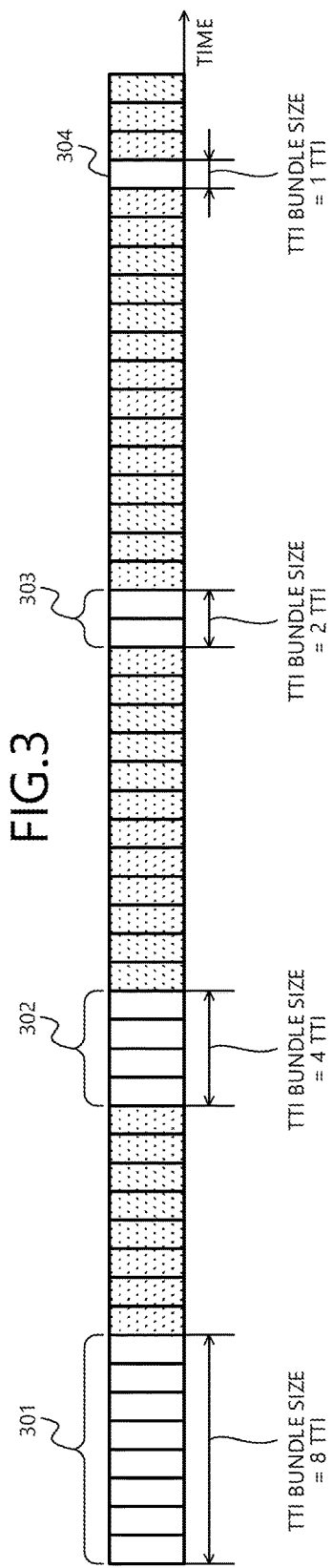

| | TRANSMISSION POWER CONTROL MODE |
|---|---|
| TPC COMMAND | NOTIFIED CONTENTS |
| "00" | TRANSITION TO TTI BUNDLE SIZE CONTROL MODE |
| "01" | TTI BUNDLE SIZE=1, TRANSMISSION POWER INCREMENT = -1 [dB] |
| "10" | TTI BUNDLE SIZE=1, TRANSMISSION POWER INCREMENT = 0 [dB] |
| "11" | TTI BUNDLE SIZE=1, TRANSMISSION POWER INCREMENT = 1 [dB] |

| | TTI BUNDLE SIZE CONTROL MODE |
|---|---|
| TPC COMMAND | NOTIFIED CONTENTS |
| "00" | TTI BUNDLE SIZE=1, TRANSITION TO TRANSMISSION POWER CONTROL MODE |
| "01" | TTI BUNDLE SIZE=2 |
| "10" | TTI BUNDLE SIZE=4 |
| "11" | TTI BUNDLE SIZE=8 |

| | TRANSMISSION POWER CONTROL MODE |
|---|---|
| TPC COMMAND | NOTIFIED CONTENTS |
| "00" | TTI BUNDLE SIZE=1, TRANSMISSION POWER INCREMENT =-1 [dB] |
| "01" | TTI BUNDLE SIZE=1, TRANSMISSION POWER INCREMENT = 0 [dB] |
| "10" | TTI BUNDLE SIZE=1, TRANSMISSION POWER INCREMENT = 1 [dB] |
| "11" | TTI BUNDLE SIZE=1, TRANSMISSION POWER INCREMENT = 3 [dB] |

| | TTI BUNDLE SIZE CONTROL MODE (AT TIME OF MAXIMUM TRANSMISSION POWER) |
|---|---|
| TPC COMMAND | NOTIFIED CONTENTS |
| "00" | TTI BUNDLE SIZE=1, TRANSITION TO TRANSMISSION POWER CONTROL MODE |
| "01" | TTI BUNDLE SIZE=2 |
| "10" | TTI BUNDLE SIZE=4 |
| "11" | TTI BUNDLE SIZE=8 |

| TRANSMISSION POWER CONTROL MODE | |
|---|---|
| Diff=RECEPTION SINR - TARGETED VALUE [dB] | TPC COMMAND |
| Diff>0.5 [dB] | "00" (TRANSMISSION POWER INCREMENT=-1 [dB]) |
| 0.5 [dB]≥Diff>-0.5 [dB] | "01" (TRANSMISSION POWER INCREMENT= 0 [dB]) |
| -0.5 [dB]≥Diff>-1.5 [dB] | "10" (TRANSMISSION POWER INCREMENT= 1 [dB]) |
| -1.5 [dB]≥Diff | "11" (TRANSMISSION POWER INCREMENT= 3 [dB]) |

| TTI BUNDLE SIZE CONTROL MODE | |
|---|---|
| Diff=RECEPTION SINR - TARGETED VALUE [dB] | TTI BUNDLE SIZE ADJUSTMENT AMOUNT |
| Diff>7.5 [dB] | 1/8 TIMES |
| 7.5 [dB]≥Diff>4.5 [dB] | 1/4 TIMES |
| 4.5 [dB]≥Diff>1.5 [dB] | 1/2 TIMES |
| 1.5 [dB]≥Diff>-1.5 [dB] | 1 TIME |
| -1.5 [dB]≥Diff>-4.5 [dB] | 2 TIMES |
| -4.5 [dB]≥Diff>-7.5 [dB] | 4 TIMES |
| -7.5 [dB]≥Diff | 8 TIMES |

| TTI BUNDLE SIZE CONTROL MODE | |
|---|---|
| ADJUSTMENT RESULT OF TTI BUNDLE SIZE | TPC COMMAND |
| ADJUSTMENT RESULT≤1 | "00" (TTI BUNDLE SIZE=1,TRANSITION TO TRANSMISSION POWER CONTROL MODE) |
| ADJUSTMENT RESULT=2 | "01" (TTI BUNDLE SIZE=2) |
| ADJUSTMENT RESULT=4 | "10" (TTI BUNDLE SIZE=4) |
| ADJUSTMENT RESULT≥8 | "11" (TTI BUNDLE SIZE=8) |

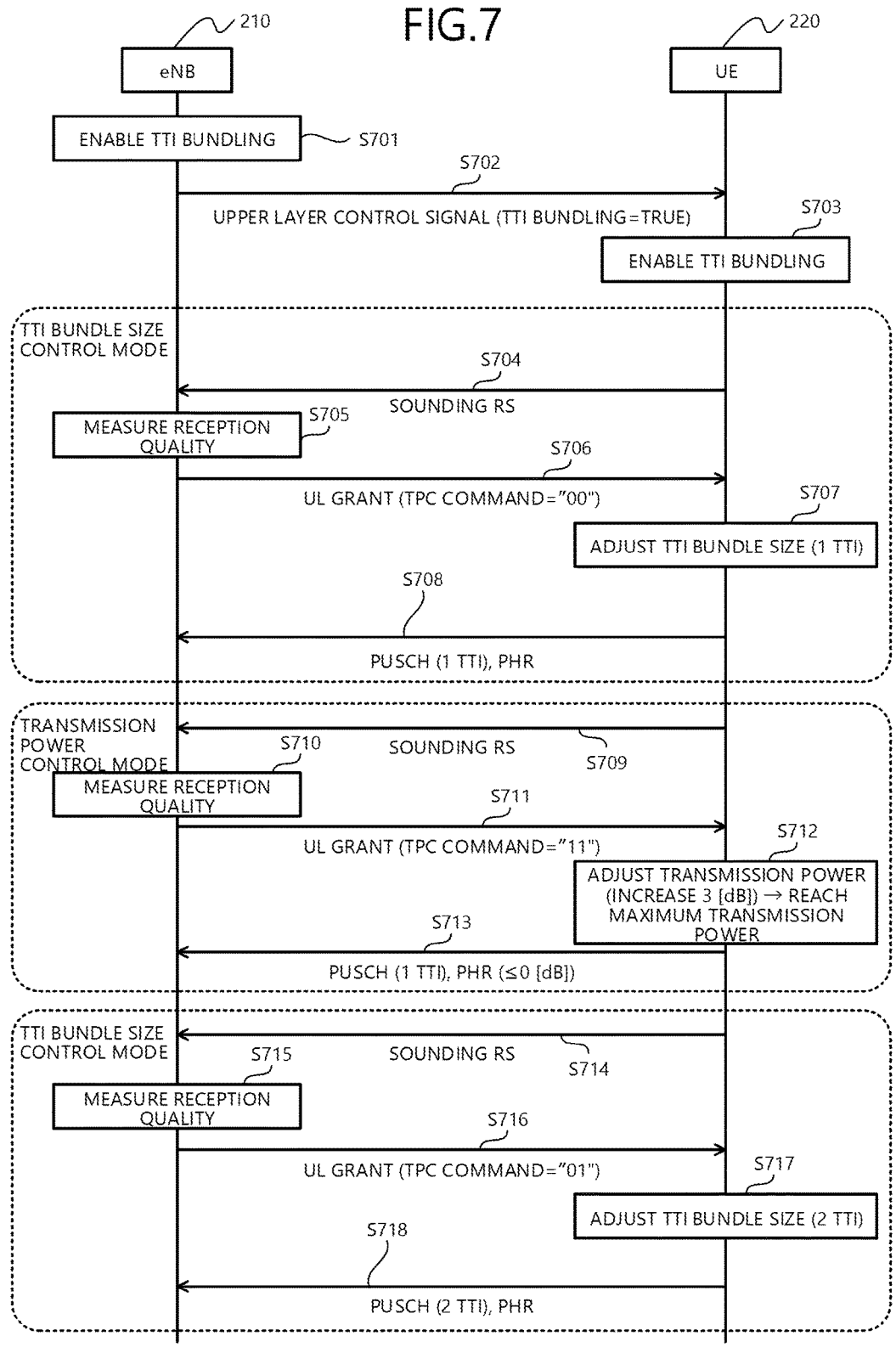

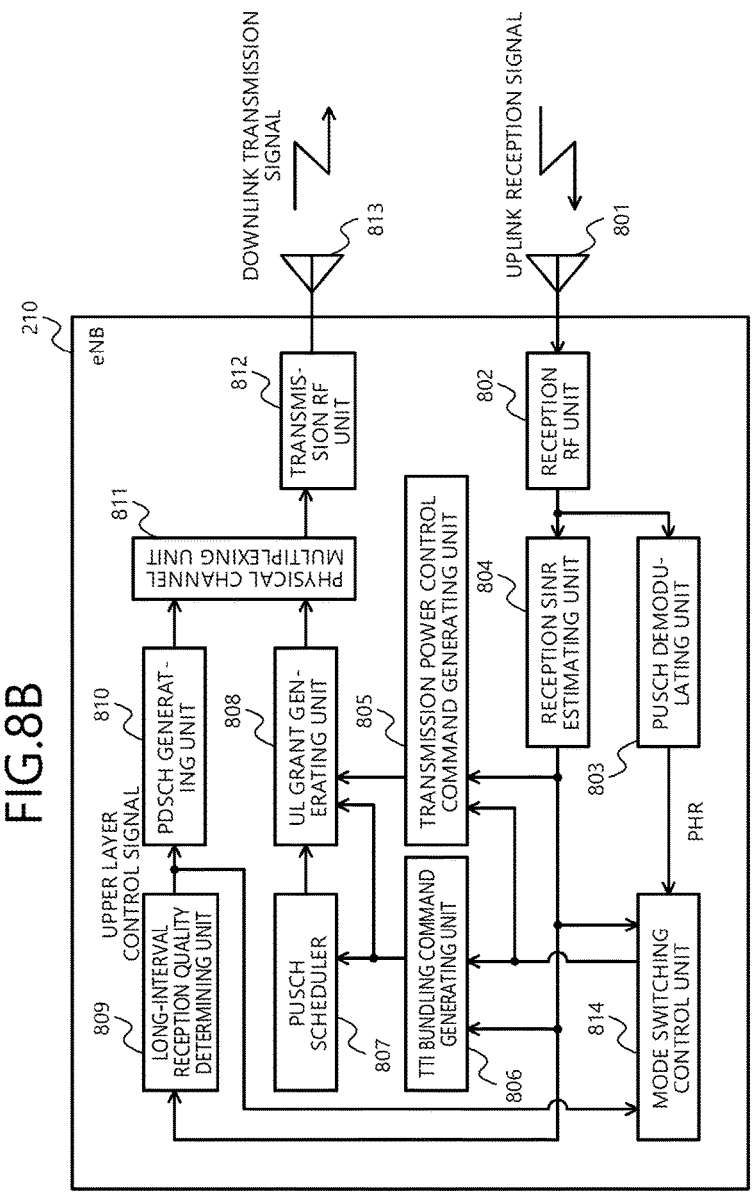

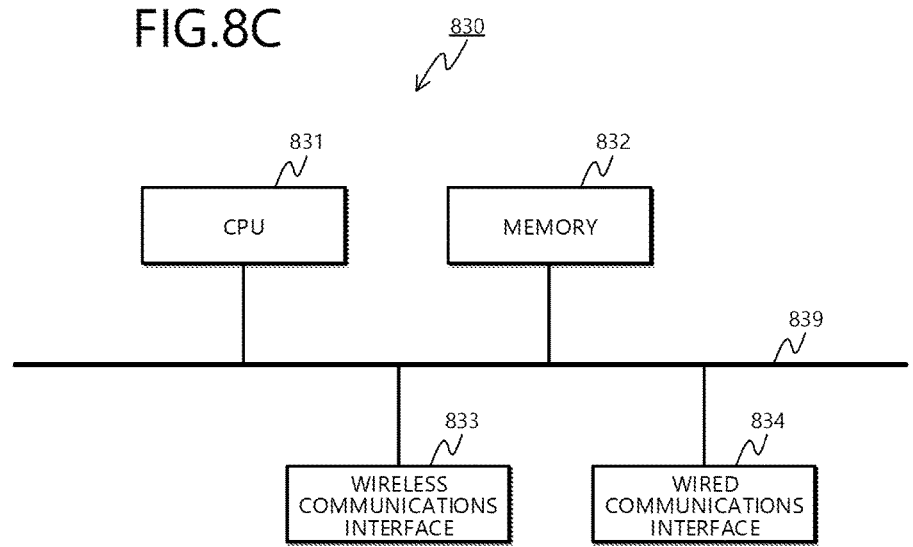

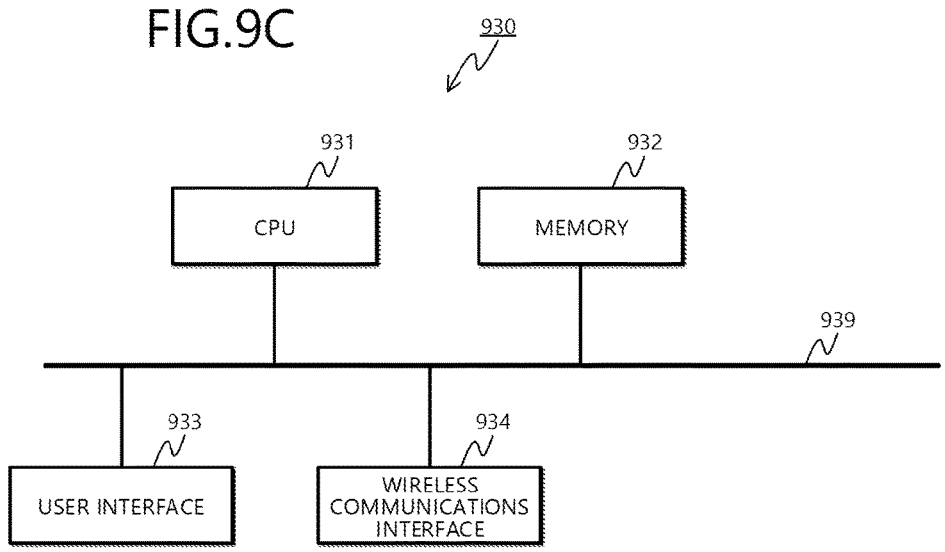

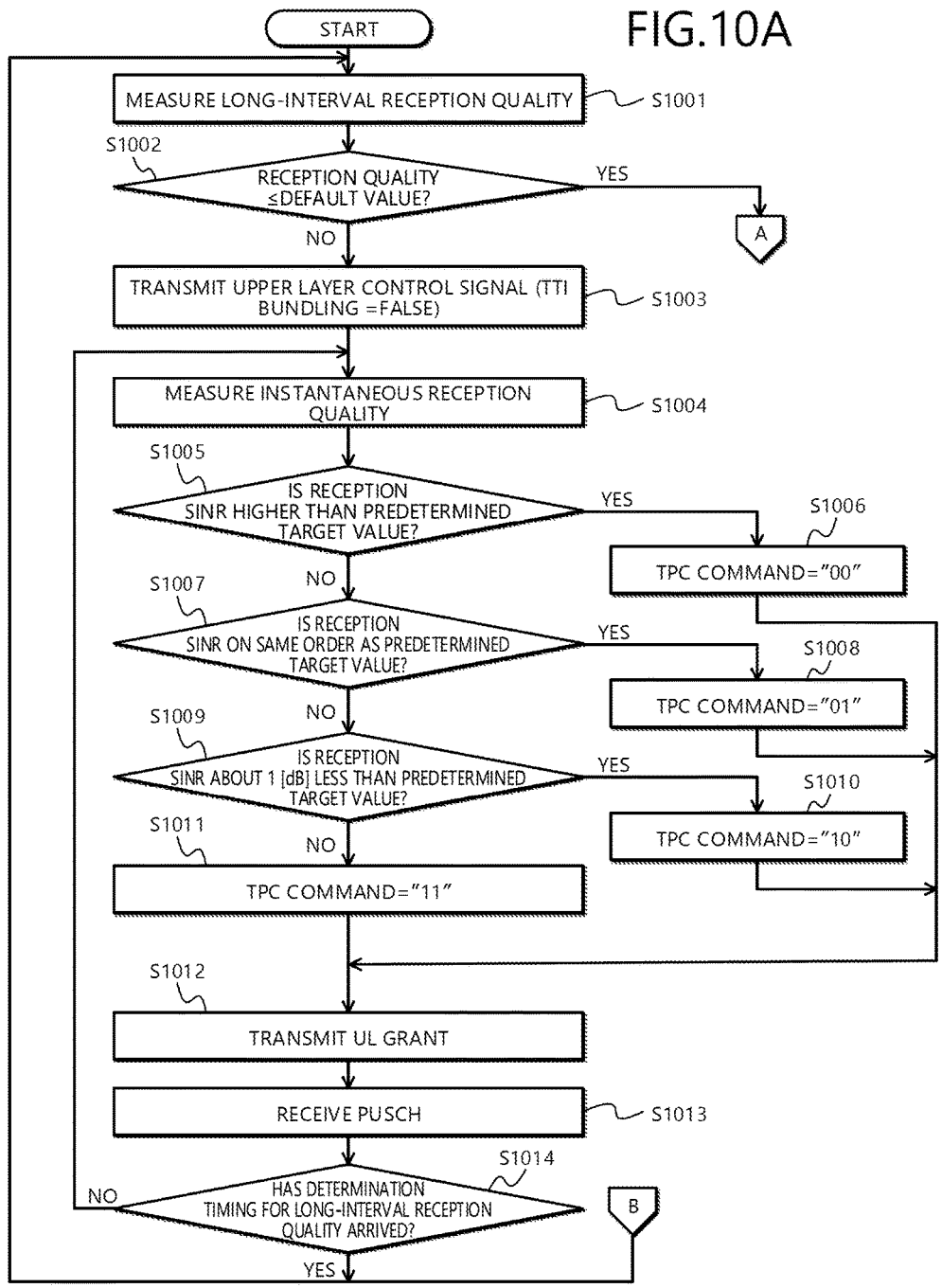

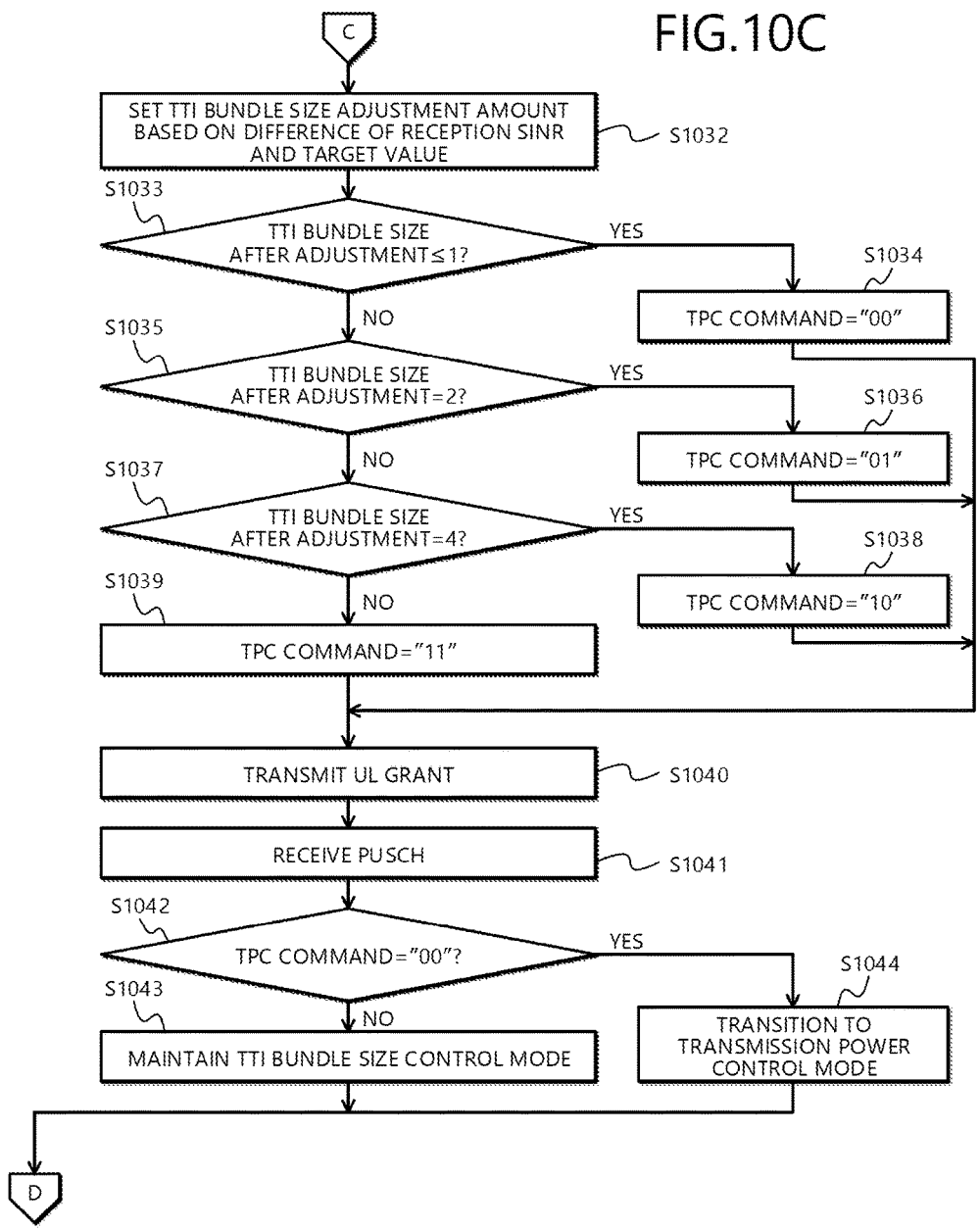

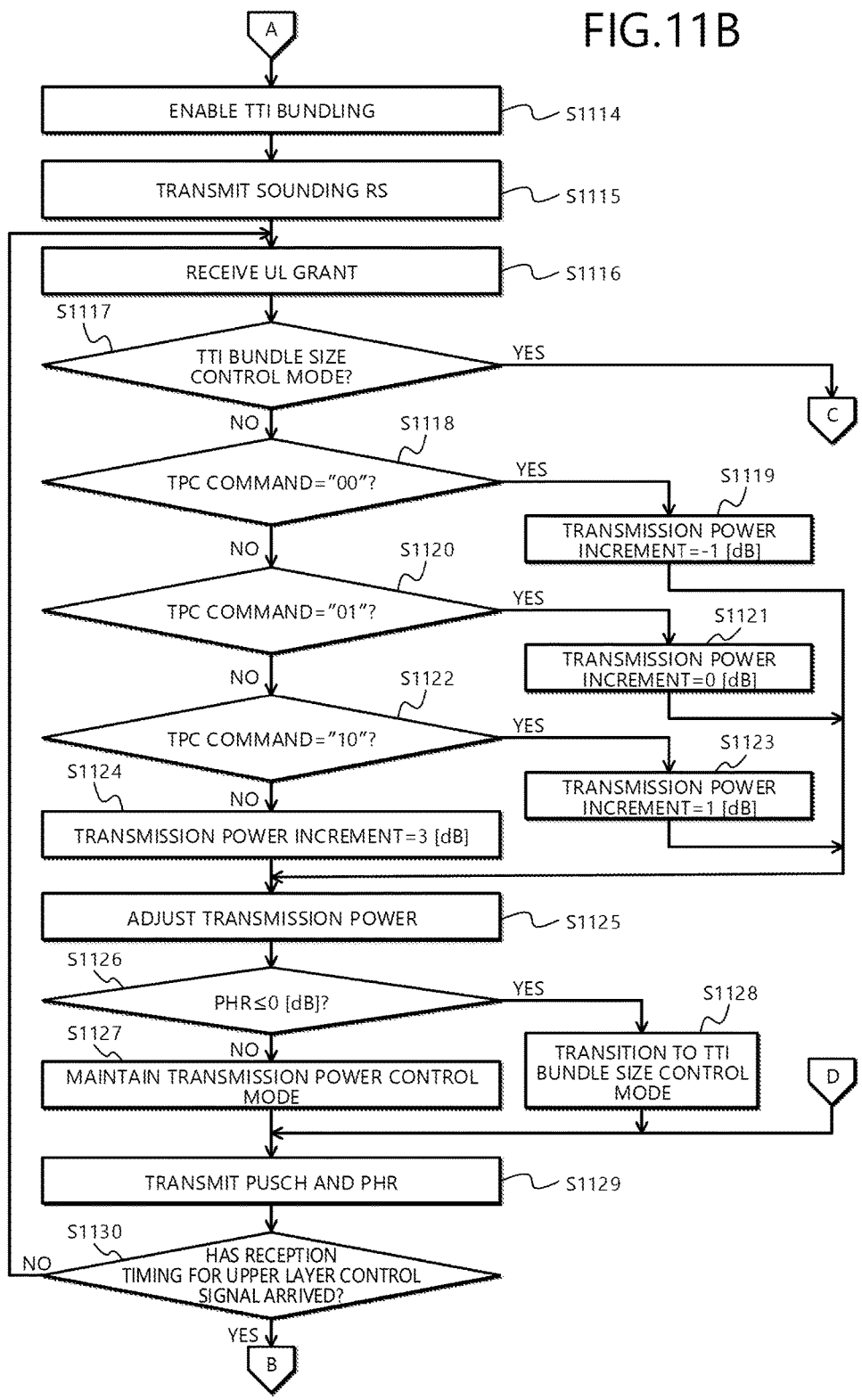

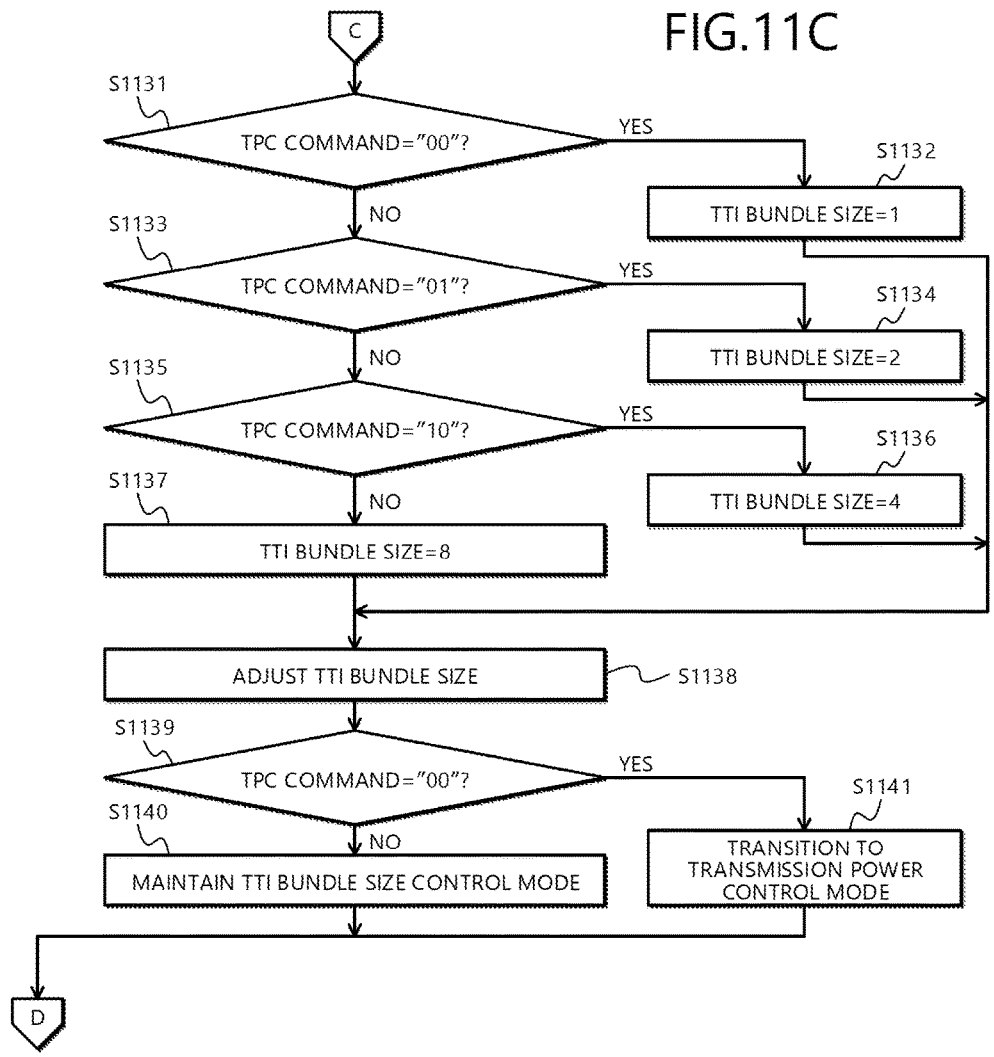

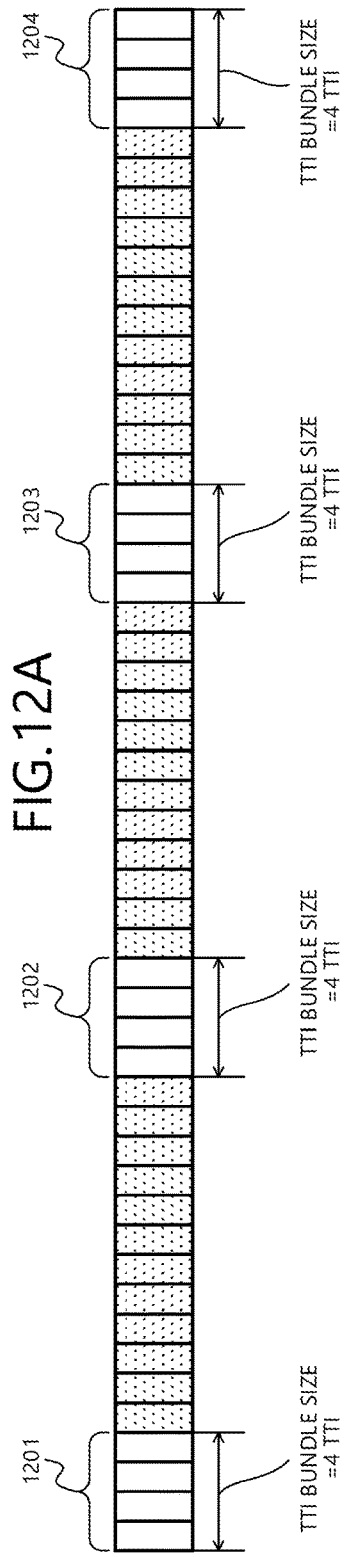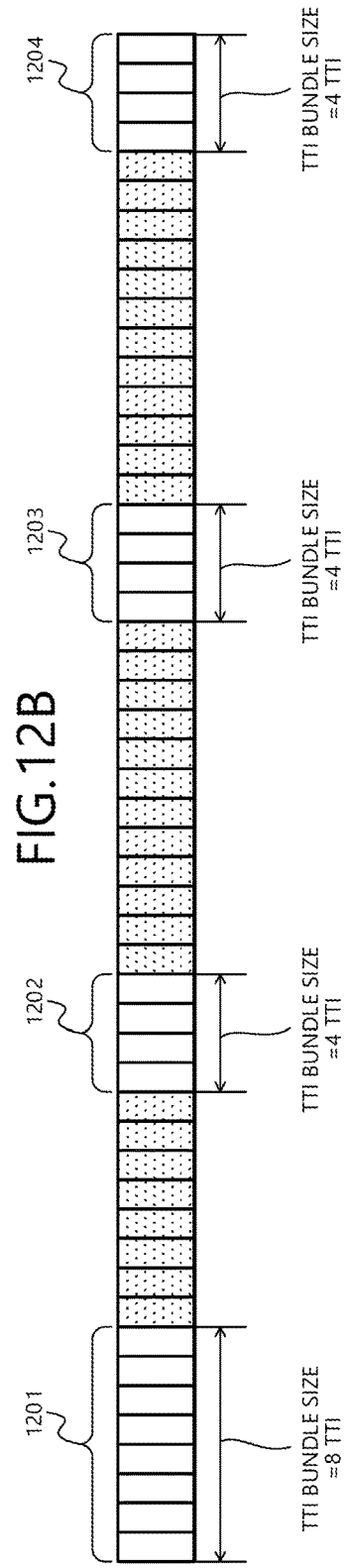

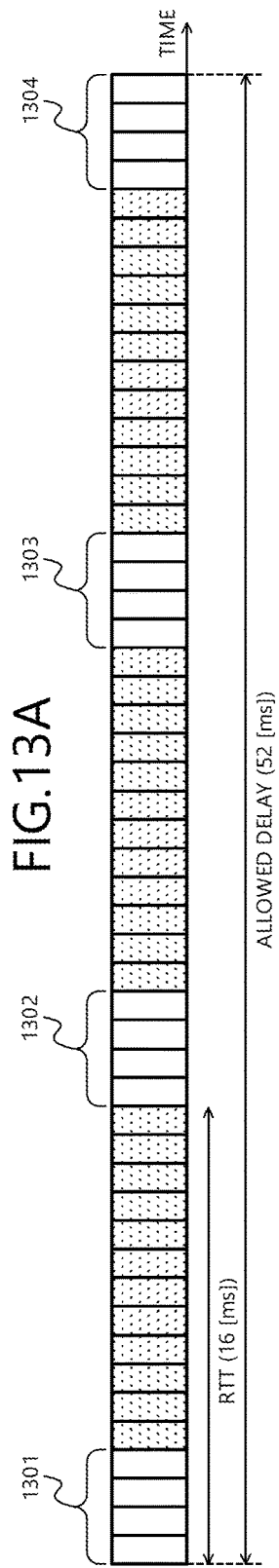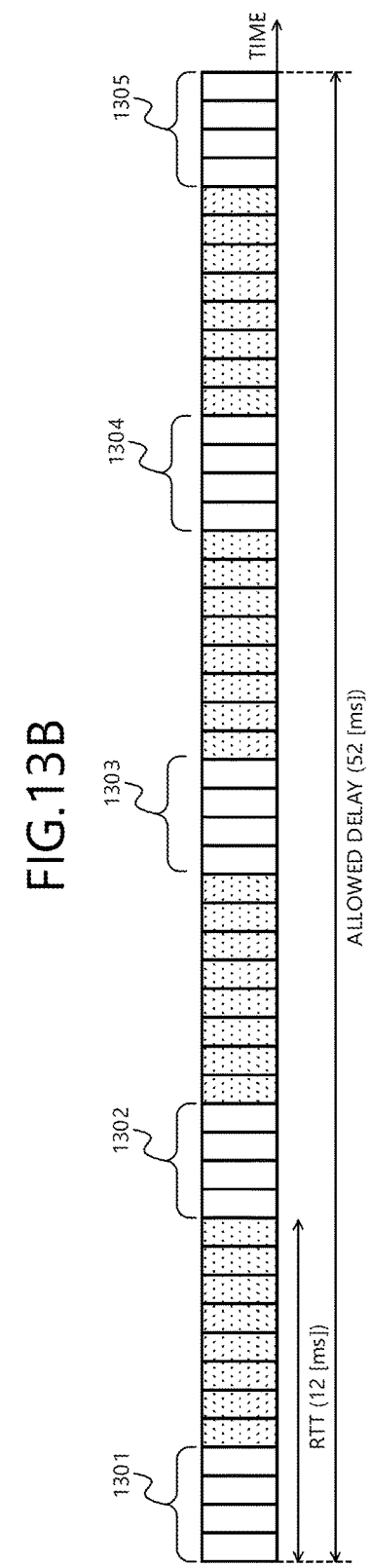

|  | MODE | TOTAL ENERGY OF TRANSMITTED PACKETS PER UNIT TIME |
|---|---|---|
| (a) | TTI BUNDLE SIZE=1,RTT=8 | 1×N'/8=3N'/24=N |
| (b) | TTI BUNDLE SIZE=4,RTT=16 | 4×N'/16=6N'/24=2N |
| (c) | TTI BUNDLE SIZE=4,RTT=12 | 4×N'/12=8N'/24=2.67N |
| (d) | TTI BUNDLE SIZE=4,RTT=8 | 4×N'/8=12N'/24=4N |

| TRANSMISSION POWER CONTROL MODE | |
|---|---|
| TPC COMMAND | NOTIFIED CONTENTS |
| "00" | TRANSITION TO TTI BUNDLE SIZE/RTT CONTROL MODE |
| "01" | TTI BUNDLE SIZE=1,RTT=8,TRANSMISSION POWER INCREMENT=-1 [dB] |
| "10" | TTI BUNDLE SIZE=1,RTT=8,TRANSMISSION POWER INCREMENT= 0 [dB] |
| "11" | TTI BUNDLE SIZE=1,RTT=8,TRANSMISSION POWER INCREMENT= 1 [dB] |

| TTI BUNDLE SIZE/RTT CONTROL MODE | |
|---|---|
| TPC COMMAND | NOTIFIED CONTENTS |
| "00" | TTI BUNDLE SIZE=1,RTT=8,TRANSITION TO TRANSMISSION POWER CONTROL MODE |
| "01" | TTI BUNDLE SIZE=4,RTT=16 |
| "10" | TTI BUNDLE SIZE=4,RTT=12 |
| "11" | TTI BUNDLE SIZE=4,RTT=8 |

| | TRANSMISSION POWER CONTROL MODE |
|---|---|
| TPC COMMAND | NOTIFIED CONTENTS |
| "00" | TTI BUNDLE SIZE=1,RTT=8,TRANSMISSION POWER INCREMENT=-1 [dB] |
| "01" | TTI BUNDLE SIZE=1,RTT=8,TRANSMISSION POWER INCREMENT= 0 [dB] |
| "10" | TTI BUNDLE SIZE=1,RTT=8,TRANSMISSION POWER INCREMENT= 1 [dB] |
| "11" | TTI BUNDLE SIZE=1,RTT=8,TRANSMISSION POWER INCREMENT= 3 [dB] |

| | TTI BUNDLE SIZE/RTT CONTROL MODE (AT TIME OF MAXIMUM TRANSMISSION POWER) |
|---|---|
| TPC COMMAND | NOTIFIED CONTENTS |
| "00" | TTI BUNDLE SIZE=1,RTT=8,TRANSITION TO TRANSMISSION POWER CONTROL MODE |
| "01" | TTI BUNDLE SIZE=4,RTT=16 |
| "10" | TTI BUNDLE SIZE=4,RTT=12 |
| "11" | TTI BUNDLE SIZE=4,RTT=8 |

| TTI BUNDLE SIZE/RTT CONTROL MODE | |
|---|---|
| Diff=RECEPTION SINR-TARGETED VALUE [dB] | ADJUSTMENT AMOUNT FOR TOTAL ENERGY OF TRANSMITTED PACKETS PER UNIT TIME |
| Diff>4.5 [dB] | 1/4 TIMES |
| 4.5 [dB]≥Diff>1.5 [dB] | 1/2 TIMES |
| 1.5[dB]≥Diff>-1.5 [dB] | 1 TIME |
| -1.5 [dB]≥Diff>-4.5 [dB] | 2 TIMES |
| -4.5 [dB]≥Diff | 4 TIMES |

| TTI BUNDLE SIZE/RTT CONTROL MODE | |
|---|---|
| ADJUSTMENT RESULT OF TOTAL ENERGY OF TRANSMITTED PACKETS PER UNIT TIME | TPC COMMAND |
| 1.5N>ADJUSTMENT RESULT | "00" (TTI BUNDLE SIZE=1,RTT=8, TRANSITION TO TRANSMISSION POWER CONTROL MODE) |
| 2.33N>ADJUSTMENT RESULT≥1.5N | "01" (TTI BUNDLE SIZE=4,RTT=16) |
| 3.33N>ADJUSTMENT RESULT≥2.33N | "10" (TTI BUNDLE SIZE=4,RTT=12) |
| ADJUSTMENT RESULT≥3.33N | "11" (TTI BUNDLE SIZE=4,RTT=8) |

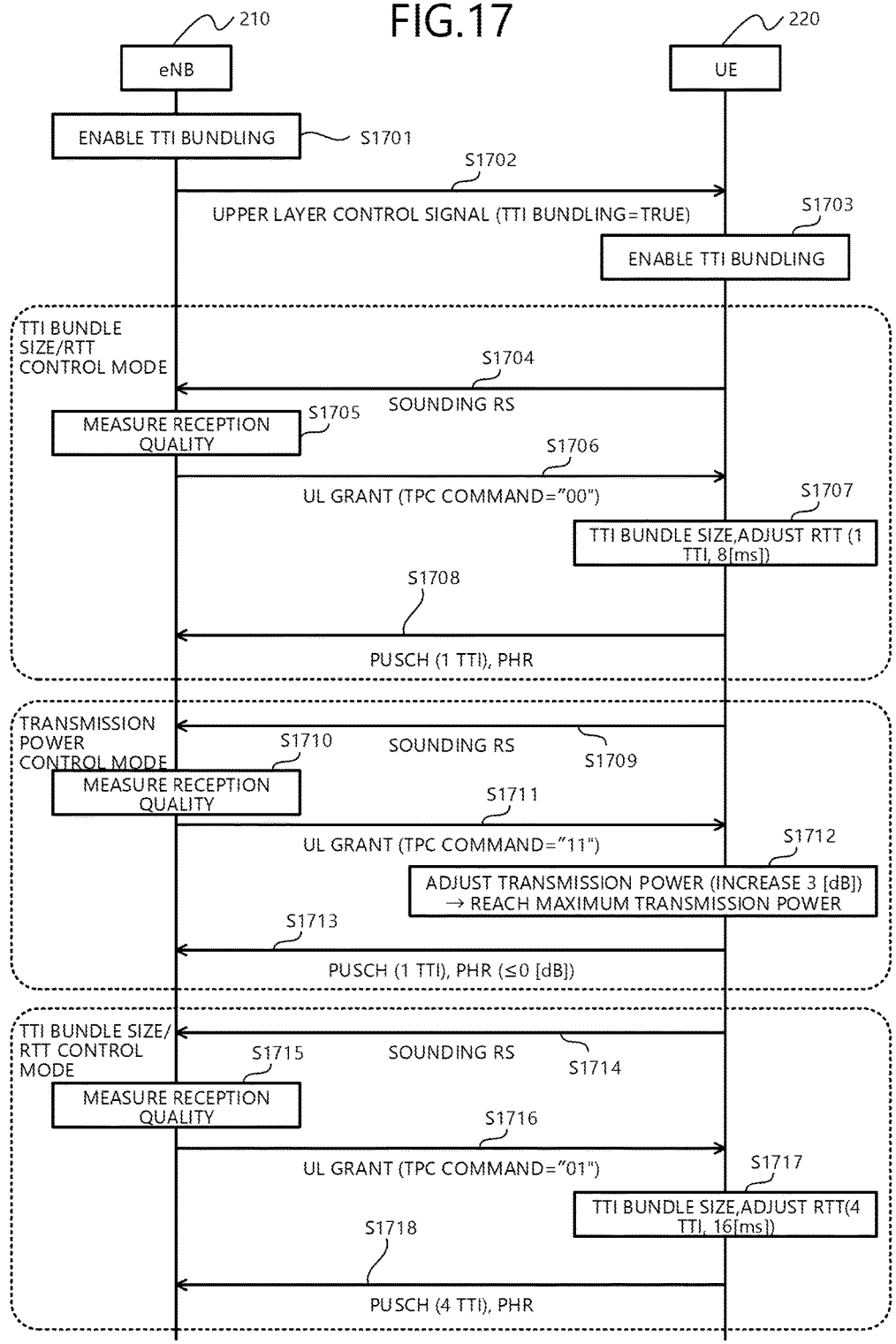

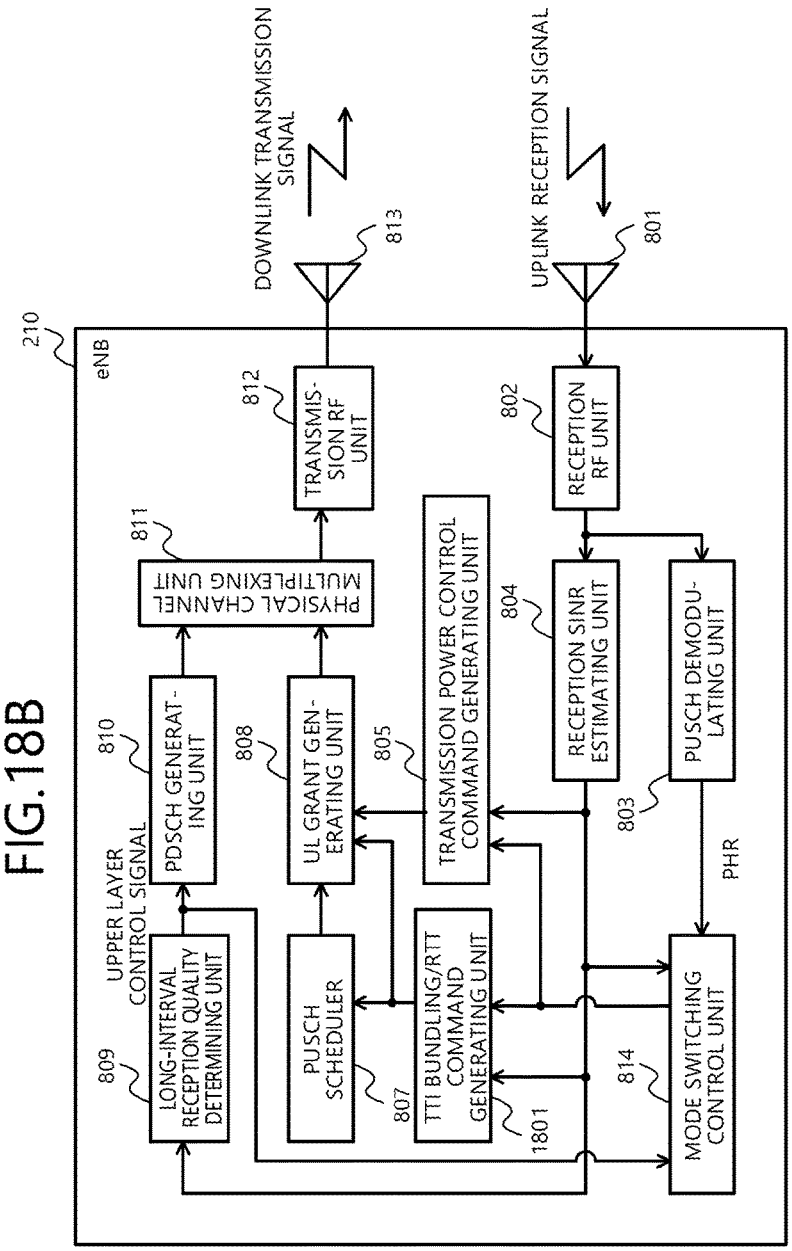

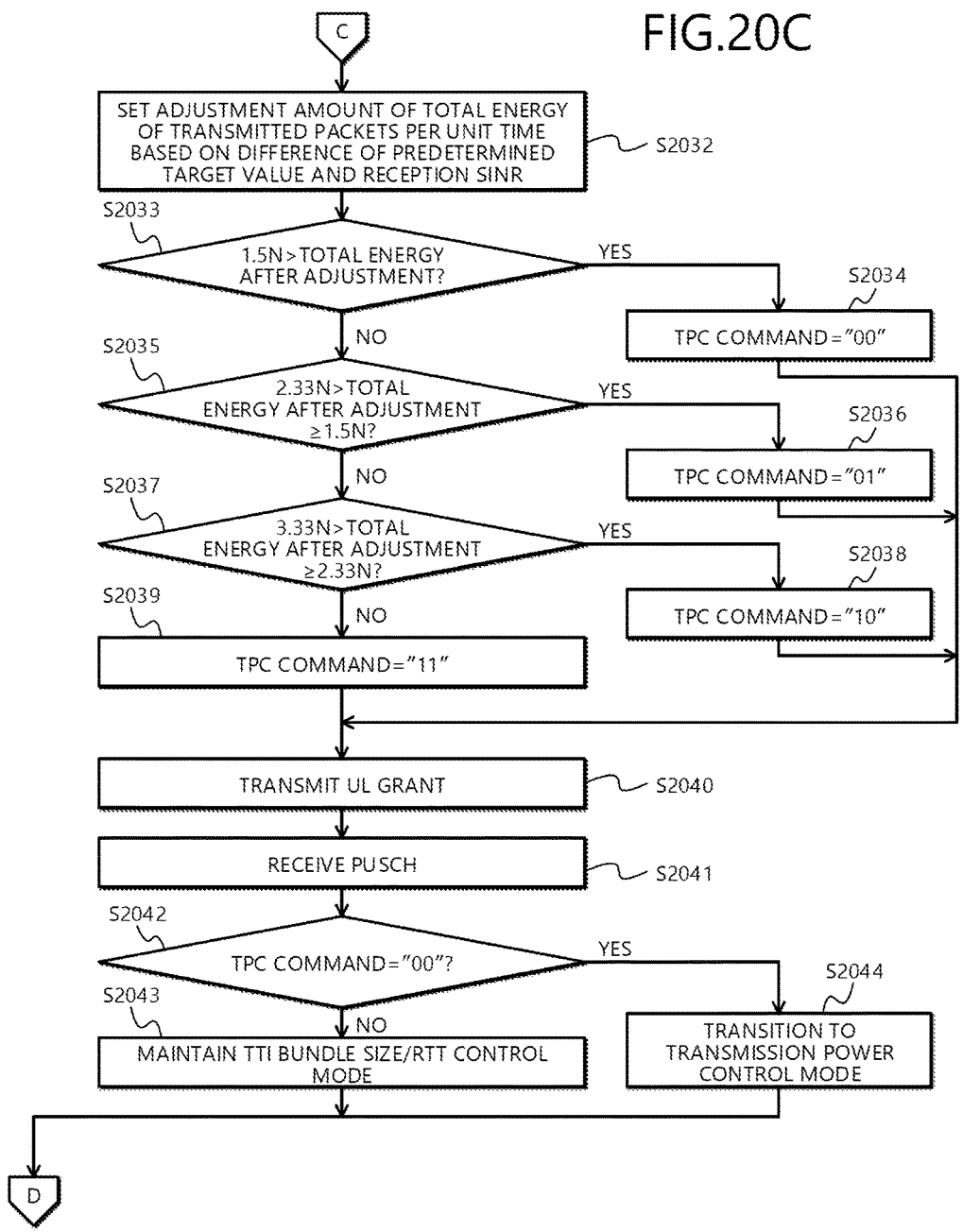

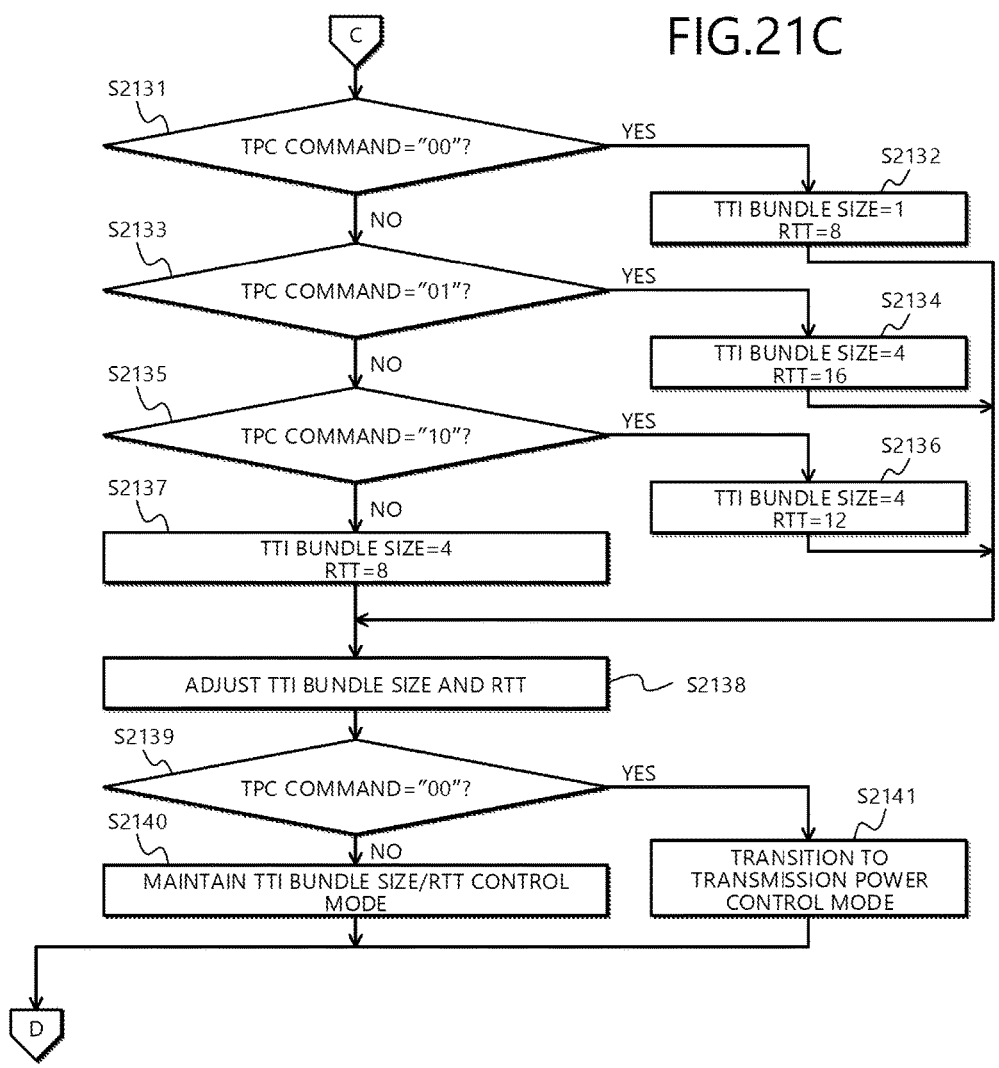

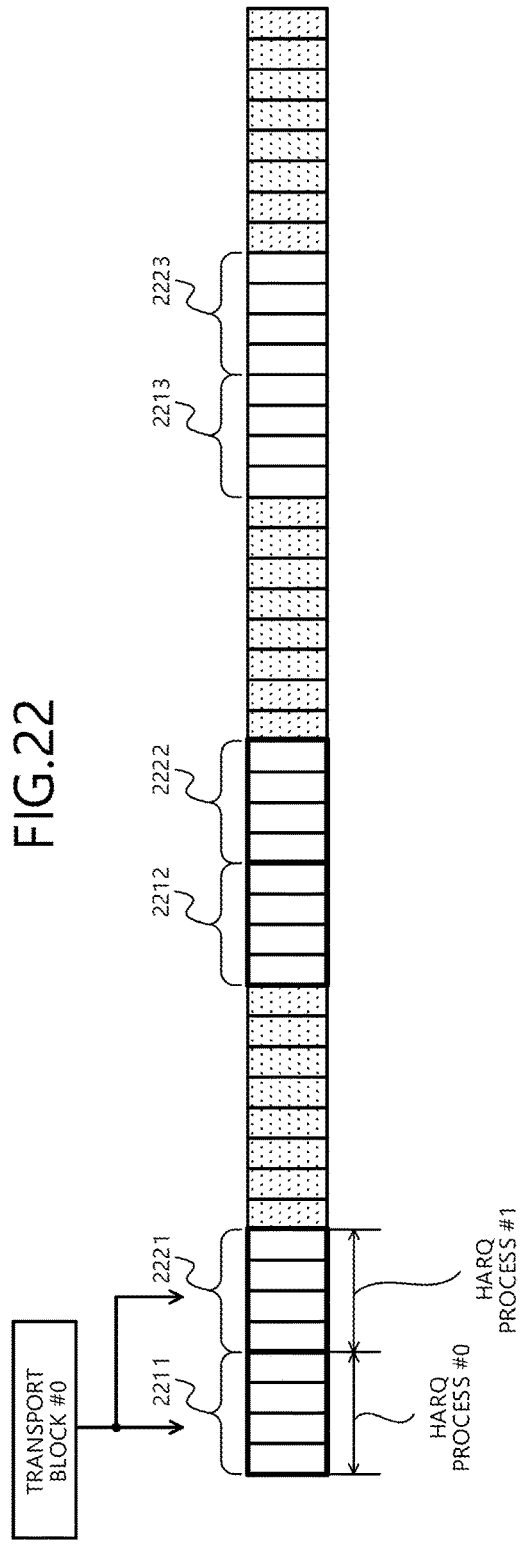

FIG.23A 2310

| TRANSMISSION POWER CONTROL MODE ||
|---|---|
| TPC COMMAND | NOTIFIED CONTENTS |
| "00" | TRANSITION TO TTI BUNDLE SIZE/HARQ PROCESS COUNT CONTROL MODE |
| "01" | TTI BUNDLE SIZE=1,TRANSMISSION POWER INCREMENT=-1 [dB] |
| "10" | TTI BUNDLE SIZE=1,TRANSMISSION POWER INCREMENT= 0 [dB] |
| "11" | TTI BUNDLE SIZE=1,TRANSMISSION POWER INCREMENT= 1 [dB] |

FIG.23B 2320

| TTI BUNDLE SIZE/HARQ PROCESS COUNT CONTROL MODE ||
|---|---|
| TPC COMMAND | NOTIFIED CONTENTS |
| "00" | TTI BUNDLE SIZE=1,TRANSITION TO TRANSMISSION POWER CONTROL MODE |
| "01" | TTI BUNDLE SIZE=4,HARQ PROCESS COUNT=1 |
| "10" | TTI BUNDLE SIZE=4,HARQ PROCESS COUNT=2 |
| "11" | TTI BUNDLE SIZE=4,HARQ PROCESS COUNT=4 |

FIG.24A 2410

| TRANSMISSION POWER CONTROL MODE ||
|---|---|
| TPC COMMAND | NOTIFIED CONTENTS |
| "00" | TTI BUNDLE SIZE=1,TRANSMISSION POWER INCREMENT=-1 [dB] |
| "01" | TTI BUNDLE SIZE=1,TRANSMISSION POWER INCREMENT= 0 [dB] |
| "10" | TTI BUNDLE SIZE=1,TRANSMISSION POWER INCREMENT= 1 [dB] |
| "11" | TTI BUNDLE SIZE=1,TRANSMISSION POWER INCREMENT= 3 [dB] |

| TTI BUNDLE SIZE/HARQ PROCESS COUNT CONTROL MODE (AT TIME OF MAXIMUM TRANSMISSION POWER) | |
|---|---|
| TPC COMMAND | NOTIFIED CONTENTS |
| "00" | TTI BUNDLE SIZE=1, TRANSITION TO TRANSMISSION POWER CONTROL MODE |
| "01" | TTI BUNDLE SIZE=4, HARQ PROCESS COUNT=1 |
| "10" | TTI BUNDLE SIZE=4, HARQ PROCESS COUNT=2 |
| "11" | TTI BUNDLE SIZE=4, HARQ PROCESS COUNT=4 |

| TTI BUNDLE SIZE/HARQ PROCESS COUNT CONTROL MODE | |
|---|---|
| Diff=RECEPTION SINR−TARGETED VALUE [dB] | ADJUSTMENT AMOUNT OF HARQ PROCESS COUNT |
| Diff>7.5 [dB] | 1/8 TIMES |
| 7.5 [dB]≥Diff>4.5 [dB] | 1/4 TIMES |
| 4.5 [dB]≥Diff>1.5 [dB] | 1/2 TIMES |
| 1.5 [dB]≥Diff>−1.5 [dB] | 1 TIME |
| −1.5 [dB]≥Diff>−4.5 [dB] | 2 TIMES |
| −4.5 [dB]≥Diff>−7.5 [dB] | 4 TIMES |
| −7.5 [dB]≥Diff | 8 TIMES |

| TTI BUNDLE SIZE/HARQ PROCESS COUNT CONTROL MODE | |
|---|---|
| ADJUSTMENT RESULT OF HARQ PROCESS COUNT | TPC COMMAND |
| ADJUSTMENT RESULT<1 | "00" (TTI BUNDLE SIZE=1, HARQ PROCESS COUNT=1, TRANSITION TO TRANSMISSION POWER CONTROL MODE) |
| ADJUSTMENT RESULT=1 | "01" (TTI BUNDLE SIZE=4, HARQ PROCESS COUNT=1) |
| ADJUSTMENT RESULT=2 | "10" (TTI BUNDLE SIZE=4, HARQ PROCESS COUNT=2) |
| ADJUSTMENT RESULT≥4 | "11" (TTI BUNDLE SIZE=4, HARQ PROCESS COUNT=4) |

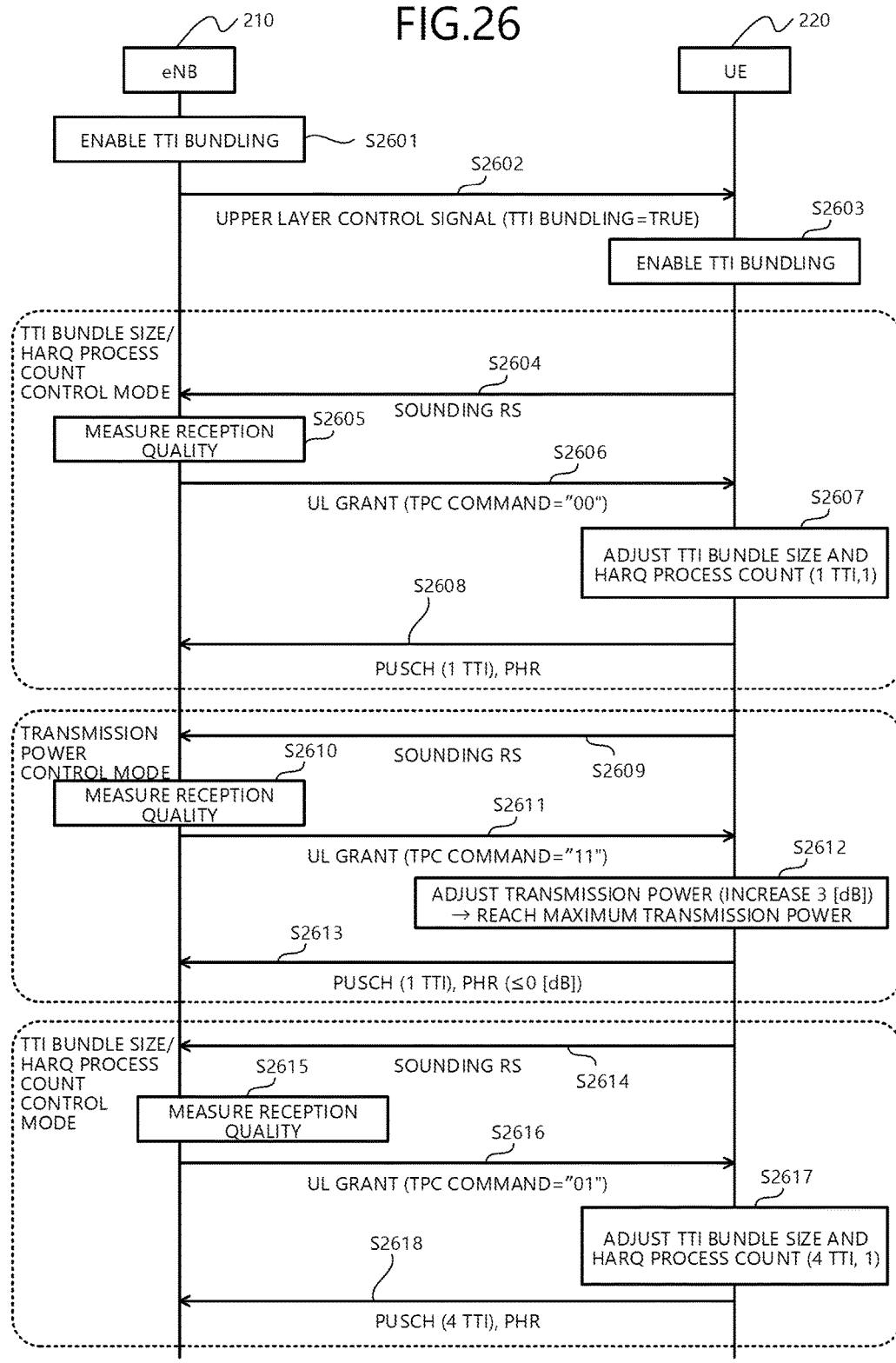

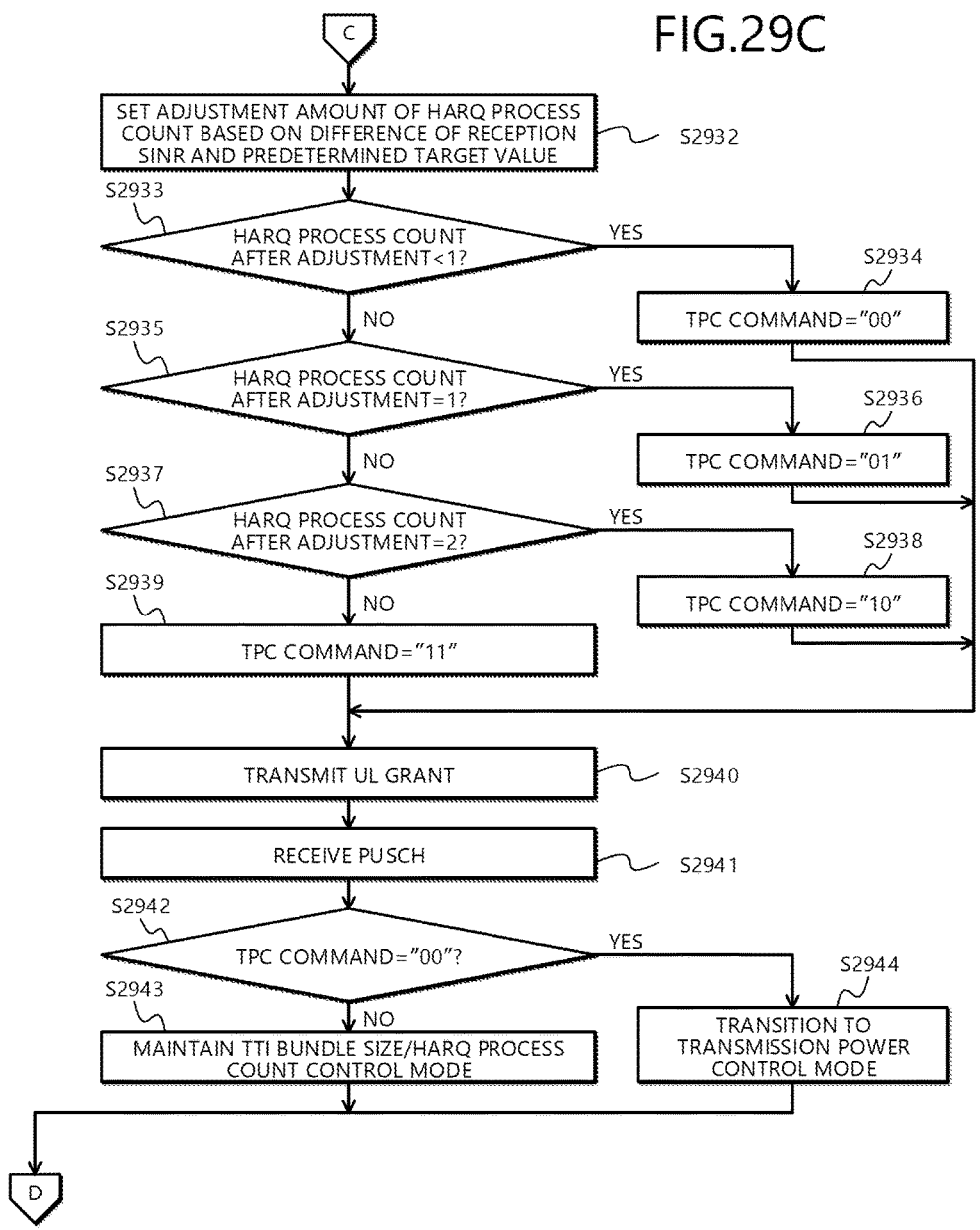

WIRELESS COMMUNICATIONS SYSTEM, BASE STATION, TERMINAL, AND PROCESS METHOD

CROSS REFERENCE TO RELATED APPLICATIONS

This application is a continuation application of International Application PCT/JP2014/059372, filed on Mar. 28, 2014, and designating the U.S., the entire contents of which are incorporated herein by reference.

FIELD

The embodiments discussed herein are related to a wireless communications system, a base station, a terminal, and a process method.

BACKGROUND

Use of plural transmission time intervals (TTIs) for transmitting information related to a single hybrid automatic repeat request (HARQ) process is conventionally known (for example, refer to Japanese Laid-Open Patent Publication No. 2013-9401).

Further, it is known that when downlink control information controlling plural uplink data transmissions is detected and the downlink control information instructs disabling of uplink data transmission, uplink data transmission is disabled and ACK is set in a HARQ process corresponding to uplink data transmission (for example, refer to Japanese Laid-Open Patent Publication No. 2012-165471).

Further, according to a known technique, a TTI transmission bundle having transmission time mapped on voice over IP (VoIP) arrive time is processed, the bundled TTI transmission is processed without acknowledgement, and indication that the bundled TTI transmission was correctly received is given (e.g., refer to Published Japanese-Translation of PCT Application, Publication No. 2013-520140).

Under Long Term Evolution (LTE), transmit power control (TPC) of an uplink is under consideration. Further, under LTE, TTI bundling where a terminal successively transmits the same data by uplink is under consideration.

SUMMARY

According to an aspect of an embodiment, a wireless communications system includes a base station configured to switch a first state of storing to control information transmitted to a terminal, a value instructing a transmission power of the terminal, and a second state of storing to the control information, a value instructing a transmission count of multiple transmissions of a same data by the terminal; and the terminal configured to switch a third state of adjusting the transmission power based on the value stored to the control information received from the base station in the first state, and a fourth state of adjusting the transmission count of multiple transmissions of the same data by the terminal, based on the value stored to the control information received from the base station in the second state.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is a diagram depicting one example of a wireless communications system according to a second embodiment;

FIG. 2B is a diagram depicting one example of TTI bundling in uplink under LTE;

FIG. 3 is a diagram depicting one example of a changing of a TTI bundle size;

FIG. 4A is a diagram depicting a first example of a UL grant bitmap in a transmission power control mode;

FIG. 4B is a diagram depicting a first example of a UL grant bitmap in a TTI bundle size control mode;

FIG. 5A is a diagram depicting a second example of a UL grant bitmap in the transmission power control mode;

FIG. 5B is a diagram depicting the second example of a UL grant bitmap in the TTI bundle size control mode;

FIG. 6A is a diagram depicting one example of a transmission power control command setting method in the transmission power control mode;

FIG. 6B is a diagram (part 1) depicting an example of the transmission power control command setting method in the TTI bundle size control mode;

FIG. 6C is a diagram (part 2) depicting an example of the transmission power control command setting method in the TTI bundle size control mode;

FIG. 7 is a sequence diagram depicting one example of operation of the wireless communications system according to the second embodiment;

FIG. 8B is a diagram depicting one example of signal flow in the eNB depicted in FIG. 8A;

FIG. 8C is a diagram depicting one example of hardware configuration of the eNB;

FIG. 9C is a diagram depicting one example of hardware configuration of UE;

FIG. 10A is a flowchart (part 1) of an example of processing by the eNB according to the second embodiment;

FIG. 10C is a flowchart (part 3) of an example of processing by the eNB according to the second embodiment;

FIG. 11B is a flowchart (part 2) of an example of processing by the UE according to the second embodiment;

FIG. 11C is a flowchart (part 3) of an example of processing by the UE according to the second embodiment;

FIG. 12A is a diagram depicting another example of changing of the TTI bundle size;

FIG. 12B is a diagram depicting another example of changing of the TTI bundle size;

FIG. 13A is a diagram (part 1) depicting an example of changing of the RTT;

FIG. 13B is a diagram (part 2) depicting an example of changing of the RTT;

FIG. 13C is a diagram (part 3) depicting one example of the total energy of transmitted packets per unit time;

FIG. 14A is a diagram depicting a first example of a UL grant bitmap in the transmission power control mode;

FIG. 14B is a diagram depicting the first example of a UL grant bitmap in a TTI bundle size/RTT control mode;

FIG. 15A is a diagram depicting a second example of a UL grant bitmap in the transmission power control mode;

FIG. 15B is a diagram depicting the second example of a UL grant bitmap in the TTI bundle size/RTT control mode;

FIG. 16A is a diagram (part 1) depicting an example of the transmission power control command setting method in the TTI bundle size/RTT control mode;

FIG. 16B is a diagram (part 2) depicting an example of the transmission power control command setting method in the TTI bundle size/RTT control mode;

FIG. 17 is a sequence diagram depicting one example of operation of the wireless communications system according to a third embodiment;

FIG. 18B is a diagram depicting one example of signal flow in the eNB depicted in FIG. 18A;

FIG. 20C is a flowchart (part 3) of an example of processing by the eNB according to the third embodiment eNB;

FIG. 21C is a flowchart (part 3) of an example of processing by the UE according to the third embodiment UE;

FIG. 22 is a diagram depicting one example of changing a HARQ process count;

FIG. 23A is a diagram depicting a first example of a UL grant bitmap in the transmission power control mode;

FIG. 23B is a diagram depicting the first example of a UL grant bitmap in a TTI bundle size/HARQ process count control mode;

FIG. 24A is a diagram depicting a second example of a UL grant bitmap in the transmission power control mode;

FIG. 24B is a diagram depicting the second example of a UL grant bitmap in the TTI bundle size/HARQ process count control mode;

FIG. 25A is diagram (part 1) depicting an example of the transmission power control command setting method in the TTI bundle size/the HARQ process count control mode;

FIG. 25B is diagram (part 2) depicting an example of the transmission power control command setting method in the TTI bundle size/the HARQ process count control mode;

FIG. 26 is a sequence diagram depicting one example of operation of the wireless communications system according to a fourth embodiment;

FIG. 29C is a flowchart (part 3) of an example of processing by the eNB according to the fourth embodiment;

DESCRIPTION OF THE INVENTION

Embodiments of a wireless communications system, a base station, a terminal, and a process method according to the present invention will be described in detail with reference to the accompanying drawings.

Figure 1A:
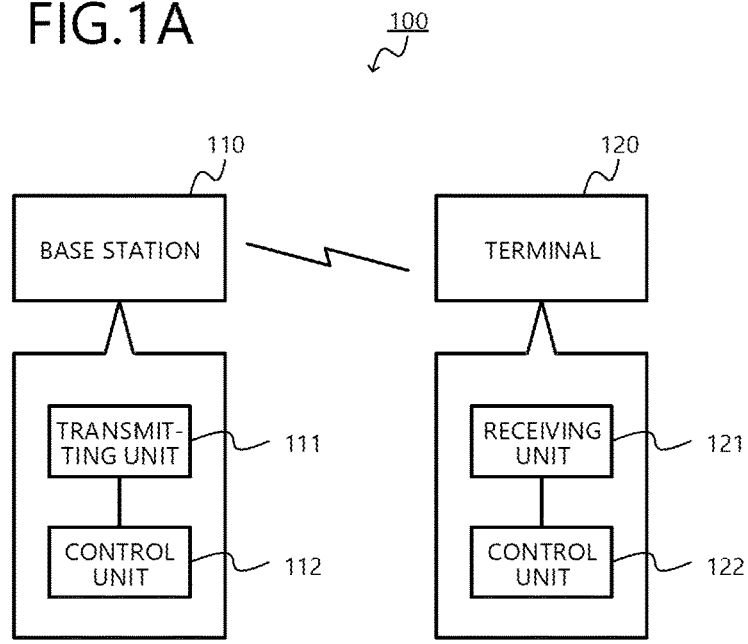
FIG. 1A is a diagram depicting one example of a wireless communications system according to a first embodiment.
Figure 1B:
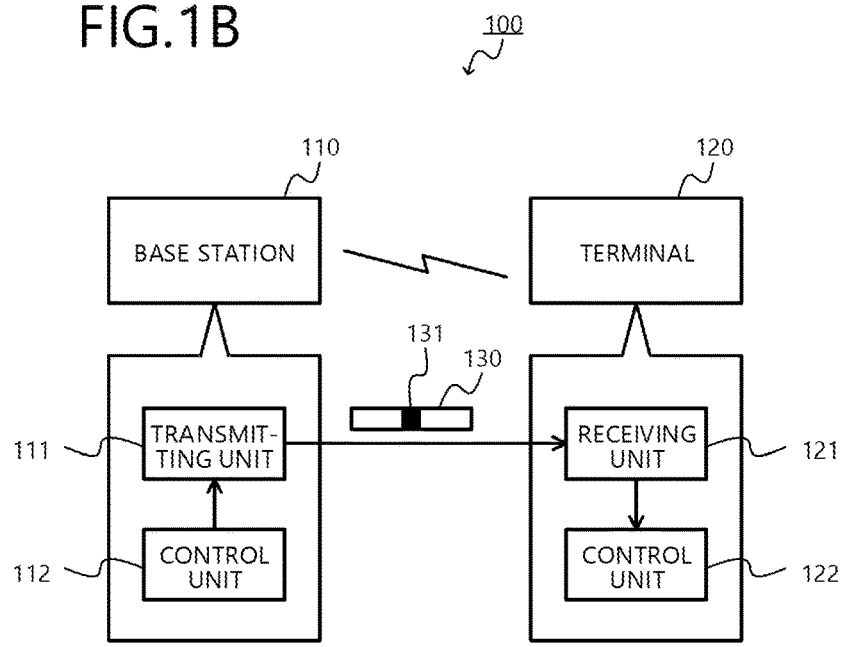
FIG. 1B is a diagram depicting one example of signal flow in the wireless communications system depicted in FIG. 1A.

FIG. 1A is a diagram depicting one example of a wireless communications system according to a first embodiment. FIG. 1B is a diagram depicting one example of signal flow in the wireless communications system depicted in FIG. 1A. As depicted in FIGS. 1A and 1B, a wireless communications system 100 according to the first embodiment includes a base station 110 and a terminal 120.

The terminal 120 transmits wireless signals to the base station 110. Further, the terminal 120 may successively transmit the same data to the base station 110. Consecutive transmission of the same data is transmission of plural wireless signals enabling the same data to be demodulated at the base station 110. Therefore, provided the wireless signals are wireless signals enabling the same data to be demodulated, the wireless signals may be mutually different wireless signals.

The base station 110 includes a transmitting unit 111 and a control unit 112. The transmitting unit 111 transmits control information 130 to the terminal 120. The control information 130, for example, is information indicating radio resources assigned by the base station 110 for the transmission of wireless signals from the terminal 120 to the base station 110.

The control unit 112 is capable of switching a first state and a second state. In the first state, the control unit 112 stores to a predetermined region 131 of the control information 130 transmitted by the transmitting unit 111, a value among values instructing the transmission power of the terminal 120. In the second state, the control unit 112 stores to the predetermined region 131 of the control information 130, a value among values instructing the transmission count of successive transmissions of the same data by the terminal 120. Further, values stored to the predetermined region 131 by the control unit 112 in the first state and values stored to the predetermined region 131 by the control unit 112 in the second state include overlapping values.

The terminal 120 includes a receiving unit 121 and a control unit 122. The receiving unit 121 receives the control information 130 transmitted from the base station 110 and outputs the received control information 130 to the control unit 122.

The control unit 122 is capable of switching a third state and a fourth state. The control unit 122, for example, is in the third state when the control unit 112 of the base station 110 is in the first state, and is in the fourth state when the control unit 112 of the base station 110 is in the second state.

In the third state, the control unit 122 adjusts the transmission power of a wireless signal from the terminal 120 to the base station 110, based on the value of the predetermined region 131 of the control information 130 received from the base station 110 in the first state by the receiving unit 121. At this time, the control unit 122 does not adjust the transmission count of successive transmissions of the same data to the base station 110, based on the predetermined region 131.

In the fourth state, the control unit 122 adjusts the transmission count of successive transmissions of the same data by the terminal 120 to the base station 110, based on the value of the predetermined region 131 of the control information 130 received from the base station 110 in the second state by the receiving unit 121. At this time, the control unit 122 does not adjust the transmission power of the wireless signal to the base station 110, based on the predetermined region 131.

Thus, according to the first embodiment, the terminal 120 may give notification of the transmission count of successive transmissions of the same data, by using the predetermined region 131 of the control information 130 used in transmission power control of the terminal 120. As a result, the transmission count may be made variable and increases in the overhead of control information (e.g., the control information 130) accompanying notification of the transmission count from the base station 110 to the terminal 120 may be suppressed.

A first example of a state switching method will be described. For example, in the first state, the base station 110 stores to the predetermined region 131, a value among a value instructing a transmission power and a value instructing switching to the fourth state. In the second state, the base station 110 stores to the predetermined region 131, a value among a value instructing a transmission count of successive transmissions of the same data by the terminal 120 and a value instructing switching to the third state. Among the first state and the second state, the base station 110 switches to the state corresponding to the value stored in the predetermined region 131. Further, among the third state and the fourth state, the terminal 120 switches to the state corresponding to the value of the predetermined region.

For example, when the base station 110 stores to the predetermined region 131, a value instructing switching to the fourth state, the terminal 120 transitions to the fourth state and the base station 110 transitions to the second state. Further, when the base station 110 stores to the predetermined region 131, a value instructing switching to the third state, the terminal 120 transitions to the third state and the base station 110 transitions to the first state.

In this manner, a portion of the values among values that may be stored to the predetermined region 131 may be value instructing state switching. As a result, control is enabled such that when the base station 110 is in the first state, the terminal 120 is in the third state, and when the base station 110 is in the second state, the terminal 120 is in the fourth state.

A second example of a state switching method will be described. Configuration may be such that the terminal 120 transmits information corresponding to the transmission power of the terminal 120 to the base station 110. Further, configuration may be such that among the first state and the second state, the base station 110 switches to the state that corresponds to the information received from the terminal 120, corresponding to the transmission power of the terminal 120. In this case, among the third state and the fourth state, the terminal 120 switches to the state that corresponds to the information transmitted to the base station 110, corresponding to the transmission power of the terminal 120.

In this manner, information transmitted by the terminal 120 to the base station 110 and corresponding to the transmission power of the terminal 120 may be used in state switching. As a result, control is enabled such that when the base station 110 is in the first state, the terminal 120 is in the third state, and when the base station 110 is in the second state, the terminal 120 is in the fourth state. Further, in the predetermined region 131, values that may be used in the instructing of parameters are of a large number, thereby enabling more flexible control. The information corresponding to the transmission power of the terminal 120, for example, may be information indicating the difference of the transmission power of the terminal 120 and a maximum transmission power of the terminal 120.

Selection of a value based on uplink communication quality will be described. The control unit 112 of the base station 110, for example, may select a value to be stored to the predetermined region 131 based on the quality of wireless communication from the terminal 120 to the base station 11. The signal to interference and noise ratio (SINR) at the base station 110, of a wireless signal from the terminal 120, for example, may be used as the quality of wireless communication.

A first modification example will be described. In place of the transmission count of successive transmissions of the same data by the terminal 120, the time until the terminal 120 retransmits data after having transmitted the data to the base station 110 may be controlled using the predetermined region 131 of the control information 130. As a result, the time may be made variable and increases in the overhead of control information (e.g., the control information 130) accompanying notification of the time from the base station 110 to the terminal 120 may be suppressed.

A second modification example will be described. In place of the transmission count of successive transmissions of the same data by the terminal 120, a process count of performing with respect to the same data, a process of successively transmitting the same data by the terminal 120 may be controlled using the predetermined region 131 of the control information 130. As a result, the process count may be made variable and increases in the overhead of control information (e.g., the control information 130) accompanying notification of the process count from the base station 110 to the terminal 120 may be suppressed.

FIG. 2A is a diagram depicting one example of a wireless communications system according to a second embodiment. As depicted in FIG. 2A, a wireless communications system 200 according to the second embodiment is a cellular communications system including an eNB 210 and UE 220. The eNB 210 and the UE 220, for example, may wirelessly communicate under the Long Term Evolution (LTE) standard. A cell 211 is a region in which wireless communication with the eNB 210 is possible. The UE 220 is located in the cell 211 and is user equipment (user terminal) capable of wirelessly communicating with the eNB 210.

The wireless communications system 100 depicted in FIGS. 1A and 1B, for example, may be realized by the wireless communications system 200 depicted in FIG. 2A. The base station 110 depicted in FIGS. 1A and 1B, for example, may be realized by the eNB 210 depicted in FIG. 2A. The terminal 120 depicted in FIGS. 1A and 1B, for example, may be realized by the UE 220 depicted in FIG. 2A.

FIG. 2B is a diagram depicting one example of TTI bundling in uplink under LTE. In FIG. 2B, the horizontal axis (subframe) represents time.

An uplink (UL) grant 241 is scheduling information transmitted from the eNB 210 to the UE 220, and is information indicating radio resources assigned to uplink communication of the UE 220 by the eNB 210.

The UE 220 performs TTI bundling of transmitting packets representing the same data, 4 times successively at subframes 231 to 234 (4 TTIs), 4 [ms] after a subframe 230 when the UL grant 241 is received. The 4 packets transmitted at the subframes 231 to 234, for example, are transmitted (PUSCH coding) by a Physical Uplink Shared Channel (PUSCH).

The 4 packets transmitted at the subframes 231 to 234 may be mutually different packets provided the 4 packets enable the same data to be decoded on the receiving side. For example, the 4 packets transmitted at the subframes 231 to 234 may be packets respectively having a differing characteristic like redundancy version (RV) of HARQ (RV=0, 2, 3, 1). An example of the characteristics may be a transmission start position of a data block.

A response signal 242 is a response signal transmitted from the eNB 210 to the UE 220 at the subframe 235, 4 [ms] after the subframe 234, in response to packets transmitted at the subframes 231 to 234. In the example depicted in FIG. 2B, the response signal 242 is a NACK (negative-acknowledgement signal) indicating that the data represented by the packets transmitted at the subframes 231 to 234 could not be properly received (decoded).

The UE 220, having received the response signal 242 (NACK), performs TTI bundling of transmitting packets representing the same data as at the subframes 231 to 234, 4 times successively at subframes 236 to 239 after an RTT 243 elapses from the subframe 231. The RTT 243 is the time from transmission of the data by the UE 220 until retransmission of the data. In the example depicted in FIG. 2B, the RTT 243 is a round trip time (RTT) of 16 [ms].

FIG. 3 is a diagram depicting one example of a changing of the TTI bundle size. In FIG. 3, the horizontal axis represents time (subframe). At a new transmission 301 depicted in FIG. 3, the UE 220 performs TTI bundling (TTI bundle size=8 TTIs) of successively transmitting to the eNB 210 eight times (8 subframes), packets representing new data that are the same. At a new transmission 302 subsequent to the new transmission 301, the UE 220 performs TTI bundling (TTI bundle size=4 TTIs) of successively transmitting to the eNB 210 four times (4 subframes), packets representing new data that are the same.

At a new transmission 303 subsequent to the new transmission 302, the UE 220 performs TTI bundling (TTI bundle size=2 TTIs) of successively transmitting to the eNB 210 two times (2 subframes), packets representing new data that are the same. At a new transmission 304 subsequent to the new transmission 303, the UE 220 performs TTI bundling (TTI bundle size=1 TTI) of successively transmitting to the eNB 210 one time (1 subframe), packets representing new data. The new transmission 304 is technically the same as a state where TTI bundling is disabled since the TTI bundle size is 1.

Under Alt.6.3 of LTE described later, as depicted in FIG. 3, making the TTI bundle size of TTI bundling variable is under consideration. To do this, the eNB 210 uses a control signal to notify the UE 220 of the TTI bundle size. Here, the eNB 210, for example, uses a TPC command stored in a UL grant to notify the UE 220 of the TTI bundle size. The TPC command is a region (e.g., 2 [bit]) of the control signal configured for controlling the transmission power of the UE 220. The UE 220 adjusts the TTI bundle size, based on the TPC command stored in the UL grant received from the eNB 210.

For example, when TTI bundling between the eNB 210 and the UE 220 has been enabled by the control of an higher layer, the eNB 210 and the UE 220 enter a state enabling switching to a transmission power control mode and the TTI bundle size control mode.

For example, in the transmission power control mode, the UE 220 fixes the TTI bundle size of the UE 220 to 1 (minimum value). The eNB 210 uses the TPC command to notify the UE 220 of the transmission power. The UE 220 adjusts the transmission power of the UE 220, based on the TPC command.

On the other hand, in the TTI bundle size control mode, the UE 220 fixes the transmission power of the UE 220 to a maximum value. The eNB 210 uses the TPC command to notify the UE 220 of the TTI bundle size. The UE 220 adjusts the TTI bundle size of the UE 220, based on the TPC command.

In this manner, switching the transmission power control mode of fixing the TTI bundle size and the TTI bundle size control mode of fixing the transmission power enables the TPC command for controlling the transmission power to be further used to control the TTI bundle size. As a result, increases in the overhead of control information when the TTI bundle size of the UE 220 is made variable may be suppressed. Therefore, the TTI bundle size may be controlled according to wireless channel fluctuations and increases in the overhead of control information may be suppressed.

FIG. 4A is a diagram depicting a first example of a UL grant bitmap in the transmission power control mode. A table 410 depicted in FIG. 4A indicates a correspondence relation of a TPC command and contents notified by the TPC command, in the transmission power control mode.

For example, a TPC command="00" in the transmission power control mode indicates transition to the TTI bundle size control mode. A TPC command="01" in the transmission power control mode indicates that the TTI bundle size is to be maintained at 1 and a transmission power increment is to be −1 [dB].

A TPC command="10" in the transmission power control mode indicates that the TTI bundle size is to be maintained at 1 and the transmission power increment is to be 0 [dB] (no change). A TPC command="11" in the transmission power control mode indicates that the TTI bundle size is to be maintained at 1 and the transmission power increment is to be 1 [dB].

FIG. 4B is a diagram depicting the first example of a UL grant bitmap in the TTI bundle size control mode. A table 420 depicted in FIG. 4B indicates a correspondence relation of a TPC command and contents notified by the TPC command, in the TTI bundle size control mode.

For example, a TPC command="00" in the TTI bundle size control mode indicates that the TTI bundle size is to be 1 and indicates transition to the transmission power control mode. A TPC command="01" in the TTI bundle size control mode indicates that the TTI bundle size is to be 2.

A TPC command="10" in the TTI bundle size control mode indicates that the TTI bundle size is to be 4. A TPC command="11" in the TTI bundle size control mode indicates that the TTI bundle size is to be 8.

FIG. 5A is a diagram depicting a second example of a UL grant bitmap in the transmission power control mode. A table 510 depicted in FIG. 5A indicates a correspondence relation of a TPC command and contents notified by the TPC command, in the transmission power control mode.

For example, a TPC command="00" in the transmission power control mode indicates that the TTI bundle size is to be maintained at 1 and the transmission power increment is to be −1 [dB]. A TPC command="01" in the transmission power control mode indicates that the TTI bundle size is to be maintained at 1 and the transmission power increment is to be 0 [dB].

A TPC command="10" in the transmission power control mode indicates that the TTI bundle size is to be maintained at 1 and the transmission power increment is to be 1 [dB]. A TPC command="11" in the transmission power control mode indicates that the TTI bundle size is to be maintained at 1 and the transmission power increment is to be 3 [dB].

In this manner, transition to the TTI bundle size control mode need not be explicitly notified by a TPC command. In this case, the eNB 210 and the UE 220, for example, may determine transition to the TTI bundle size control mode, based on power headroom reporting (PHR). As a result, since the type of transmission power increment that can be instructed by a TPC command increases, more flexible control of the transmission power of the UE 220 becomes possible.

PHR is information indicating the state of the transmission power of the UE 220 and, for example, indicates the difference of the maximum transmission power of the UE 220 and a transmission power desired by the eNB 210. Further, the PHR is transmitted, as a MAC control element, accompanying an uplink data signal from the UE 220 to the eNB 210.

The PHR, for example, is a value (predetermined value) of 0 or less when the transmission power of the UE 220 reaches the maximum value. Therefore, the eNB 210 transitions to the TTI bundle size control mode, when the PHR received from the UE 220 is 0 or less. Further, the UE 220 transitions to the TTI bundle size control mode, when the PHR transmitted to the eNB 210 is 0 or less. As a result, when the transmission power of the UE 220 reaches the maximum value in the transmission power control mode, the TTI bundle size control mode may be transitioned to.

FIG. 5B is a diagram depicting the second example of a UL grant bitmap in the TTI bundle size control mode. A table 520 depicted in FIG. 5B indicates a correspondence relation of a TPC command and contents notified by the TPC command, in the TTI bundle size control mode, i.e., when the transmission power of the UE 220 reaches the maximum value (at a time of maximum transmission power). The table 520 depicted in FIG. 5B, for example, may be the same as the table 420 depicted in FIG. 4B. Hereinafter, in the second embodiment, a case where the UL grant bitmap (second example) depicted in FIGS. 5A and 5B is used will be described.

FIG. 6A is a diagram depicting one example of a transmission power control command setting method in the transmission power control mode. A table 610 depicted in FIG. 6A indicates a correspondence relation of a TPC command selected by the eNB 210 and a condition related to a difference Diff from a targeted value for the measured value of reception SINR, in the transmission power control mode. The difference Diff is a value obtained by subtracting a predetermined target value from the measured value of reception SINR, which is the quality of reception from the UE 220, at the eNB 210.

For example, when Diff>0.5 [dB], the eNB 210 selects the TPC command="00" indicating the transmission power increment=−1 [dB]. When 0.5 [dB]≥Diff>−0.5 [dB], the eNB 210 selects the TPC command="01" indicating the transmission power increment=0 [dB]. When −0.5 [dB]≥Diff>−1.5 dB [dB], the eNB 210 selects the TPC command="10" indicating the transmission power increment=1 [dB]. When −1.5 [dB]≥Diff, the eNB 210 selects the TPC command="11" indicating the transmission power increment=3 [dB].

FIGS. 6B and 6C are diagrams depicting examples of the transmission power control command setting method in the TTI bundle size control mode. A table 620 depicted in FIG. 6B indicates a correspondence relation of a TTI bundle size adjustment amount selected by the eNB 210 and a condition related to the difference Diff from a targeted value for the measured value of reception SINR, in the TTI bundle size control mode.

For example, when Diff>7.5 [dB], the eNB 210 selects ⅛ times as the TTI bundle size adjustment amount. When 7.5 [dB]≥≥Diff>4.5 [dB], the eNB 210 selects ¼ times as the TTI bundle size adjustment amount. When 4.5 [dB]≥Diff>1.5 [dB], the eNB 210 selects ½ times as the TTI bundle size adjustment amount.

When 1.5 [dB]≥Diff>−1.5 [dB], the eNB 210 selects 1 time (no change) as the TTI bundle size adjustment amount. When −1.5 [dB]≥Diff>−4.5 [dB], the eNB 210 selects 2 times as the TTI bundle size adjustment amount. When −4.5 [dB]≥Diff>−7.5 [dB], the eNB 210 selects 4 times as the TTI bundle size adjustment amount. When −7.5 [dB]≥Diff, the eNB 210 selects 8 times as the TTI bundle size adjustment amount.

A table 630 depicted in FIG. 6C indicates a correspondence relation of an adjustment result of the TTI bundle size based on the selected TTI bundle size adjustment amount and a TPC command selected by the eNB 210, in the TTI bundle size control mode. For example, when the adjustment result≤1, the eNB 210 selects the TPC command="00" indicating the TTI bundle size=1 and transition to the transmission power control mode.

When the adjustment result=2, the eNB 210 selects the TPC command="01" indicating the TTI bundle size=2. When the adjustment result=4, the eNB 210 selects the TPC command="10" indicating the TTI bundle size=4. When the adjustment result≥8, the eNB 210 selects the TPC command="11" indicating the TTI bundle size=8.

FIG. 7 is a sequence diagram depicting one example of operation of the wireless communications system according to the second embodiment. In the wireless communications system 200 according to the second embodiment, for example, the following steps are performed.

The eNB 210 enables TTI bundling with the UE 220 (step S701). The eNB 210 transmits to the UE 220, an higher layer control signal (TTI bundling=TRUE) instructing TTI bundling to be enabled (step S702).

The UE 220 enables TTI bundling with the eNB 210 (step S703). In the example depicted in FIG. 7, the eNB 210 and the UE 220, which have enable TTI bundling, are assumed to be in the TTI bundle size control mode as an initial mode.

The UE 220 transmits a sounding reference signal (RS) to the eNB 210 (step S704). The eNB 210 measures the reception quality based on the sounding RS transmitted at step S704. The reception quality, for example, is the reception SINR. In the example depicted in FIG. 7, the eNB 210 is assumed to set the TTI bundle size of the UE 220 to be changed to 1 TTI, based on the reception quality measured at step S705.

The eNB 210 transmits to the UE 220, a UL grant based on the reception quality measured at step S705 (step S706). The UL grant at step S706 includes the TPC command="00". In other words, the UL grant at step S706 includes a TPC command instructing the TTI bundle size to be configured to 1 TTI and transition to the transmission power control mode (for example, refer to FIG. 5B).

The UE 220 adjusts the TTI bundle size of the UE 220 to 1 TTI, based on the TPC command included in the UL grant transmitted at step S706 (step S707). The UE 220 transmits a PUSCH and PHR by a radio resource instructed by the UL grant transmitted at step S706 (step S708). Transmission of the PUSCH at step S708 is performed by TTI bundling of transmitting the PUSCH one time.

Consequent to step S706, the eNB 210 and the UE 220 transition to the transmission power control mode.

The UE 220 transmits a sounding RS to the eNB 210 (step S709). The eNB 210 measures the reception quality based on the sounding RS transmitted at step S709 (step S710). In the example depicted in FIG. 7, the eNB 210 sets the transmission power of the UE 220 to be increased 3 [dB] based on the reception quality measured at step S710.

The eNB 210 transmits to the UE 220, a UL grant based on the reception quality measured at step S710 (step S711). The UL grant at step S711 includes the TPC command="11". In other words, the UL grant at step S711 includes a TPC command instructing the transmission power to be increased 3 [dB] (for example, refer to FIG. 5A).

The UE 220 performs adjustment such that the transmission power increases 3 [dB], based on the TPC command included in the UL grant transmitted at step S711 (step S712). Consequent to step S712, the transmission power of the UE 220 is assumed to reach the maximum transmission power. Therefore, the PHR of the UE 220 becomes 0 or less.

The UE 220 transmits a PUSCH and PHR by a radio resource instructed by the UL grant transmitted at step S711 (step S713). Transmission of the PUSCH at step S713 is performed by TTI bundling of transmitting the PUSCH one time.

Consequent to the PHR of the UE 220 becoming 0 [dB] or less, the eNB 210 and the UE 220 transition to the TTI bundle size control mode.

The UE 220 transmits a sounding RS to the eNB 210 (step S714). The eNB 210 measures the reception quality based on the sounding RS transmitted at step S714 (step S715). In the example depicted in FIG. 7, the eNB 210 is assumed to set the TTI bundle size of the UE 220 to be changed to 2 TTI, based on the reception quality measured at step S714.

The eNB 210 transmits to the UE 220, a UL grant based on the reception quality measured at step S715 (step S716). The UL grant at step S716 includes the TPC command="01". In other words, the UL grant at step S716 includes a TPC command instructing the TTI bundle size to be configured to 2 TTIs (for example, refer to FIG. 5B).

The UE 220 adjusts the TTI bundle size to 2 TTIs, based on the TPC command included in the UL grant transmitted at step S716 (step S717). The UE 220 transmits a PUSCH and PHR by a radio resource instructed by the UL grant transmitted at step S716 (step S718). Transmission of the PUSCH at step S718 is performed by TTI bundling of transmitting successively 2 times, a PUSCH representing the same data.

Transmission of the sounding RS at steps S704, S709, and S714, for example, may be transmission of a periodic sounding RS by the UE 220.

Figure 8A:
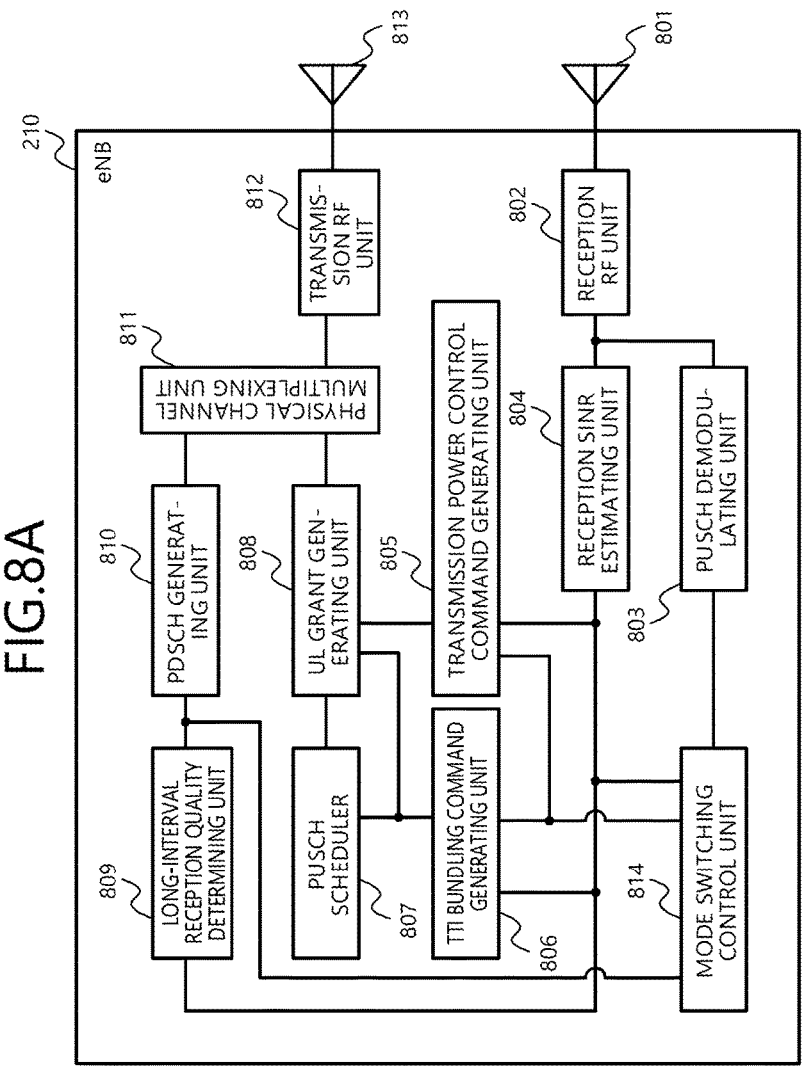
FIG. 8A is a diagram depicting one example of an eNB according to the second embodiment.

FIG. 8A is a diagram depicting one example of the eNB according to the second embodiment. FIG. 8B is a diagram depicting one example of signal flow in the eNB depicted in FIG. 8A. As depicted in FIGS. 8A and 8B, the eNB 210 according to the second embodiment includes a reception antenna 801, a reception RF unit 802, the PUSCH demodulating unit 803, and a reception SINR estimating unit 804.

The eNB 210 further includes a transmission power control command generating unit 805, a TTI bundling command generating unit 806, a PUSCH scheduler 807, a UL grant generating unit 808, a long-interval reception quality determining unit 809, and a PDSCH generating unit 810. The eNB 210 further includes a physical channel multiplexing unit 811, a transmission RF unit 812, a transmission antenna 813, and a mode switching control unit 814.

The reception antenna 801 receives an uplink signal (uplink reception signal) wirelessly transmitted from the UE 220 and outputs the received signal to the reception RF unit 802. The reception RF unit 802 performs reception RF processing of the signal output from the reception antenna 801. In the reception RF processing, for example, frequency conversion from a radio frequency (RF) bandwidth to a baseband bandwidth is included. The reception RF unit 802 outputs a signal obtained by the reception RF processing to the PUSCH demodulating unit 803 and the reception SINR estimating unit 804.

The PUSCH demodulating unit 803 demodulates the PUSCH and PHR included in the signal output from the reception RF unit 802. The PUSCH demodulating unit 803 outputs the demodulated PHR to the mode switching control unit 814.

The reception SINR estimating unit 804 estimates reception SINR based on a reference signal (e.g., a sounding RS from the UE 220) included in the signal output from the reception RF unit 802. The reception SINR estimating unit 804 outputs the estimated reception SINR to the transmission power control command generating unit 805 and the TTI bundling command generating unit 806, the long-interval reception quality determining unit 809 and the mode switching control unit 814.

The transmission power control command generating unit 805 generates a transmission power control command for the UE 220 based on the reception SINR output from the reception SINR estimating unit 804, in the transmission power control mode, based on a switching result from the mode switching control unit 814. The transmission power control command is information instructing a transmission power. The transmission power control command generating unit 805 outputs the generated transmission power control command to the UL grant generating unit 808.

The TTI bundling command generating unit 806 generates a TTI bundling command for the UE 220 based on the reception SINR output from the reception SINR estimating unit 804, in the TTI bundle size control mode, based on the switching result from the mode switching control unit 814. The TTI bundling command is information instructing a TTI bundle size. The TTI bundling command generating unit 806 outputs the generated TTI bundling command to the PUSCH scheduler 807 and the UL grant generating unit 808.

The PUSCH scheduler 807 performs scheduling of the PUSCH for the UE 220, based on the TTI bundling command output from the TTI bundling command generating unit 806. For example, the PUSCH scheduler 807 performs scheduling of assigning to the UE 220, successive subframes corresponding to the TTI bundle size indicated by the TTI bundling command. The PUSCH scheduler 807 outputs a scheduling result for the PUSCH to the UL grant generating unit 808.

The UL grant generating unit 808 generates a UL grant indicating the PUSCH scheduling result output from the PUSCH scheduler 807. The UL grant is downlink control information transmitted to the UE 220 as a Physical Downlink Control Channel (PDCCH).

The UL grant generating unit 808 stores to the UL grant as a TPC command, the TTI bundling command output from the TTI bundling command generating unit 806 or the transmission power control command output from the transmission power control command generating unit 805. The UL grant generating unit 808 transmits the UL grant storing therein the TPC command to the physical channel multiplexing unit 811.

The long-interval reception quality determining unit 809 calculates a temporal average of the reception SINR output from the reception SINR estimating unit 804, compares the calculated result with a threshold and thereby, determines the long-interval reception quality of the UE 220. The temporal average, for example, may use a movement average. The long-interval reception quality determining unit 809 outputs to the PDSCH generating unit 810 and the mode switching control unit 814, an higher layer control signal indicating enabling/disabling of TTI bundling, based on the determined long-interval reception quality. The higher layer control signal, for example, is a control signal of the radio link control (RLC) layer.

The PDSCH generating unit 810 generates a Physical Downlink Shared Channel (PDSCH) that includes the higher layer control signal output from the long-interval reception quality determining unit 809. The PDSCH generating unit 810 outputs the generated PDSCH to the physical channel multiplexing unit 811.

The physical channel multiplexing unit 811 multiplexes the UL grant (PDCCH) output from the UL grant generating unit 808 and the PDSCH output from the PDSCH generating unit 810. The physical channel multiplexing unit 811 outputs the signal obtained by the multiplexing (multiplexed signal) to the transmission RF unit 812.

The transmission RF unit 812 performs transmission RF processing of the signal output from the physical channel multiplexing unit 811. In the transmission RF processing, for example, frequency conversion from the baseband bandwidth to the RF bandwidth is included. The transmission RF unit 812 outputs to the transmission antenna 813, the signal subject to the transmission RF processing. The transmission antenna 813 wirelessly transmits to the UE 220, the signal (downlink transmission signal) output from the transmission RF unit 812.

The mode switching control unit 814 begins switching control of the TTI bundle size control mode and the transmission power control mode, when TTI bundling between the eNB 210 and the UE 220 is enabled, based on the higher layer control signal output from the long-interval reception quality determining unit 809. In particular, the mode switching control unit 814 performs switching of the modes, based on the reception SINR output from the reception SINR estimating unit 804, or the PHR output from the PUSCH demodulating unit 803. The mode switching control unit 814 outputs a switching result to the transmission power control command generating unit 805 and the TTI bundling command generating unit 806.

The transmitting unit 111 depicted in FIGS. 1A and 1B, for example, may be realized by the physical channel multiplexing unit 811, the transmission RF unit 812, and the transmission antenna 813. The control unit 112 depicted in FIGS. 1A and 1B, for example, may be realized by the transmission power control command generating unit 805, the TTI bundling command generating unit 806, the UL grant generating unit 808, the long-interval reception quality determining unit 809, and the mode switching control unit 814.

FIG. 8C is a diagram depicting one example of hardware configuration of the eNB. The eNB 210 depicted in FIGS. 8A and 8B, for example, may be realized by a communications apparatus 830 depicted in FIG. 8C. The communications apparatus 830 includes a CPU 831, memory 832, a wireless communications interface 833, and a wired communications interface 834. The CPU 831, the memory 832, the wireless communications interface 833, and the wired communications interface 834 are connected by a bus 839.

The CPU (central processing unit) 831 governs overall control of the communications apparatus 830. The memory 832, for example, includes main memory and auxiliary memory. The main memory, for example, is random access memory (RAM). The main memory is used as a work area of the CPU 831. The auxiliary memory, for example, is non-volatile memory such as a magnetic disk, an optical disk, and flash memory. The auxiliary memory stores various types of programs operating the communications apparatus 830. a program stored by the auxiliary memory is loaded onto the main memory and is executed by the CPU 831.

The wireless communications interface 833 is a communications interface that performs wireless communication with an external device (e.g., the UE 220) of the communications apparatus 830. The wireless communications interface 833 is controlled by the CPU 831.

The wired communications interface 834 is a communications interface that performs wired communication with an external device (e.g., upper level device) of the communications apparatus 830. The wired communications interface 834 is controlled by the CPU 831.

The reception antenna 801, the reception RF unit 802, the transmission RF unit 812, and the transmission antenna 813 depicted in FIGS. 8A and 8B, for example, may be realized by the wireless communications interface 833. The PUSCH demodulating unit 803, the reception SINR estimating unit 804, the transmission power control command generating unit 805, the TTI bundling command generating unit 806, and the PUSCH scheduler 807 depicted in FIGS. 8A and 8B may be realized, for example, by the CPU 831. The UL grant generating unit 808, the long-interval reception quality determining unit 809, the PDSCH generating unit 810, the physical channel multiplexing unit 811, the transmission RF unit 812, the transmission antenna 813, and the mode switching control unit 814 depicted in FIGS. 8A and 8B, for example, may be realized by the CPU 831.

Figure 9A:
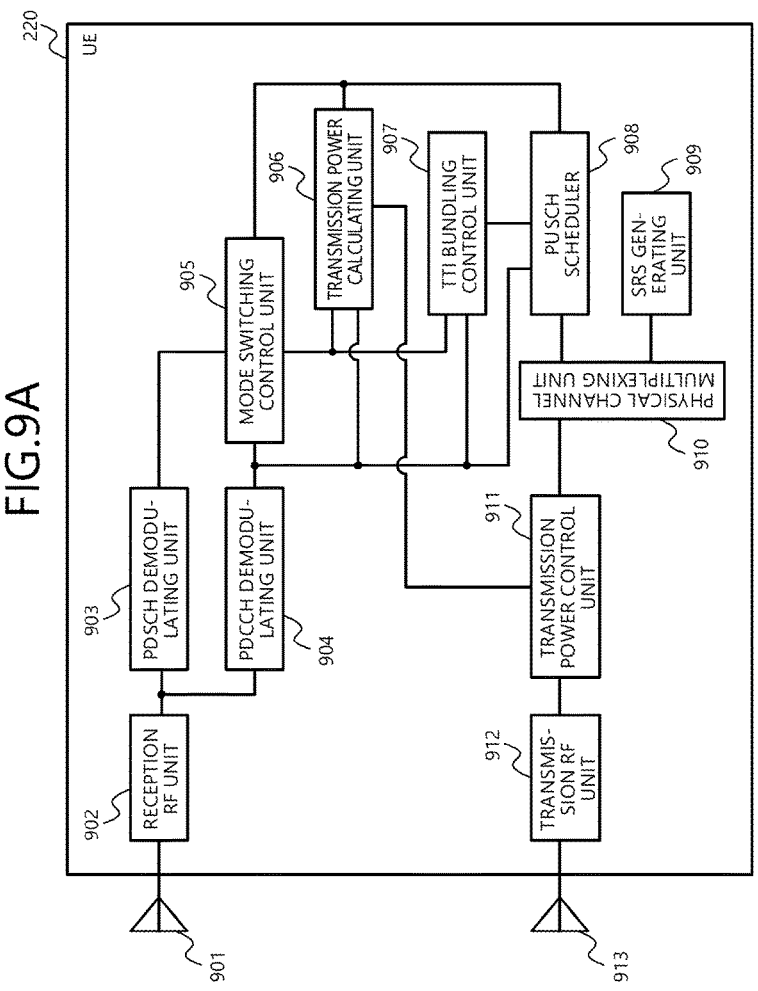
FIG. 9A is a diagram depicting one example of the UE according to the second embodiment.
Figure 9B:
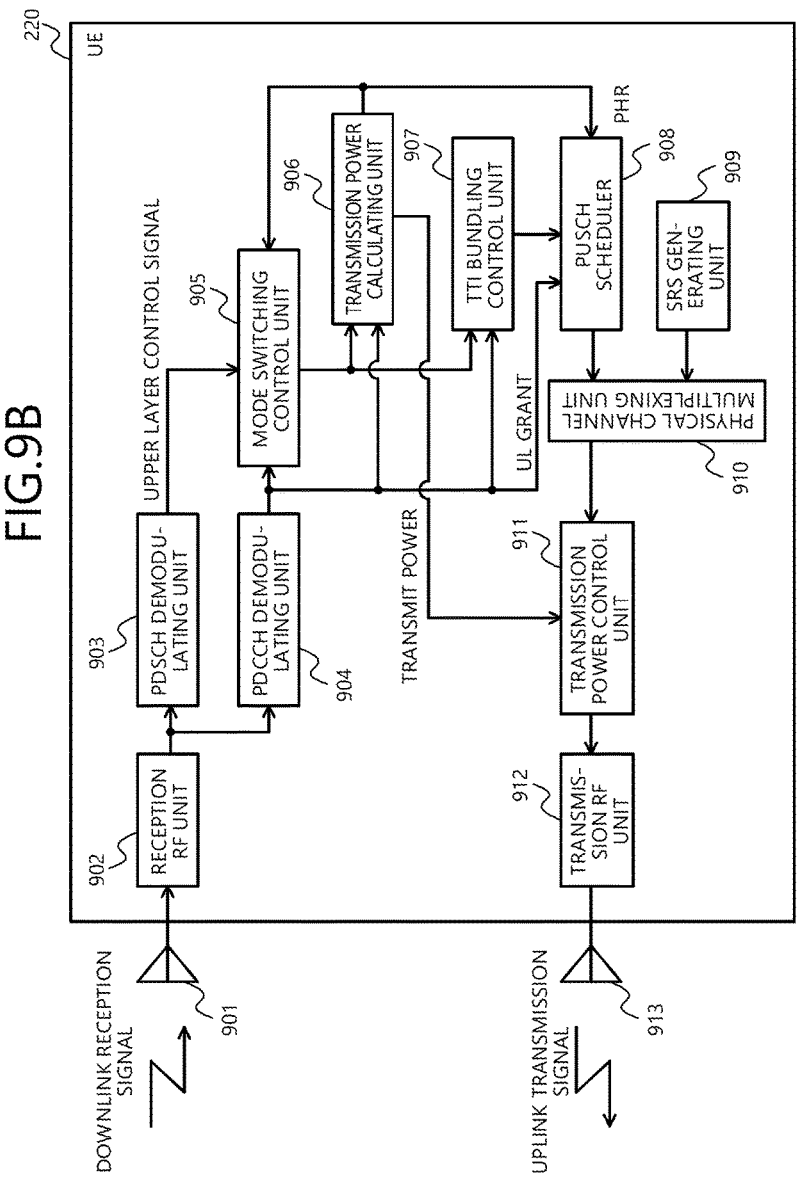
FIG. 9B is a diagram depicting one example of signal flow in the UE depicted in FIG. 9A.

FIG. 9A is a diagram depicting one example of the UE according to the second embodiment. FIG. 9B is a diagram depicting one example of signal flow in the UE depicted in FIG. 9A. As depicted in FIGS. 9A and 9B, the UE 220 according to the second embodiment includes a reception antenna 901, a reception RF unit 902, a PDSCH demodulating unit 903, a PDCCH demodulating unit 904, a mode switching control unit 905, and a transmission power calculating unit 906. The UE 220 further includes a TTI bundling control unit 907, a PUSCH scheduler 908, a SRS generating unit 909, a physical channel multiplexing unit 910, a transmission power control unit 911, a transmission RF unit 912, and a transmission antenna 913.

The reception antenna 901 receives a downlink signal (downlink reception signal) wirelessly transmitted from the eNB 210 and outputs the received signal to the reception RF unit 902. The reception RF unit 902 performs reception RF processing of the signal output from the reception antenna 901. In the reception RF processing, for example, frequency conversion from the RF bandwidth to the baseband bandwidth is included. The reception RF unit 902 outputs a signal obtained by the reception RF processing to the PDSCH demodulating unit 903 and the PDCCH demodulating unit 904.

The PDSCH demodulating unit 903 demodulates a PDSCH included in the signal output from the reception RF unit 902. The PDSCH demodulating unit 903 outputs to the mode switching control unit 905, an higher layer control signal included in the demodulated PDSCH.

The PDCCH demodulating unit 904 demodulates a PDCCH included in the signal output from the reception RF unit 902. The PDCCH demodulating unit 904 outputs the demodulated PDCCH (UL grant) to the mode switching control unit 905, the transmission power calculating unit 906, the TTI bundling control unit 907, and the PUSCH scheduler 908.

The mode switching control unit 905 begins switching control of the TTI bundle size control mode and the transmission power control mode, when TTI bundling with the eNB 210 is enabled, based on the higher layer control signal output from the PDSCH demodulating unit 903. In particular, the mode switching control unit 905 performs switching of the modes, based on the TPC command stored in a TPC region of the UL grant (PDCCH) output from the PDCCH demodulating unit 904.

The mode switching control unit 905 switches to the TTI bundle size control mode from the next transmission, when the PHR output from the transmission power calculating unit 906 is 0 or less. The mode switching control unit 905 outputs a mode switching result to the transmission power calculating unit 906 and the TTI bundling control unit 907.

The transmission power calculating unit 906 calculates the transmission power of the UE 220 for a case where the transmission power of the UE 220 is adjusted based on the UL grant output from the PDCCH demodulating unit 904, in the transmission power control mode, based on the switching result output from the mode switching control unit 905. The transmission power calculating unit 906 notifies the transmission power control unit 911 of the calculated transmission power. The transmission power calculating unit 906 outputs to the mode switching control unit 905 and the PUSCH scheduler 908, PHR based on the maximum transmission power of the UE 220 and the calculated transmission power.

The TTI bundling control unit 907 obtains a TPC command stored in the UL grant output from the PDCCH demodulating unit 904, in the TTI bundle size control mode, based on the switching result output from the mode switching control unit 905. The TTI bundling control unit 907 sets the TTI bundle size based on the obtained TPC command. The TTI bundling control unit 907 notifies the PUSCH scheduler 908 of the set TTI bundle size.

The PUSCH scheduler 908 performs scheduling of a PUSCH from the UE 220 to the eNB 210, based on the UL grant output from the PDCCH demodulating unit 904. The PUSCH scheduler 908 performs scheduling of the PUSCH such that successive transmission by the TTI bundle size output from the TTI bundling control unit 907 is performed. The PUSCH scheduler 908 outputs to the physical channel multiplexing unit 910, the PUSCH based on a scheduling result. The PUSCH scheduler 908 performs scheduling of the PHR output from the transmission power calculating unit 906, and outputs the PHR to the physical channel multiplexing unit 910, based on the scheduling result.

The SRS generating unit 909 generates and outputs to the physical channel multiplexing unit 910, a periodic sounding RS (Sounding Reference Signal).

The physical channel multiplexing unit 910 multiplexes the sounding RS output from the SRS generating unit 909 and the PHR and PUSCH output from the PUSCH scheduler 908. The physical channel multiplexing unit 910 outputs a signal obtained by the multiplexing (multiplexed signal) to the transmission power control unit 911.

The transmission power control unit 911 controls the transmission power of a signal output from the physical channel multiplexing unit 910 to become the transmission power notified by the transmission power calculating unit 906. The transmission power control unit 911 outputs the transmission power controlled signal to the transmission RF unit 912.

The transmission RF unit 912 performs transmission RF processing of the signal output from the transmission power control unit 911. In transmission RF processing, for example, frequency conversion from the baseband bandwidth to the RF bandwidth is included. The transmission RF unit 912 outputs to the transmission antenna 913, the signal subject to the transmission RF processing. The transmission antenna 913 wirelessly transmits to the eNB 210, the signal (uplink transmission signal) output from the transmission RF unit 912.

The receiving unit 121 depicted in FIGS. 1A and 1B, for example, may be realized by the reception antenna 901, the reception RF unit 902, and the PDCCH demodulating unit 904. The control unit 122 depicted in FIGS. 1A and 1B, for example, may be realized by the mode switching control unit 905, the transmission power calculating unit 906, and the TTI bundling control unit 907.

FIG. 9C is a diagram depicting one example of hardware configuration of the UE. The UE 220 depicted in FIGS. 9A and 9B, for example, may be realized by a communications apparatus 930 depicted in FIG. 9C. The communications apparatus 930 includes a CPU 931, memory 932, a user interface 933, and a wireless communications interface 934. The CPU 931, the memory 932, the user interface 933, and the wireless communications interface 934 are connected by a bus 939.

The CPU 931 governs overall control of the communications apparatus 930. The memory 932, for example, includes main memory and auxiliary memory. The main memory, for example, is RAM. The main memory is used as a work area of the CPU 931. The auxiliary memory, for example, is non-volatile memory such as a magnetic disk, flash memory, etc. The auxiliary memory stores various types of programs operating the communications apparatus 930. A program stored in the auxiliary memory is loaded onto the main memory and executed by the CPU 931.

The user interface 933, for example, includes an input device that receives operation input from a user, an output device that outputs information to the user, etc. The input device, for example, may be realized by keys (e.g., keyboard) or remote controller. The output device, for example, may be realized by a display or a speaker. Further, the input device and the output device may be realized by a touch panel or the like. The user interface 933 is controlled by the CPU 931.

The wireless communications interface 934 is a communications interface that performs wireless communication with an external device (e.g., the eNB 210) of the communications apparatus 930. The wireless communications interface 934 is controlled by the CPU 931.

The reception antenna 901, the reception RF unit 902, the transmission RF unit 912, and the transmission antenna 913 depicted in FIGS. 9A and 9B, for example, may be realized by the wireless communications interface 934. The PDSCH demodulating unit 903, the PDCCH demodulating unit 904, the mode switching control unit 905, the transmission power calculating unit 906, and the TTI bundling control unit 907 depicted in FIGS. 9A and 9B, for example, may be realized by the CPU 931. The PUSCH scheduler 908, the SRS generating unit 909, the physical channel multiplexing unit 910, and the transmission power control unit 911 depicted in FIGS. 9A and 9B, for example, may be realized by the CPU 931.

Figure 10B:
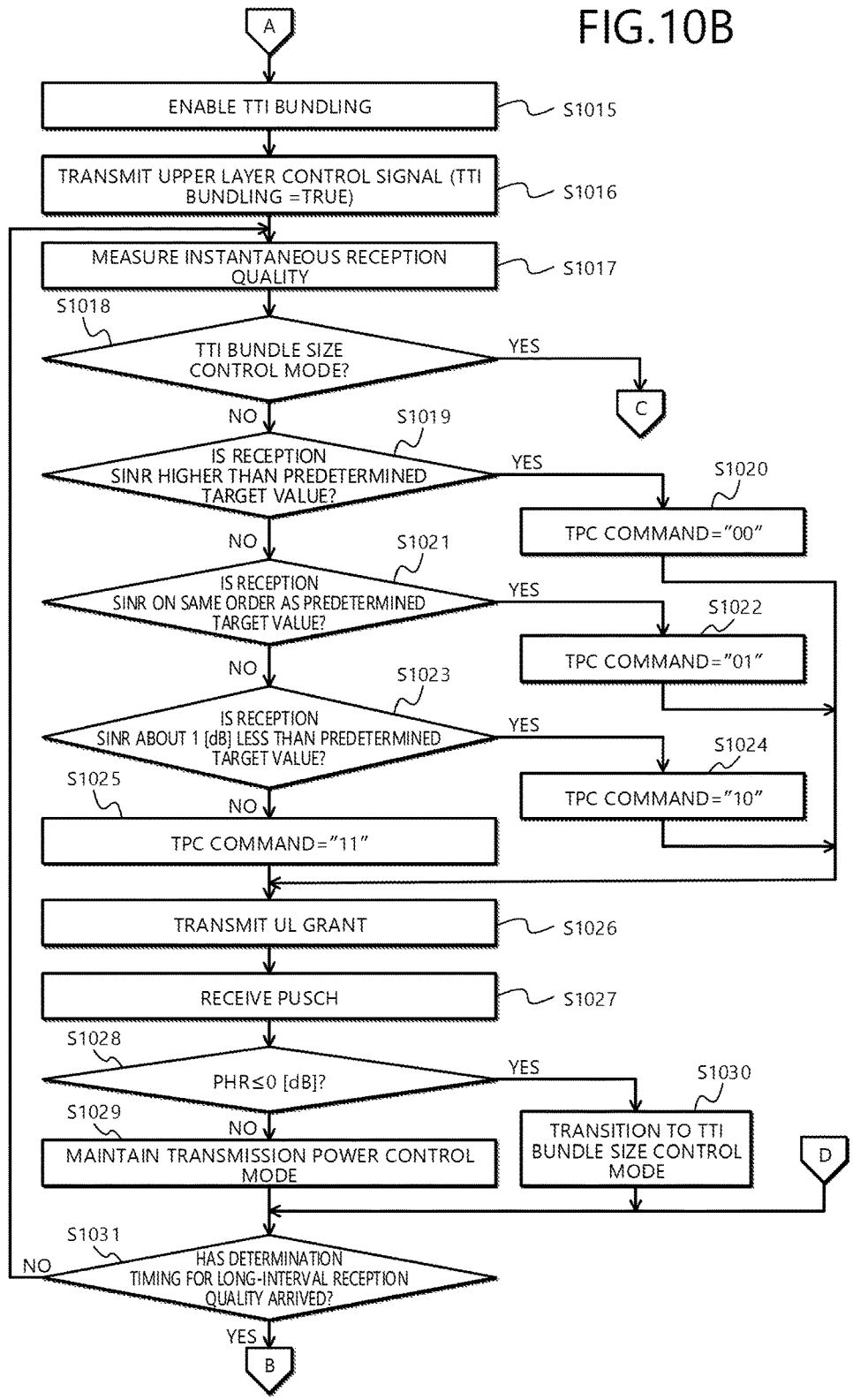
FIG. 10B is a flowchart (part 2) of an example of processing by the eNB according to the second embodiment.

FIGS. 10A, 10B, and 10C are flowcharts of an example of processing by the eNB according to the second embodiment. The eNB 210 according to the second embodiment, for example, executes the steps depicted in FIGS. 10A to 10C. The eNB 210 measures the long-interval reception quality from the UE 220 (step S1001). The long-interval reception quality, for example, is a temporal average of the reception SINR.

The eNB 210 determines based on a measurement result at step S1001, if the long-interval reception quality from the UE 220 is a default value or less (step S1002). If the reception quality is not the default value or less (step S1002: NO), the eNB 210 transmits to the UE 220, an higher layer control signal indicating that TTI bundling is to be disabled (FALSE) (step S1003).

The eNB 210 measures the instantaneous reception quality from the UE 220 (step S1004). The instantaneous reception quality, for example, is an instantaneous value of the reception SINR. The eNB 210 determines whether the reception SINR measured at step S1004 is higher than a predetermined target value (step S1005). If the reception SINR is higher than the predetermined target value (step S1005: YES), the eNB 210 configures the TPC command to be "00" (step S1006), and transitions to step S1012.

At step S1005, if the reception SINR is not higher than the predetermined target value (step S1005: NO), the eNB 210 determines whether the reception SINR measured at step S1004 is on the same order as the predetermined target value (step S1007). If the reception SINR is on the same order as the predetermined target value (step S1007: YES), the eNB 210 configures the TPC command to be "01" (step S1008), and transitions to step S1012.

At step S1007, if the reception SINR is not on the same order as the predetermined target value (step S1007: NO), the eNB 210 determines whether the reception SINR measured at step S1004 is about 1 [dB] less than the predetermined target value (step S1009). If the reception SINR is about 1 [dB] less than the predetermined target value (step S1009: YES), the eNB 210 configures the TPC command to be "10" (step S1010), and transitions to step S1012.

At step S1009, if the reception SINR is not about 1 [dB] less than the predetermined target value (step S1009: NO), i.e., the difference of the reception SINR with respect to the predetermined target value is greater than 1 [dB], the eNB 210 transitions to step S1011. In particular, the eNB 210 configures the TPC command to be "11" (step S1011), and transitions to step S1012.

The eNB 210 transmits to the UE 220, the UL grant storing the TPC command configured at the steps S1005 to S1011 (step S1012). The eNB 210 receives a PUSCH from the UE 220, by a radio resource instructed by the UL grant transmitted at step S1012 (step S1013).

The eNB 210 determines whether the determination timing for the long-interval reception quality has arrived (step S1014). The determination timing for the reception quality, for example, is a periodic timing. If the determination timing has not arrived (step S1014: NO), the eNB 210 returns to step S1004. If the determination timing has arrived (step S1014: YES), the eNB 210 returns to step S1001.

At step S1002, if the long-interval reception quality is the default value or less (step S1002: YES), the eNB 210 enables TTI bundling with the UE 220 (step S1015). The eNB 210 transmits to the UE 220, an higher layer control signal indicating that TTI bundling is to be enabled (TRUE) (step S1016). The eNB 210 measures the instantaneous reception quality from the UE 220 (step S1017).

The eNB 210 determines whether the current mode is the TTI bundle size control mode (step S1018). If the current mode is the transmission power control mode and not the TTI bundle size control mode (step S1018: NO), the eNB 210 transitions to step S1019. Steps S1019 to S1027 are identical to steps S1005 to S1013.

At step S1027, the eNB 210 determines if the PHR from the UE 220 is 0 [dB] or less (step S1028). If the PHR is not 0 [dB] or less (step S1028: NO), the eNB 210 maintains the transmission power control mode (step S1029), and transitions to step S1031. If the PHR is 0 [dB] or less (step S1028: YES), the eNB 210 transitions to the TTI bundle size control mode (step S1030), and transitions to step S1031.

The eNB 210 determines whether the determination timing for the long-interval reception quality has arrived (step S1031). If the determination timing has not arrived (step S1031: NO), the eNB 210 returns to step S1017. If the determination timing has arrived (step S1031: YES), the eNB 210 returns to step S1001.

At step S1018, if the current mode is the TTI bundle size control mode (step S1018: YES), the eNB 210 transitions to step S1032. In other words, the eNB 210 sets the TTI bundle size adjustment amount of the UE 220, based on the difference of the reception SINR measured at step S1017 and the predetermined target value (step S1032).

The eNB 210 determines if the TTI bundle size of the UE 220 after adjustment based on the adjustment amount set at step S1032 is 1 or less (step S1033). If the TTI bundle size after adjustment is 1 or less (step S1033: YES), the eNB 210 configures the TPC command to be "00" (step S1034), and transitions to step S1040.

At step S1033, if the TTI bundle size after adjustment is not 1 or less (step S1033: NO), the eNB 210 determines whether the TTI bundle size after adjustment is 2 (step S1035). If the TTI bundle size after adjustment is 2 (step S1035: YES), the eNB 210 configures the TPC command to be "01" (step S1036), and transitions to step S1040.

At step S1035, if the TTI bundle size after adjustment is not 2 (step S1035: NO), the eNB 210 determines whether the TTI bundle size after adjustment is 4 (step S1037). If the TTI bundle size after adjustment is 4 (step S1037: YES), the eNB 210 configures the TPC command to be "10" (step S1038), and transitions to step S1040.

At step S1037, if the TTI bundle size after adjustment is not 4 (step S1037: NO), the eNB 210 configures the TPC command to be "11" (step S1039), and transitions to step S1040.

The eNB 210 transmits to the UE 220, the UL grant storing the TPC command configured by steps S1033 to S1039 (step S1040). The eNB 210 receives a PUSCH from the UE 220, by a radio resource instructed by the UL grant transmitted at step S1040 (step S1041). The eNB 210 determines whether the TPC command configured by steps S1033 to S1039 is "00" (step S1042).

At step S1042, if the TPC command is not "00" (step S1042: NO), the eNB 210 maintains the TTI bundle size control mode (step S1043), and transitions to step S1031. If the TPC command is "00" (step S1042: YES), the eNB 210 transitions to the transmission power control mode (step S1044), and transitions to step S1031.

Figure 11A:
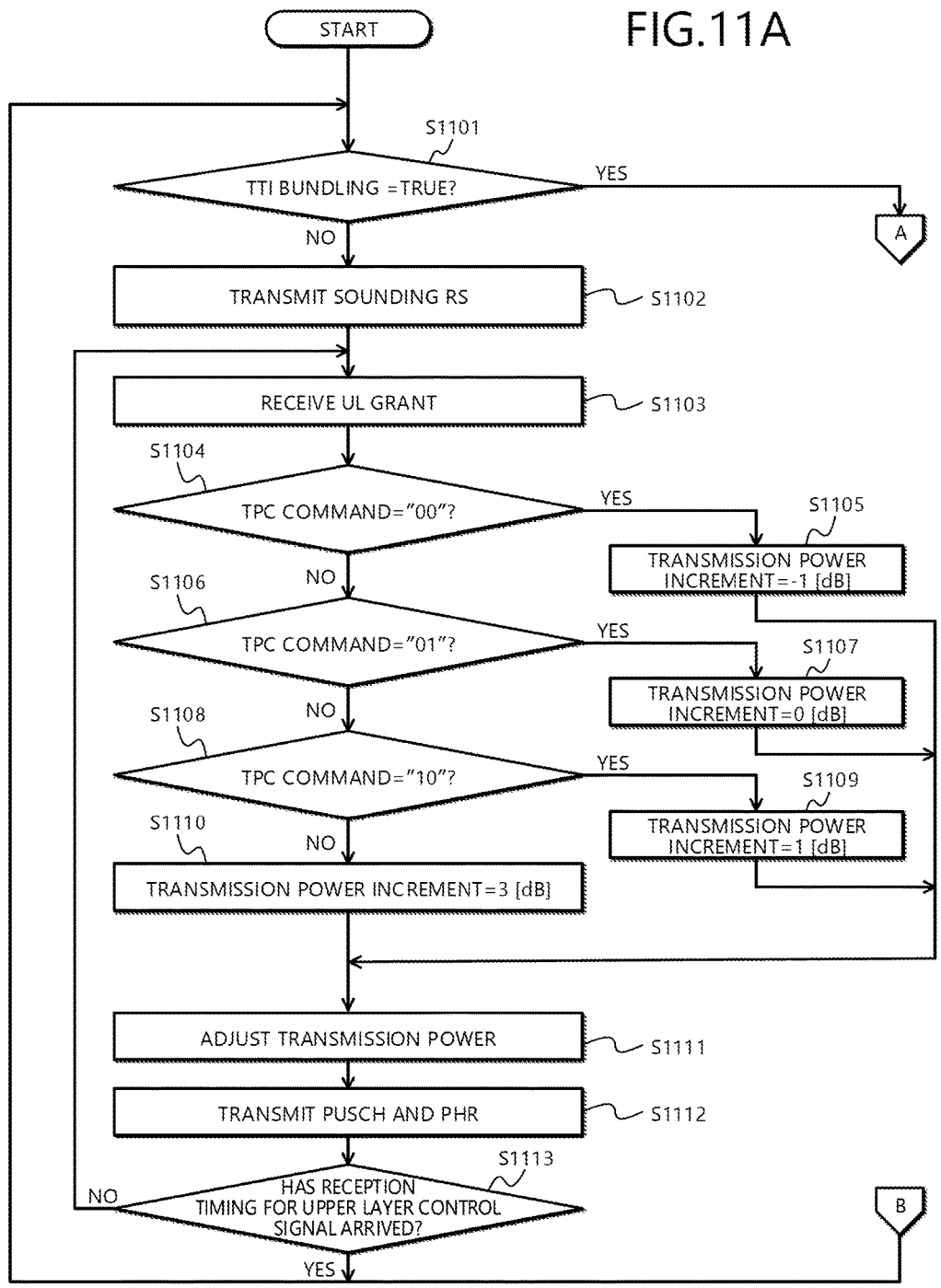
FIG. 11A is a flowchart (part 1) of an example of processing by the UE according to the second embodiment.

FIGS. 11A, 11B, and 11C are flowcharts of an example of processing by the UE according to the second embodiment. The UE 220 according to the second embodiment, for example, executes the steps depicted in FIGS. 11A to 11C. The UE 220 determines whether TTI bundling with the eNB 210 is enabled (TRUE) (step S1101). The determination at step S1101 may be performed based on an higher layer control signal received from the eNB 210.

At step S1101, if TTI bundling is not enabled (step S1101: NO), the UE 220 transmits a sounding RS to the eNB 210 (step S1102). The UE 220 receives a UL grant from the eNB 210 (step S1103).

The UE 220 determines whether the TPC command stored in the UL grant received at step S1103 is "00" (step S1104). If the TPC command is "00" (step S1104: YES), the UE 220 determines that the transmission power increment is −1 [dB] (step S1105), and transitions to step S1111.

At step S1104, if the TPC command is not "00" (step S1104: NO), the UE 220 determines whether the TPC command is "01" (step S1106). If the TPC command is "01" (step S1106: YES), the UE 220 determines that the transmission power increment is 0 [dB] (step S1107), and transitions to step S1111.

At step S1106, if the TPC command is not "01" (step S1106: NO), the UE 220 determines whether the TPC command is "10" (step S1108). If the TPC command is "10" (step S1108: YES), the UE 220 determines that the transmission power increment is 1 [dB] (step S1109), and transitions to step S1111.

At step S1108, if the TPC command is not "10" (step S1108: NO), the UE 220 determines whether the transmission power increment is 3 [dB] (step S1110), and transitions to step S1111.

The UE 220 adjusts the transmission power of the UE 220 based on the transmission power increment determined at steps S1104 to S1110 (step S1111). The UE 220 transmits a PUSCH and PHR to the eNB 210, by the transmission power adjusted at step S1111, at a radio resource indicated by the UL grant received at step S1103 (step S1112).

The UE 220 determines whether a reception timing for an higher layer control signal has arrived (step S1113). The reception timing for an higher layer control signal, for example, is periodic timing. If the reception timing for an higher layer control signal has not arrived (step S1113: NO), the UE 220 returns to step S1103. If the reception timing for an higher layer control signal has arrived (step S1113: YES), the UE 220 returns to step S1101.

At step S1101, if TTI bundling is enabled (step S1101: YES), the UE 220 internally enables TTI bundling (step S1114). The UE 220 transmits a sounding RS to the eNB 210 (step S1115). The UE 220 receives a UL grant from the eNB 210 (step S1116).

The UE 220 determines whether the current mode is the TTI bundle size control mode (step S1117). If the current mode is the transmission power control mode and not the TTI bundle size control mode (step S1117: NO), the UE 220 transitions to step S1118. Steps S1118 to S1125 are identical to steps S1104 to S1111.

After step S1125, the UE 220 determines if the PHR at the UE 220 is 0 [dB] or less (step S1126). If the PHR is not 0 [dB] or less (step S1126: NO), the UE 220 maintains the transmission power control mode (step S1127), and transitions to step S1129. If the PHR is 0 [dB] or less (step S1126: YES), the UE 220 transitions to the TTI bundle size control mode (step S1128), and transitions to step S1129.

The UE 220 transmits a PUSCH and PHR to the eNB 210, by the transmission power adjusted at step S1125, at a radio resource indicated by the UL grant received at step S1116 (step S1129). The UE 220 determines whether the reception timing for an higher layer control signal has arrived (step S1130). If the reception timing for an higher layer control signal has not arrived (step S1130: NO), the UE 220 returns to step S1116. If the reception timing for an higher layer control signal has arrived (step S1130: YES), the UE 220 returns to step S1101.

At step S1117, if the current mode is the TTI bundle size control mode (step S1117: YES), the UE 220 determines whether the TPC command stored in the UL grant received at step S1116 is "00" (step S1131). If the TPC command is "00" (step S1131: YES), the UE 220 determines that the TTI bundle size is 1 (step S1132), and transitions to step S1138.

At step S1131, if the TPC command is not "00" (step S1131: NO), the UE 220 determines whether the TPC command is "01" (step S1133). If the TPC command is "01" (step S1133: YES), the UE 220 determines that the TTI bundle size is 2 (step S1134), and transitions to step S1138.

At step S1133, if the TPC command is not "01" (step S1133: NO), the UE 220 determines whether the TPC command is "10" (step S1135). If the TPC command is "10" (step S1135: YES), the UE 220 determines that the TTI bundle size is 4 (step S1136), and transitions to step S1138.

At step S1135, if the TPC command is not "10" (step S1135: NO), the UE 220 determines that the TTI bundle size is 8 (step S1137), and transitions to step S1138.

The UE 220 adjusts the TTI bundle size by the TTI bundle size determined at steps S1131 to S1137 (step S1138). The UE 220 determines whether the TPC command stored in the UL grant received at step S1116 is "00" (step S1139).

At step S1139, if the TPC command is not "00" (step S1139: NO), the UE 220 maintains the TTI bundle size control mode (step S1140), and transitions to step S1129. If the TPC command is "00" (step S1139: YES), the UE 220 transitions to the transmission power control mode (step S1141), and transitions to step S1129.

FIGS. 12A and 12B are diagrams depicting another example of changing of the TTI bundle size. In FIGS. 12A and 12B, the horizontal axis represents time (subframe). In the example depicted in FIG. 12A, at a new transmission 1201, the UE 220 performs TTI bundling (TTI bundle size=4 TTIs) of transmitting to the eNB 210 successively 4 times, packets representing new data that are the same. The UE 220 performs at retransmissions 1202, 1203, and 1204 concerning the new transmission 1201, TTI bundling (TTI bundle size=4 TTIs) of transmitting to the eNB 210 successively 4 times, packets representing retransmitted data that is the same as that at the new transmission 1201.

In the example depicted in FIG. 12B, at the new transmission 1201, the UE 220 performs TTI bundling (TTI bundle size=8 TTIs) of transmitting to the eNB 210 successively 8 times, packets representing new data that are the same. At retransmissions 1202, 1203, and 1204 concerning the new transmission 1201, the UE 220 performs TTI bundling (TTI bundle size=4 TTIs) of transmitting to the eNB 210 successively 4 times, packets representing retransmitted data that is the same as that at the new transmission 1201.

Under Alt.6.1 of LTE described later, as depicted in FIGS. 12A and 12B, use of TTI bundle sizes differing at a new transmission and retransmission is under consideration. Changing of the TTI bundle size described above is applicable to changing the TTI bundle size of a new transmission in a case of using TTI bundle sizes that differ at the new transmission and retransmission.

For example, the eNB 210 switches the TTI bundle size of a new transmission of the UE 220 to 4 TTIs and to 8 TTIs and thereby, enables switching of the states depicted in FIGS. 12A and 12B. In this manner, configuration may be such that the UE 220 adjusts the TTI bundle size of data for a new transmission among a new transmission and retransmissions. Further, here, although a case where the TTI bundle size of a new transmission is changed among the new transmission and retransmissions, changing of the TTI bundle size of retransmission is identical.

In this manner, according to the second embodiment, a TPC command of a UL grant used in controlling the transmission power of the UE 220 may be used to give notification of the TTI bundle size of the UE 220. As a result, the TTI bundle size of the UE 220 may be made variable and increases in the overhead of control information accompanying notification of the TTI bundle size from the eNB 210 to the UE 220 may be suppressed.

In a third embodiment, portions differing from those of the second embodiment will be described.

FIGS. 13A and 13B are diagrams depicting examples of changing of the RTT. In FIGS. 13A and 13B, the horizontal axis represents time (subframe). In the example depicted in FIGS. 13A and 13B, at a new transmission 1301, the UE 220 performs TTI bundling (TTI bundle size=4 TTIs) of transmitting to the eNB 210 successively 4 times, packets representing new data that are the same. Further, at retransmissions 1302 to 1305, the UE 220 retransmits successively 4 times, packets representing retransmitted data that is the same as that at the new transmission 1301.

In the example depicted in FIG. 13A, the RTT until the retransmissions is configured to be 16 [ms] (16 subframes). In the example depicted in FIG. 13B, the RTT until the retransmission is configured to be 12 [ms] (12 subframes). Further, in the example depicted in FIGS. 13A and 13B, allowed delay is 52 [ms].

Under Alt.1 of LTE described later, as depicted in FIG. 13B, shortening of the RTT from the current 16 [ms] to 12 [ms] is under consideration. In this regard, in the wireless communications system 200 according to the third embodiment, the RTT is made variable.

To do this, the eNB 210 uses a control signal to notify the UE 220 of the RTT. Here, the eNB 210, for example, uses a TPC command stored in the UL grant to notify the UE 220 of the RTT. The UE 220 adjusts the RTT, based on the TPC command stored in the UL grant received from the eNB 210.

For example when TTI bundling between the eNB 210 and the UE 220 has been enabled by the control of an higher layer, the eNB 210 and the UE 220 enter a state enabling switching to the transmission power control mode and a TTI bundle size/RTT control mode.

For example, in the transmission power control mode, the UE 220 fixes the RTT of the UE 220 to 8 [ms] (minimum value). The eNB 210 uses the TPC command to notify the UE 220 of the transmission power. The UE 220 adjusts the transmission power of the UE 220, based on the TPC command.

On the other hand, in the TTI bundle size/RTT control mode, the UE 220 fixes the transmission power of the UE 220 to a maximum value. The eNB 210 uses the TPC command to notify the UE 220 of the RTT. The UE 220 adjusts the RTT of the UE 220, based on the TPC command.

In this manner, switching the transmission power control mode of fixing the RTT and the TTI bundle size/RTT control mode of fixing the transmission power enables the TPC command for controlling the transmission power to be further used to control the RTT. As a result, increases in the overhead of control information when the RTT of the UE 220 is made variable may be suppressed. Therefore, the RTT may be controlled according to wireless channel fluctuations and increases in the overhead of control information may be suppressed.

FIG. 13C is a diagram depicting one example of the total energy of transmitted packets per unit time. In a unit time N', the total energy of packets transmitted by a new transmission or retransmission, for example, is as indicated by a table 1330 in FIG. 13C.

For example, as indicated by (a) in the table 1330, when the TTI bundle size is 1 and the RTT is 8 [ms], the total energy of packets in a unit time N' is 3N'/24=N. Here, N is defined as a unit energy for simplicity. Further, as indicated by (b) in the table 1330, when the TTI bundle size is 4 and the RTT is 16 [ms], the total energy of packets in a unit time N' is 6N'/24=2N, two times that of (a).

As indicated by (c) in the table 1330, when the TTI bundle size is 4 and the RTT is 12 [ms], the total energy of packets in a unit time N' is 8N'/24=2.67N, 2.67 times that of (a). As indicated by (d) in the table 1330, when the TTI bundle size is 4 and the RTT is 8 [ms], the total energy of packets in a unit time N' is 12N'/24=4N, four times that of (a).

FIG. 14A is a diagram depicting a first example of a UL grant bitmap in the transmission power control mode. A table 1410 depicted in FIG. 14A indicates a correspondence relation of a TPC command and contents notified by the TPC command, in the transmission power control mode.

For example, a TPC command="00" in the transmission power control mode indicates transition to the TTI bundle size/RTT control mode. A TPC command="01" in the transmission power control mode indicates that the TTI bundle size is to be maintained at 1, the RTT is to be maintained at 8, and a transmission power increment is to be −1 [dB].

A TPC command="10" in the transmission power control mode indicates that the TTI bundle size is to be maintained at 1, the RTT is to be maintained at 8, and the transmission power increment is to be 0 [dB] (no change). A TPC command="11" in the transmission power control mode indicates that the TTI bundle size is to be maintained at 1, the RTT is to be maintained at 8, and the transmission power increment is to be 1 [dB].

FIG. 14B is a diagram depicting the first example of a UL grant bitmap in the TTI bundle size/RTT control mode. A table 1420 depicted in FIG. 14B indicates a correspondence relation of a TPC command and contents notified by the TPC command, in the TTI bundle size/RTT control mode.

For example, a TPC command="00" in the TTI bundle size/RTT control mode indicates that the TTI bundle size is to be 1, the RTT is to be 8, and indicates transition to the transmission power control mode. A TPC command="01" in the TTI bundle size/RTT control mode indicates that the TTI bundle size is to be 4 and the RTT is to 16.

A TPC command="10" in the TTI bundle size/RTT control mode indicates that the TTI bundle size is to be 4 and the RTT is to be 12. A TPC command="11" in the TTI bundle size/RTT control mode indicates that the TTI bundle size is to be 4 and the RTT is to be 8.

FIG. 15A is a diagram depicting a second example of a UL grant bitmap in the transmission power control mode. A table 1510 depicted in FIG. 15A indicates a correspondence relation of a TPC command and contents notified by the TPC command, in the transmission power control mode.

For example, a TPC command="00" in the transmission power control mode indicates that the TTI bundle size is to be maintained at 1, the RTT is to be maintained at 8, and the transmission power increment is to be −1 [dB]. A TPC command="01" in the transmission power control mode indicates that the TTI bundle size is to be maintained at 1, the RTT is to be maintained at 8, and the transmission power increment is to be 0 [dB].

A TPC command="10" in the transmission power control mode indicates that the TTI bundle size is to be maintained at 1, the RTT is to be maintained at 8, and the transmission power increment is to be 1 [dB]. A TPC command="11" in the transmission power control mode indicates that the TTI bundle size is to be maintained at 1, the RTT is to be maintained at 8, and the transmission power increment is to be 3 [dB].

In this manner, transition to the TTI bundle size/RTT control mode need not be explicitly notified by a TPC command. In this case, the eNB 210 and the UE 220, for example, may determine transition to the TTI bundle size/RTT control mode, based on PHR. As a result, since the type of transmission power increment that can be instructed by a TPC command increases, more flexible control of the transmission power of the UE 220 becomes possible.

For example, the eNB 210 transitions to the TTI bundle size/RTT control mode, when the PHR received from the UE 220 is 0 or less. Further, the UE 220 transitions to the TTI bundle size/RTT control mode, when the PHR transmitted to the eNB 210 is 0 or less. As a result, when the transmission power of the UE 220 reaches the maximum value in the transmission power control mode, the TTI bundle size/RTT control mode may be transitioned to.

FIG. 15B is a diagram depicting the second example of a UL grant bitmap in the TTI bundle size/RTT control mode. A table 1520 depicted in FIG. 15B indicates a correspondence relation of a TPC command and contents notified by the TPC command, in the TTI bundle size/RTT control mode, i.e., when the transmission power of the UE 220 reaches the maximum value (at a time of maximum transmission power). The table 1520 depicted in FIG. 15B, for example, may be the same as the table 1420 depicted in FIG. 14B. Hereinafter, in the third embodiment, a case where the UL grant bitmap (second example) depicted in FIGS. 15A and 15B is used will be described.

The transmission power control command setting method in the transmission power control mode, for example, is identical to the transmission power control command setting method depicted in FIG. 6A.

FIGS. 16A and 16B are diagrams depicting examples of the transmission power control command setting method in the TTI bundle size/RTT control mode. A table 1610 depicted in FIG. 16A indicates a correspondence relation of the total energy of transmitted packets per unit time selected by the eNB 210 and a condition related to the difference Diff from the targeted value for the measured value of reception SINR, in the TTI bundle size/RTT control mode.

For example, when Diff>4.5 [dB], the eNB 210 selects ¼ times as the adjustment amount of the total energy of transmitted packets per unit time. When 4.5 [dB]≥Diff>1.5 [dB], the eNB 210 selects ½ times as the adjustment amount of the total energy of transmitted packets per unit time.

When 1.5 [dB]≥Diff>−1.5 [dB], the eNB 210 selects 1 time (no change) as the adjustment amount of the total energy of transmitted packets per unit time. When −1.5 [dB]≥Diff>−4.5 [dB], the eNB 210 selects 2 times as the adjustment amount of the total energy of transmitted packets per unit time. When −4.5 [dB]≥Diff, the eNB 210 selects 4 times as the adjustment amount of the total energy of transmitted packets per unit time.

A table 1620 depicted in FIG. 16B indicates a correspondence relation of the TPC command selected by the eNB 210 and the adjustment result of the total energy of transmitted packets per unit time based on the selected adjustment amount for the total energy of transmitted packets per unit time, in the TTI bundle size/RTT control mode. For example, when the adjustment result<1.5 N, the eNB 210 selects a TPC command="00" indicating the TTI bundle size=1, RTT=8, and transition to the transmission power control mode.

When 2.33 N>the adjustment result≥1.5 N, the eNB 210 selects a TPC command="01" indicating the TTI bundle size=4 and RTT=16. When 3.33 N>the adjustment result≥2.3 3N, the eNB 210 selects a TPC command="10" indicating the TTI bundle size=4 and RTT=12. When the adjustment result≥3.33 N, the eNB 210 selects a TPC command="11" indicating the TTI bundle size=4 and RTT=8.

FIG. 17 is a sequence diagram depicting one example of operation of the wireless communications system according to the third embodiment. In the wireless communications system 200 according to the third embodiment, for example, the following steps are performed.

The eNB 210 enables TTI bundling with the UE 220 (step S1701). The eNB 210 transmits to the UE 220, an higher layer control signal (TTI bundling=TRUE) instructing TTI bundling to be enabled (step S1702).

The UE 220 enables TTI bundling with the eNB 210 (step S1703). In the example depicted in FIG. 17, the eNB 210 and the UE 220, which have enable TTI bundling, are assumed to be in the TTI bundle size/RTT control mode as an initial mode.

The UE 220 transmits a sounding RS to the eNB 210 (step S1704). The eNB 210 measures the reception quality based on the sounding RS transmitted at step S1704. The reception quality, for example, is the reception SINR. In the example depicted in FIG. 17, the eNB 210 is assumed to set the RTT of the UE 220 to be changed to 8 [ms] and transition to the transmission power control mode, based on the reception quality measured at step S1705.

The eNB 210 transmits to the UE 220, a UL grant based on the reception quality measured at step S1705 (step S1706). The UL grant at step S1706 includes the TPC command="00". In other words, the UL grant at step S1706 includes a TPC command instructing the RTT to be configured to 8 [ms] and transition to the transmission power control mode (for example, refer to FIG. 15B).

The UE 220 adjusts the TTI bundle size of the UE 220 to 1 TTI and the RTT to 8 [ms], based on the TPC command included in the UL grant transmitted at step S1706 (step S1707). The UE 220 transmits a PUSCH and PHR by a radio resource instructed by the UL grant transmitted at step S1706 (step S1708). Transmission of the PUSCH at step S1708 is performed by TTI bundling of transmitting the PUSCH one time.

Consequent to step S1706, the eNB 210 and the UE 220 transition to the transmission power control mode.

The UE 220 transmits a sounding RS to the eNB 210 (step S1709). The eNB 210 measures the reception quality based on the sounding RS transmitted at step S1709 (step S1710). In the example depicted in FIG. 17, the eNB 210 sets the transmission power of the UE 220 to be increased 3 [dB] based on the reception quality measured at step S1710.

The eNB 210 transmits to the UE 220, a UL grant based on the reception quality measured at step S1710 (step S1711). The UL grant at step S1711 includes the TPC command="11". In other words, the UL grant at step S1711 includes a TPC command instructing the transmission power to be increased 3 [dB] (for example, refer to FIG. 15A).

The UE 220 performs adjustment such that the transmission power increases 3 [dB], based on the TPC command included in the UL grant transmitted at step S1711 (step S1712). Consequent to step S1712, the transmission power of the UE 220 is assumed to reach the maximum transmission power. Therefore, the PHR of the UE 220 becomes 0 or less.

The UE 220 transmits a PUSCH and PHR by a radio resource instructed by the UL grant transmitted at step S1711 (step S1713). Transmission of the PUSCH at step S1713 is performed by TTI bundling of transmitting the PUSCH one time.

Consequent to the PHR of the UE 220 becoming 0 [dB] or less, the eNB 210 and the UE 220 transition to the TTI bundle size/RTT control mode.

The UE 220 transmits a sounding RS to the eNB 210 (step S1714). The eNB 210 measures the reception quality based on the sounding RS transmitted at step S1714 (step S1715). In the example depicted in FIG. 17, the eNB 210 is assumed to set the RTT of the UE 220 to be changed to 16 [ms], based on the reception quality measured at step S1714.

The eNB 210 transmits to the UE 220, a UL grant based on the reception quality measured at step S1715 (step S1716). The UL grant at step S1716 includes the TPC command="01". In other words, the UL grant at step S1716 includes a TPC command instructing the TTI bundle size to be configured to 4 and the RTT to be configured to 16 [ms] (for example, refer to FIG. 15B).

The UE 220 adjusts the TTI bundle size to 4 TTIs and the RTT to 16 [ms], based on the TPC command included in the UL grant transmitted at step S1716 (step S1717). The UE 220 transmits a PUSCH and PHR by a radio resource instructed by the UL grant transmitted at step S1716 (step S1718). Transmission of the PUSCH at step S1718 is performed by TTI bundling of transmitting successively for 4 TTIs, a PUSCH representing the same data.

Transmission of the sounding RS at steps S1704, S1709, and S1714, for example, may be transmission of a periodic sounding RS by the UE 220.

Figure 18A:
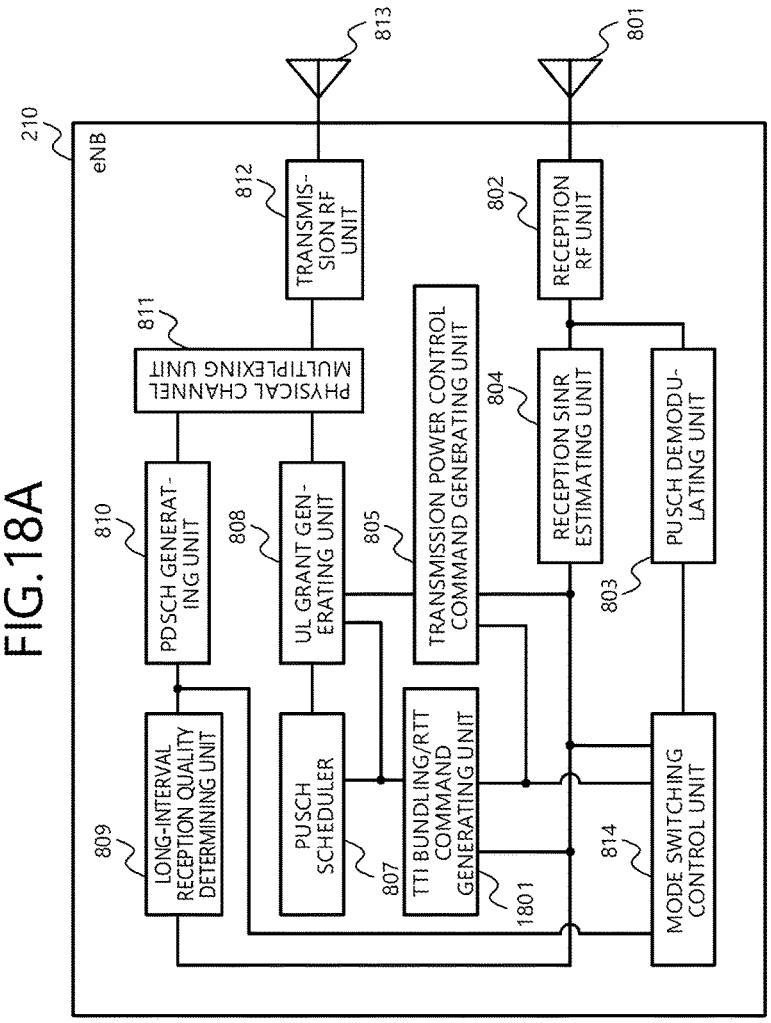
FIG. 18A is a diagram depicting one example of the eNB according to the third embodiment.

FIG. 18A is a diagram depicting one example of the eNB according to the third embodiment. FIG. 18B is a diagram depicting one example of signal flow in the eNB depicted in FIG. 18A. In FIGS. 18A and 18B, portions identical to those depicted in FIGS. 8A and 8B will be given the same reference numerals used in FIGS. 8A and 8B and description thereof will be omitted. As depicted in FIGS. 18A and 18B, the eNB 210 according to the third embodiment includes a TTI bundling/RTT command generating unit 1801 in place of the TTI bundling command generating unit 806 depicted in FIGS. 8A and 8B. The TTI bundling/RTT command generating unit 1801, for example, may be realized by the CPU 831 depicted in FIG. 8C.

The TTI bundling/RTT command generating unit 1801 obtains the reception SINR output from the reception SINR estimating unit 804, in the TTI bundle size/RTT control mode, based on the switching result from the mode switching control unit 814. The TTI bundling/RTT command generating unit 1801 generates a TTI bundling/RTT command for the UE 220 based on the obtained reception SINR. The TTI bundling command is information instructing a TTI bundle size and a RTT. The TTI bundling/RTT command generating unit 1801 outputs the generated TTI bundling/RTT command to the PUSCH scheduler 807 and the UL grant generating unit 808.

The mode switching control unit 814 begins switching control of the TTI bundle size/RTT control mode and the transmission power control mode, when TTI bundling between the eNB 210 and the UE 220 is enabled.

The control unit 112 depicted in FIGS. 1A and 1B, for example, may be realized by the transmission power control command generating unit 805, the TTI bundling/RTT command generating unit 1801, the UL grant generating unit 808, the long-interval reception quality determining unit 809, and the mode switching control unit 814.

Figure 19A:
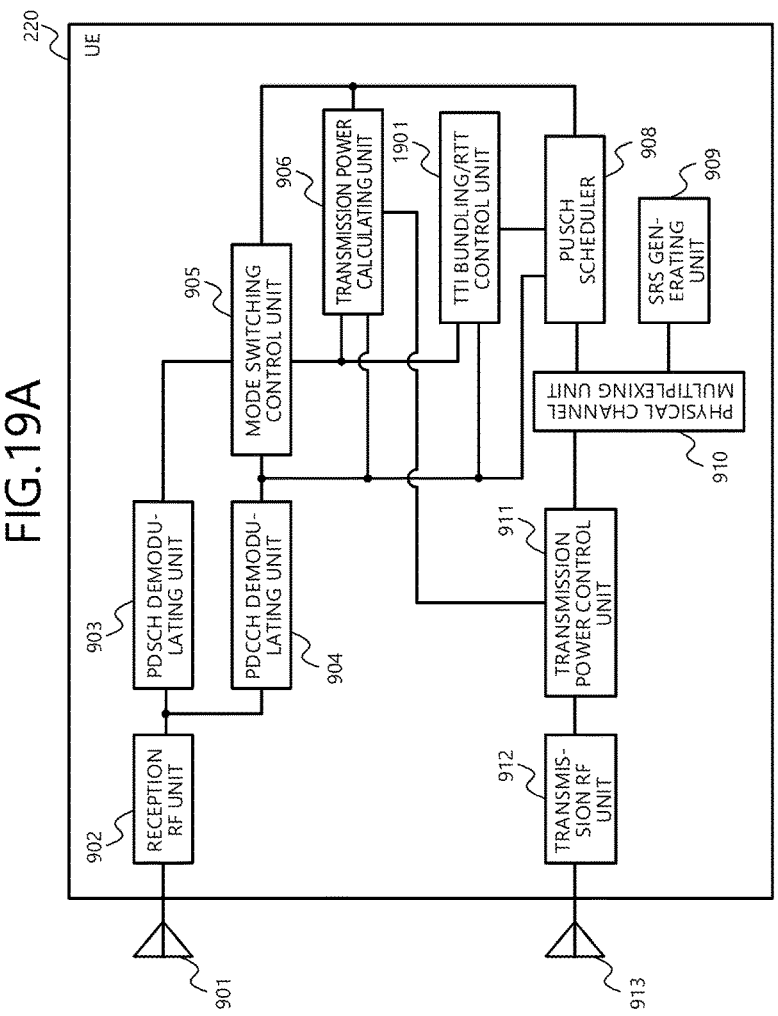
FIG. 19A is a diagram depicting one example of the UE according to the third embodiment.
Figure 19B:
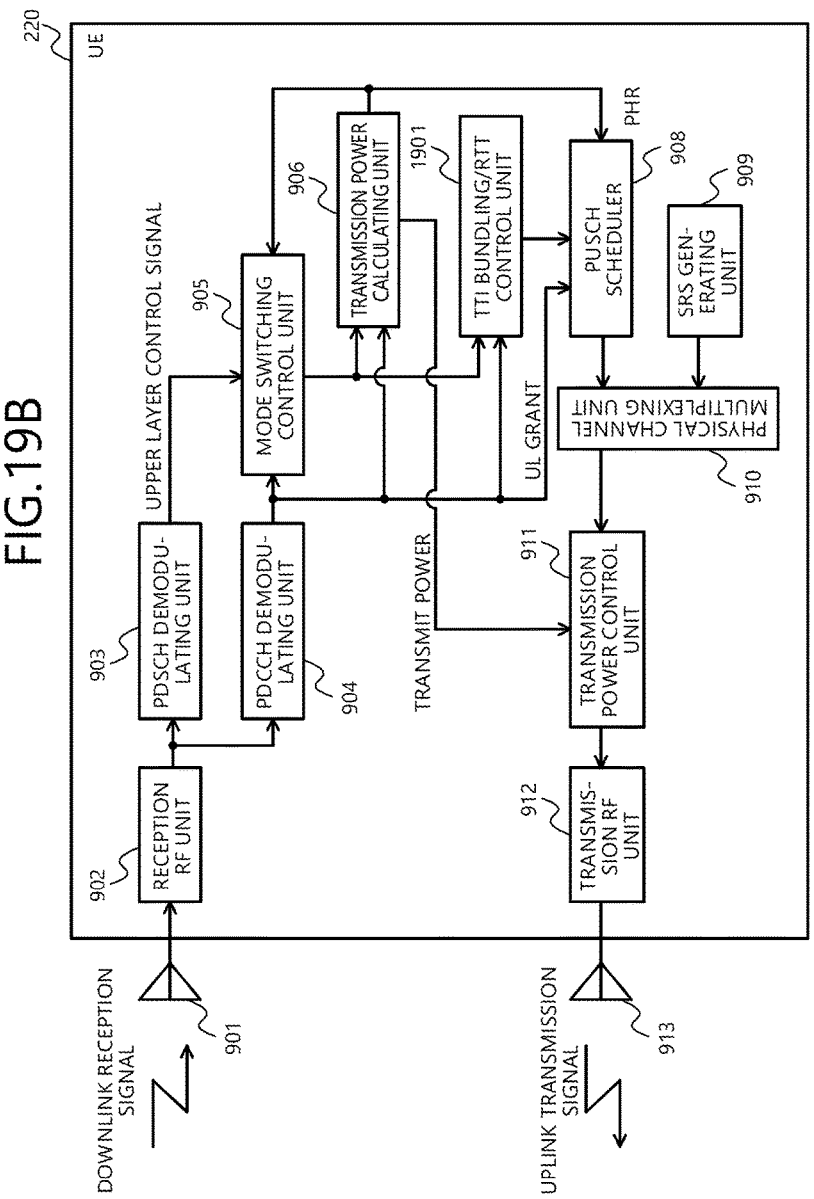
FIG. 19B is a diagram depicting one example of signal flow in the UE depicted in FIG. 19A.

FIG. 19A is a diagram depicting one example of the UE according to the third embodiment. FIG. 19B is a diagram depicting one example of signal flow in the UE depicted in FIG. 19A. In FIGS. 19A and 19B, portions identical to those depicted in FIGS. 9A and 9B are given the same reference numerals used in FIGS. 9A and 9B and description thereof will be omitted. As depicted in FIGS. 18A and 18B, the third embodiment the UE 220 according to includes a TTI bundling/RTT control unit 1901 in place of the TTI bundling control unit 907 depicted in FIGS. 9A and 9B. The TTI bundling/RTT control unit 1901, for example, may be realized by the CPU 931 depicted in FIG. 9C.

The mode switching control unit 905 begins switching control of the TTI bundle size/RTT control mode and the transmission power control mode, when TTI bundling with the eNB 210 is enabled. For example, the mode switching control unit 905 switches to the TTI bundle size/RTT control mode from the next transmission, when the PHR output from the transmission power calculating unit 906 is 0 or less.

The TTI bundling/RTT control unit 1901 obtains the TPC command stored in the UL grant output from the PDCCH demodulating unit 904, in the TTI bundle size/RTT control mode, based on the switching result output from the mode switching control unit 905. The TTI bundling/RTT control unit 1901 configures the TTI bundle size and the RTT based on the obtained TPC command and notifies the PUSCH scheduler 908 of the configured TTI bundle size and RTT.

The PUSCH scheduler 908 performs scheduling of a PUSCH such that successive transmission and retransmission is performed by the TTI bundle size and RTT output from the TTI bundling/RTT control unit 1901.

The control unit 122 depicted in FIGS. 1A and 1B, for example, may be realized by the mode switching control unit 905, the transmission power calculating unit 906, and the TTI bundling/RTT control unit 1901.

Figure 20A:
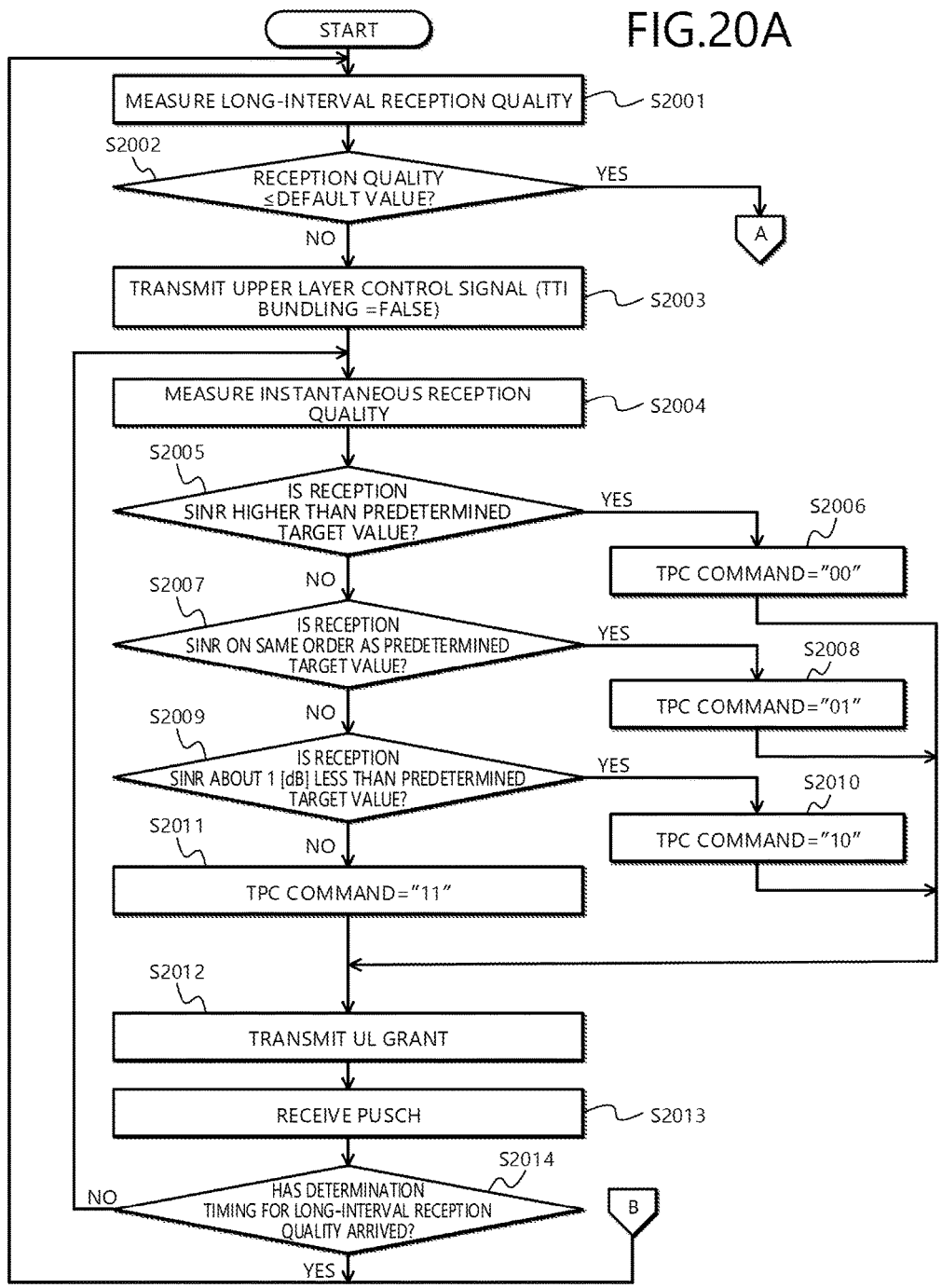
FIG. 20A is a flowchart (part 1) of an example of processing by the eNB according to the third embodiment eNB.
Figure 20B:
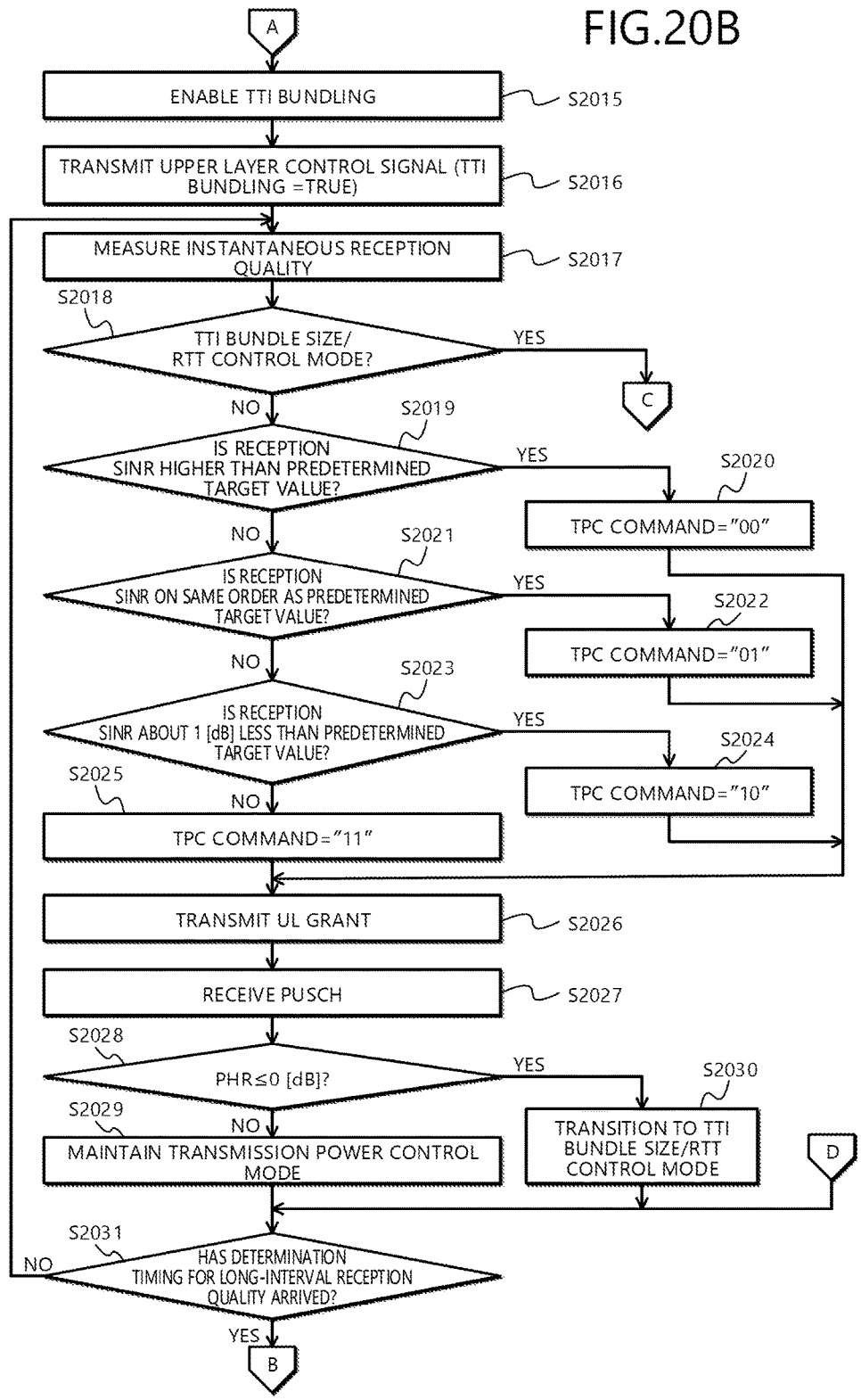
FIG. 20B is a flowchart (part 2) of an example of processing by the eNB according to the third embodiment eNB.

FIGS. 20A, 20B, and 20C are flowcharts of an example pf processing by the eNB according to the third embodiment eNB. The eNB 210 according to the third embodiment, for example, executes the steps depicted in FIGS. 20A to 20C. Steps S2001 to S2031 depicted in FIGS. 20A and 20B are identical to step S1001 to S1031 depicted in FIGS. 10A and 10B. However, at step S2030, the eNB 210 transitions to the TTI bundle size/RTT control mode (step S2030).

At step S2018 the eNB 210 determines whether the current mode is the TTI bundle size/RTT control mode (step S2018). If the mode is not the TTI bundle size/RTT control mode (step S2018: NO), the eNB 210 transitions to step S2019.

At step S2018, if the current mode is the TTI bundle size/RTT control mode (step S2018: YES), the eNB 210 transitions to step S2032. In other words, the eNB 21 sets the adjustment amount of the total energy of transmitted packets per unit time of the UE 220, based on the difference of a predetermined target value and the reception SINR measured at step S2017 (step S2032).

The eNB 210 determines whether the total energy of transmitted packets per unit time of the UE 220 after adjustment based on the adjustment amount set at step S2032 is less than 1.5 N (step S2033). If the total energy of transmitted packets per unit time is less than 1.5 N (step S2033: YES), the eNB 210 configures the TPC command to be "00" (step S2034), and transitions to step S2040.

At step S2033, if the total energy of transmitted packets per unit time after adjustment is not less than 1.5 N (step S2033: NO), the eNB 210 determines if the total energy of transmitted packets per unit time after adjustment is 1.5 N or greater and less than 2.33 N (step S2035). If the total energy of transmitted packets per unit time after adjustment is 1.5 N or greater and less than 2.33 N (step S2035: YES), the eNB 210 configures the TPC command to be "01" (step S2036), and transitions to step S2040.

At step S2035, if the total energy of transmitted packets per unit time after adjustment is not 1.5 N or greater and less than 2.33 N (step S2035: NO), the eNB 210 determines whether the total energy of transmitted packets per unit time after adjustment is 2.33 N or greater and less than 3.33 N (step S2037). If the total energy of transmitted packets per unit time after adjustment is 2.33 N or greater and less than 3.33 N (step S2037: YES), the eNB 210 configures the TPC command to be "10" (step S2038), and transitions to step S2040.

At step S2037, if the total energy of transmitted packets per unit time after adjustment is not 2.33 N or greater and less than 3.33 N (step S2037: NO), the eNB 210 configures the TPC command to be "11" (step S2039), and transitions to step S2040.

The eNB 210 transmits to the UE 220, the UL grant storing the TPC command configured by steps S2033 to S2039 (step S2040). The eNB 210 receives a PUSCH from the UE 220, by a radio resource instructed by the UL grant transmitted at step S2040 (step S2041). The eNB 210 determines whether the TPC command by steps S2033 to S2039 is "00" (step S2042).

At step S2042, if the TPC command is not "00" (step S2042: NO), the eNB 210 maintains the TTI bundle size/RTT control mode (step S2043), and transitions to step S2031. If the TPC command is "00" (step S2042: YES), the eNB 210 transitions to the transmission power control mode (step S2044), and transitions to step S2031.

Figure 21A:
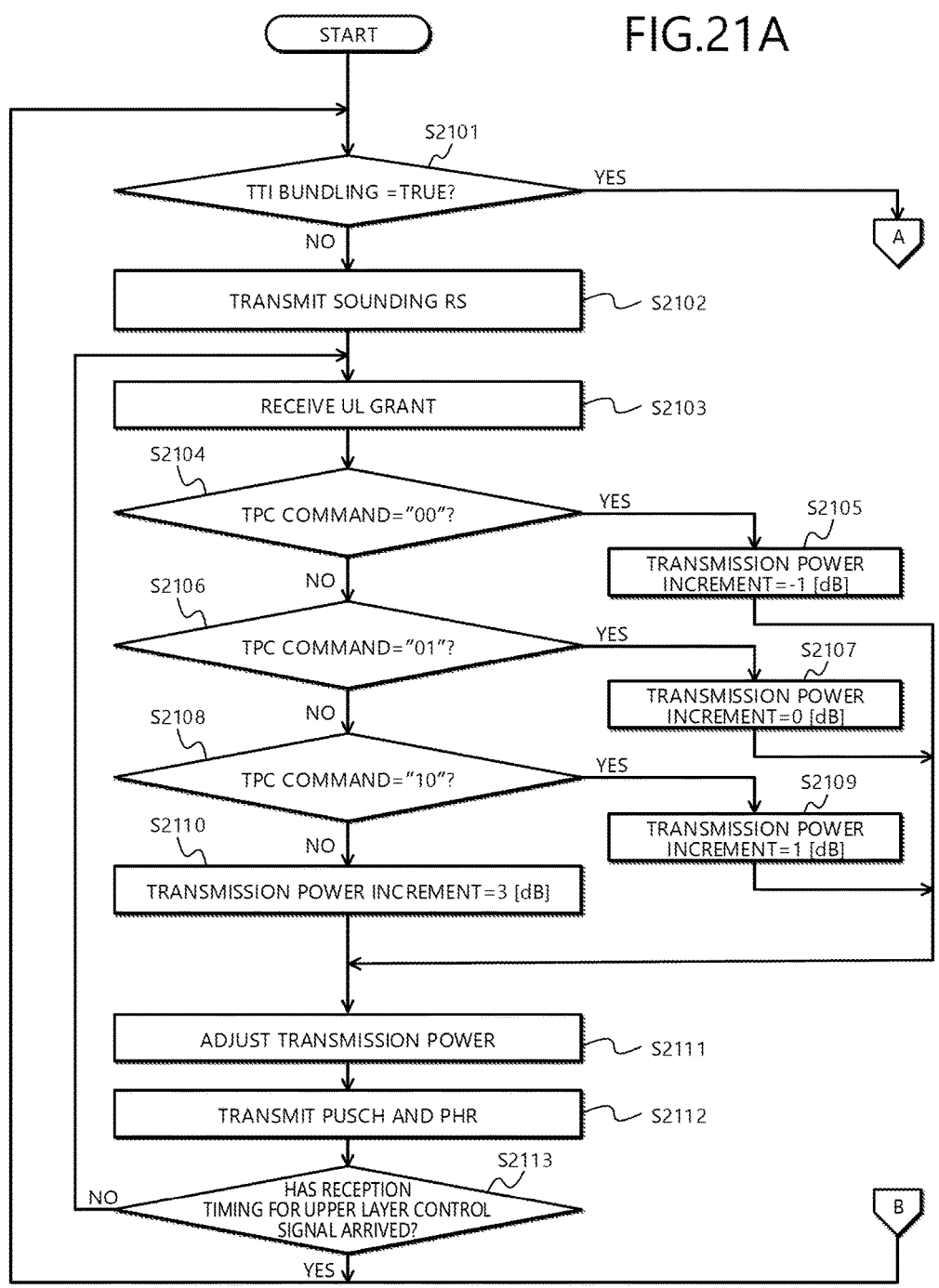
FIG. 21A is a flowchart (part 1) of an example of processing by the UE according to the third embodiment UE.
Figure 21B:
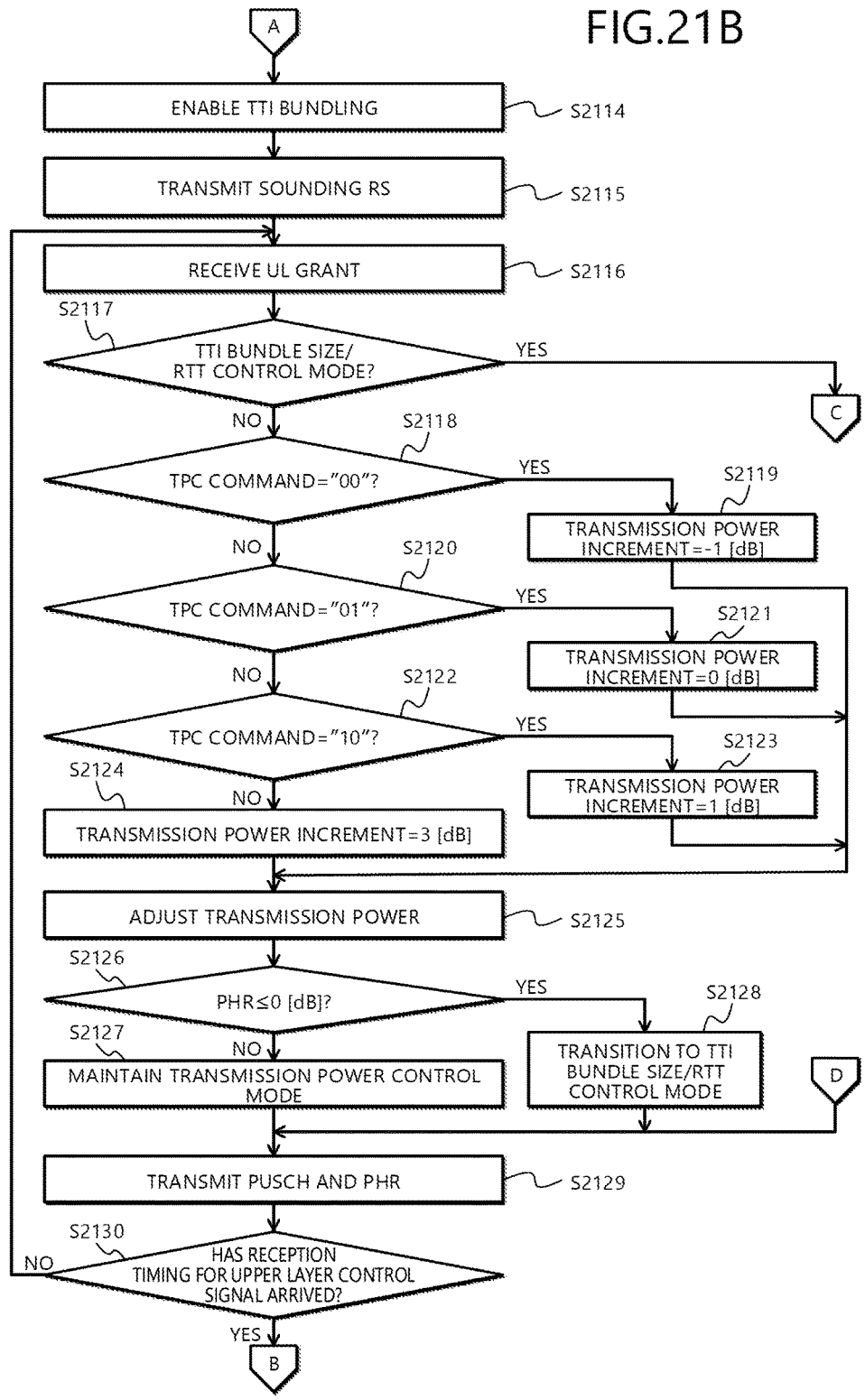
FIG. 21B is a flowchart (part 2) of an example of processing by the UE according to the third embodiment UE.

FIGS. 21A, 21B, and 21C are flowcharts of an example of processing by the UE according to the third embodiment UE. The UE 220 according to the third embodiment, for example, executes the steps depicted in FIGS. 21A to 21C. Steps S2101 to S2130 depicted in FIGS. 21A and 21B are identical to steps S1101 to S1130 depicted in FIGS. 11A and 11B. However, at step S2128, the UE 220 transitions to the TTI bundle size/RTT control mode (step S2128).

Further, at step S2117, the UE 220 determines whether the current mode is the TTI bundle size/RTT control mode (step S2117). If the current mode is the transmission power control mode and not the TTI bundle size/RTT control mode (step S2117: NO), the UE 220 transitions to step S2118. If the current mode is the TTI bundle size/RTT control mode (step S2117: YES), the UE 220 determines whether the TPC command stored in the UL grant received at step S2116 is "00" (step S2131). If the TPC command is "00" (step S2131: YES), the UE 220 determines that the TTI bundle size is 1 and the RTT is 8 (step S2132), and transitions to step S2138.

At step S2131, if the TPC command is not "00" (step S2131: NO), the UE 220 determines whether the TPC command is "01" (step S2133). If the TPC command is "01" (step S2133: YES), the UE 220 determines that the TTI bundle size is 4 and the RTT is 16 (step S2134), and transitions to step S2138.

At step S2133, if the TPC command is not "01" (step S2133: NO), the UE 220 determines whether the TPC command is "10" (step S2135). If the TPC command is "10" (step S2135: YES), the UE 220 determines that the TTI bundle size is 4 and the RTT is (step S2136), and transitions to step S2138.

At step S2135, if the TPC command is not "10" (step S2135: NO), the UE 220 determines that the TTI bundle size is 4 and the RTT is 8 (step S2137), and transitions to step S2138.

The UE 220 adjusts the TTI bundle size and the RTT by the TTI bundle size and RTT determined at steps S2131 to S2137 (step S2138). The UE 220 determines whether the TPC command stored in the UL grant received at step S2116 is "00" (step S2139).

At step S2139, if the TPC command is not "00" (step S2139: NO), the UE 220 maintains the TTI bundle size/RTT control mode (step S2140), and transitions to step S2129. If the TPC command is "00" (step S2139: YES), the UE 220 transitions to the transmission power control mode (step S2141), and transitions to step S2129.

In this manner, according to the third embodiment, a TPC command of a UL grant used in controlling the transmission power of the UE 220 may be used to give notification of the RTT and the TTI bundle size of the UE 220. As a result, the RTT and the TTI bundle size of the UE 220 may be made variable and increases in the overhead of control information accompanying notification of the RTT and the TTI bundle size from the eNB 210 to the UE 220 may be suppressed.

Further, in the TTI bundle size/RTT control mode, although a case where the TTI bundle size and the RTT are controlled in combination using a TPC command, configuration may be such that the RTT alone (TTI bundle size is fixed) is controlled. In this case, the RTT of the UE 220 may be made variable and increases in the overhead of control information accompanying notification of the RTT from the eNB 210 to the UE 220 may be suppressed.

In a fourth embodiment, portions differing from those of the second embodiment will be described.

FIG. 22 is a diagram depicting one example of changing a HARQ process count. In FIG. 22, the horizontal axis represents time (subframe). In the example depicted in FIG. 22, the UE 220 performs TTI bundling of transmitting to the eNB 210 successively four times, packets representing new data that are the same (transport block #0), by a HARQ process #0, at a new transmission 2211. The UE 220 performs TTI bundling of transmitting to the eNB 210 successively four times, packets representing new data that are the same, by a HARQ process #1, at a new transmission 2221. The new transmissions 2211, 2221 are transmissions of new data that are the same.

At a retransmission 2212, the UE 220 performs TTI bundling of transmitting to the eNB 210 successively four times, packets representing data that is the same as that at the new transmission 2211, by the HARQ process #0. At a retransmission 2222, the UE 220 performs TTI bundling of transmitting to the eNB 210 successively four times, packets representing data that is the same as that at the new transmission 2221, by the HARQ process #1. Therefore, the retransmissions 2212, 2222 are transmissions of the same retransmitted data.

At a retransmission 2213, the UE 220 performs TTI bundling of transmitting to the eNB 210 successively four times, packets representing data that is the same as that at the new transmission 2211, by the HARQ process #0. At a retransmission 2223, the UE 220 performs TTI bundling of transmitting to the eNB 210 successively four times, packets representing data that is the same as that at the new transmission 2221, by the HARQ process #1. Therefore, retransmissions 2213, 2223 are transmissions of the same retransmitted data.

Under Alt.6.2 of LTE described later, as depicted in FIG. 22, transmission of the same signal by (2 processes in the example depicted in FIG. 22) multiple HARQ processes is under consideration. In this regard, in the wireless communications system 200 according to the fourth embodiment, the HARQ process count is made variable. The HARQ process count is the number of HARQ processes of transmitting the same data by TTI bundling, performed with respect to the same data.

To do this, the eNB 210 uses a control signal to notify the UE 220 of the HARQ process count. Here, the eNB 210, for example, uses a TPC command stored in the UL grant to notify the UE 220 of the HARQ process count. The UE 220 adjusts the HARQ process count, based on the TPC command stored in the UL grant received from the eNB 210. For example when TTI bundling between the eNB 210 and the UE 220 has been enabled by the control of an higher layer, the eNB 210 and the UE 220 enter a state enabling switching to the transmission power control mode and a TTI bundle size/the HARQ process count control mode.

For example, in the transmission power control mode, the UE 220 fixes the HARQ process count of the UE 220 to 1 (minimum value). The eNB 210 uses the TPC command to notify the UE 220 of the transmission power. The UE 220 adjusts the transmission power of the UE 220, based on the TPC command.

On the other hand, in the TTI bundle size/the HARQ process count control mode, the UE 220 fixes the transmission power of the UE 220 to a maximum value. The eNB 210 uses the TPC command to notify the UE 220 of the HARQ process count. The UE 220 adjusts the HARQ process count of the UE 220, based on the TPC command.

In this manner, switching of the transmission power control mode of fixing the HARQ process count and the TTI bundle size/the HARQ process count control mode of fixing the transmission power is enabled. Therefore, the TPC command for controlling the transmission power may be further used to control the HARQ process count. As a result, increases in the overhead of control information when the HARQ process count of the UE 220 is made variable may be suppressed. Therefore, the HARQ process count may be controlled according to wireless channel fluctuations and increases in the overhead of control information may be suppressed.

FIG. 23A is a diagram depicting a first example of a UL grant bitmap in the transmission power control mode. A table 2310 depicted in FIG. 23A indicates a correspondence relation of a TPC command and contents notified by the TPC command, in the transmission power control mode.

For example, a TPC command="00" in the transmission power control mode indicates transition to the TTI bundle size/HARQ process count control mode. A TPC command="01" in the transmission power control mode indicates that the TTI bundle size is to be maintained at 1, the RTT is to be maintained at 8, and a transmission power increment is to be −1 [dB].

A TPC command="10" in the transmission power control mode indicates that the TTI bundle size is to be maintained at 1 and the transmission power increment is to be 0 [dB] (no change). A TPC command="11" in the transmission power control mode indicates that the TTI bundle size is to be maintained at 1 and the transmission power increment is to be 1 [dB]. Further, the TCP commands in the transmission power control mode may further indicate that the HARQ process count is maintained at 1.

FIG. 23B is a diagram depicting the first example of a UL grant bitmap in the TTI bundle size/HARQ process count control mode. A table 2320 depicted in FIG. 23B indicates a correspondence relation of a TPC command and contents notified by the TPC command, in the TTI bundle size/HARQ process count control mode.

For example, a TPC command="00" in the TTI bundle size/HARQ process count control mode indicates that the TTI bundle size is to be 1 and indicates transition to the transmission power control mode. The TPC command="00" in the TTI bundle size/HARQ process count control mode may further indicate that the HARQ process count is maintained at 1.

A TPC command="10" in the TTI bundle size/HARQ process count control mode indicates that the TTI bundle size is to be 4 and the HARQ process count is to be 12. A TPC command="10" in the TTI bundle size/HARQ process count control mode indicates that the TTI bundle size is to be 4 and the HARQ process count is to be 2. A TPC command="11" in the TTI bundle size/HARQ process count control mode indicates that the TTI bundle size is to be 4 and the HARQ process count is to be 4.

FIG. 24A is a diagram depicting a second example of a UL grant bitmap in the transmission power control mode. A table 2410 depicted in FIG. 24A indicates a correspondence relation of a TPC command and contents notified by the TPC command, in the transmission power control mode.

For example, a TPC command="00" in the transmission power control mode indicates that the TTI bundle size is to be maintained at 1 and the transmission power increment is to be −1 [dB]. A TPC command="01" in the transmission power control mode indicates that the TTI bundle size is to be maintained at 1 and the transmission power increment is to be 0 [dB].

A TPC command="10" in the transmission power control mode indicates that the TTI bundle size is to be maintained at 1 and the transmission power increment is to be 1 [dB]. A TPC command="11" in the transmission power control mode indicates that the TTI bundle size is to be maintained at 1 and the transmission power increment is to be 3 [dB]. Further, the TCP commands in the transmission power control mode may further indicate that the HARQ process count is maintained at 1.

In this manner, transition to the TTI bundle size/HARQ process count control mode need not be explicitly notified by a TPC command. In this case, the eNB 210 and the UE 220, for example, may determine transition to the TTI bundle size/HARQ process count control mode, based on PHR. As a result, since the type of transmission power increment that can be instructed by a TPC command increases, more flexible control of the transmission power of the UE 220 becomes possible.

For example, the eNB 210 transitions to the TTI bundle size/HARQ process count control mode, when the PHR received from the UE 220 is 0 or less. Further, the UE 220 transitions to the TTI bundle size/HARQ process count control mode, when the PHR transmitted to the eNB 210 is 0 or less. As a result, when the transmission power of the UE 220 reaches the maximum value in the transmission power control mode, the TTI bundle size/HARQ process count control mode may be transitioned to.

FIG. 24B is a diagram depicting the second example of a UL grant bitmap in the TTI bundle size/HARQ process count control mode. A table 2420 depicted in FIG. 24B indicates a correspondence relation of a TPC command and contents notified by the TPC command, in the TTI bundle size/HARQ process count control mode, i.e., when the transmission power of the UE 220 reaches the maximum value (at a time of maximum transmission power). The table 2420 depicted in FIG. 24B, for example, may be the same as the table 2320 depicted in FIG. 23B. Hereinafter, in the fourth embodiment, a case where the UL grant bitmap (second example) depicted in FIGS. 24A and 24B is used will be described.

The transmission power control command setting method in the transmission power control mode, for example, is identical to the transmission power control command setting method depicted in FIG. 6A.

FIGS. 25A and 25B are diagrams depicting examples of the transmission power control command setting method in the TTI bundle size/the HARQ process count control mode. A table 2510 depicted in FIG. 25A indicates a correspondence relation of an adjustment amount of the HARQ process count selected by the eNB 210 and a condition related to the difference Diff from the targeted value for the measured value of reception SINR, in the TTI bundle size/the HARQ process count control mode.

For example, when Diff>7.5 [dB], the eNB 210 selects ⅛ times as the adjustment amount of the HARQ process count. When 7.5 [dB]≥Diff>4.5 [dB], the eNB 210 selects ¼ times as the adjustment amount of the HARQ process count. When 4.5 [dB]≥Diff>1.5 [dB], the eNB 210 selects ½ as the adjustment amount of the HARQ process count.

When 1.5 [dB]≥Diff>−1.5 [dB], the eNB 210 selects 1 time (no change) as the adjustment amount of the HARQ process count. When −1.5 [dB]≥Diff>−4.5 [dB], the eNB 210 selects 2 times as the adjustment amount of the HARQ process count. When −4.5 [dB]≥Diff>−7.5 [dB], the eNB 210 selects 4 times as the adjustment amount of the HARQ process count. When −7.5 [dB]≥Diff, the eNB 210 selects 8 times as the adjustment amount of the HARQ process count.

A table 2520 depicted in FIG. 25B indicates a correspondence relation of a TPC command selected by the eNB 210 and the adjustment result of the HARQ process count based on the selected adjustment amount of the HARQ process count, in the TTI bundle size/the HARQ process count control mode. For example, when the adjustment result<1, the eNB 210 selects the TPC command="00" indicating the TTI bundle size=1, the HARQ process count=1, and transitions to the transmission power control mode.

When the adjustment result=1, the eNB 210 selects the TPC command="01" indicating the TTI bundle size=4 and the HARQ process count=1. When the adjustment result=2, the eNB 210 selects the TPC command="10" indicating the TTI bundle size=4 and the HARQ process count=2. When the adjustment result≥4, the eNB 210 selects the TPC command="11" indicating the TTI bundle size=4 and the HARQ process count=4.

FIG. 26 is a sequence diagram depicting one example of operation of the wireless communications system according to the fourth embodiment. In the wireless communications system 200 according to the fourth embodiment, for example, the following steps are performed.

The eNB 210 enables TTI bundling with the UE 220 (step S2601). The eNB 210 transmits to the UE 220, an higher layer control signal (TTI bundling=TRUE) instructing TTI bundling to be enabled (step S2602)/

The UE 220 enables TTI bundling with the eNB 210 (step S2603). In the example depicted in FIG. 26, the eNB 210 and the UE 220, which have enable TTI bundling, are assumed to be in the TTI bundle size/the HARQ process count control mode as an initial mode.

The UE 220 transmits a sounding RS to the eNB 210 (step S2604). The eNB 210 measures the reception quality based on the sounding RS transmitted at step S2604 (step S2605). The reception quality, for example, is the reception SINR. In the example depicted in FIG. 26, the eNB 210 is assumed to set the HARQ process count of the UE 220 to be changed to 1 and transition to the transmission power control mode, based on the reception quality measured at step S2605.

The eNB 210 transmits to the UE 220, a UL grant based on the reception quality measured at step S2605 (step S2606). The UL grant at step S2606 includes the TPC command="00". In other words, the UL grant at step S2606 includes a TPC command instructing the TTI bundle size to be configured to 1, the HARQ process count to be configured to 1, and transition to the transmission power control mode (for example, refer to FIG. 24B).

The UE 220 adjusts the TTI bundle size of the UE 220 to 1 TTI and the HARQ process count to 1, based on the TPC command included in the UL grant transmitted at step S2606 (step S2607). The UE 220 transmits a PUSCH and PHR by a radio resource instructed by the UL grant transmitted at step S2606 (step S2608). Transmission of the PUSCH at step S2608 is performed by TTI bundling of transmitting the PUSCH one time.

Consequent to step S2606, the eNB 210 and the UE 220 transition to the transmission power control mode.

The UE 220 transmits a sounding RS to the eNB 210 (step S2609). The eNB 210 measures the reception quality based on the sounding RS transmitted at step S2609 (step S2610). In the example depicted in FIG. 26, the eNB 210 sets the transmission power of the UE 220 to be increased 3 [dB] based on the reception quality measured at step S2610.

The eNB 210 transmits to the UE 220, a UL grant based on the reception quality measured at step S2610 (step S2611). The UL grant at step S2611 includes the TPC command="11". In other words, the UL grant at step S2611 includes a TPC command instructing the transmission power to be increased 3 [dB] (for example, refer to FIG. 24A).

The UE 220 performs adjustment such that the transmission power increases 3 [dB], based on the TPC command included in the UL grant transmitted at step S2611 (step S2612). Consequent to step S1712, the transmission power of the UE 220 is assumed to reach the maximum transmission power. Therefore, the PHR of the UE 220 becomes 0 or less.

The UE 220 transmits a PUSCH and PHR by a radio resource instructed by the UL grant transmitted at step S2611 (step S2613). Transmission of the PUSCH at step S2613 is performed by TTI bundling of transmitting the PUSCH one time.

Consequent to the PHR of the UE 220 becoming 0 [dB] or less, the eNB 210 and the UE 220 transition to the TTI bundle size/the HARQ process count control mode.

The UE 220 transmits a sounding RS to the eNB 210 (step S2614). The eNB 210 The eNB 210 measures the reception quality based on the sounding RS transmitted at step S2614

(step S2615). In the example depicted in FIG. 26, the eNB 210 is assumed to set the HARQ process count of the UE 220 to be changed to 1, based on the reception quality measured at step S2614.

The eNB 210 transmits to the UE 220, a UL grant based on the reception quality measured at step S2615 (step S2616). The UL grant at step S2616 includes TPC command="01". In other words, the UL grant at step S2616 includes a TPC command instructing the TTI bundle size to be configured to 4 and the HARQ process count to be configured to 1 (for example, refer to FIG. 24B).

The UE 220 adjusts the TTI bundle size to 4 TTIs and the HARQ process count to 1, based on the TPC command included in the UL grant transmitted at step S2616 (step S2617). The UE 220 transmits a PUSCH and PHR by a radio resource instructed by the UL grant transmitted at step S2616 (step S2618). Transmission of the PUSCH at step S2618 is performed by TTI bundling of transmitting successively for 4 TTIs, a PUSCH representing the same data.

Transmission of the sounding RS at steps S2604, S2609, and S2614, for example, may be transmission of a periodic sounding RS by the UE 220.

Figure 27A:
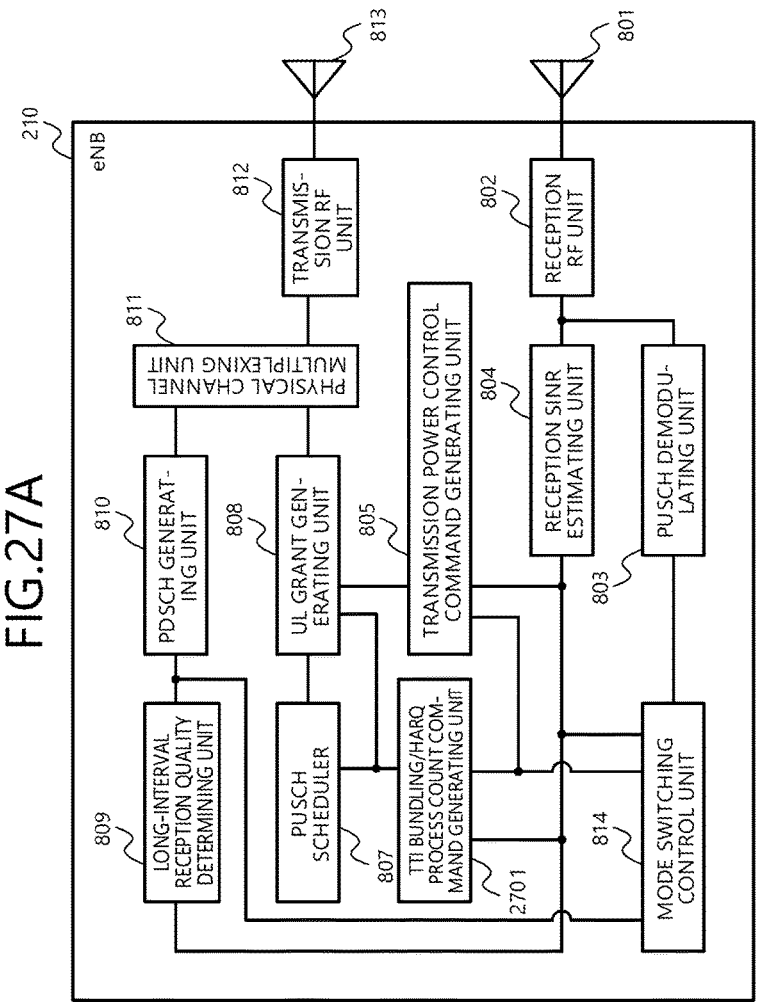
FIG. 27A is a diagram depicting one example of the eNB according to the fourth embodiment.
Figure 27B:
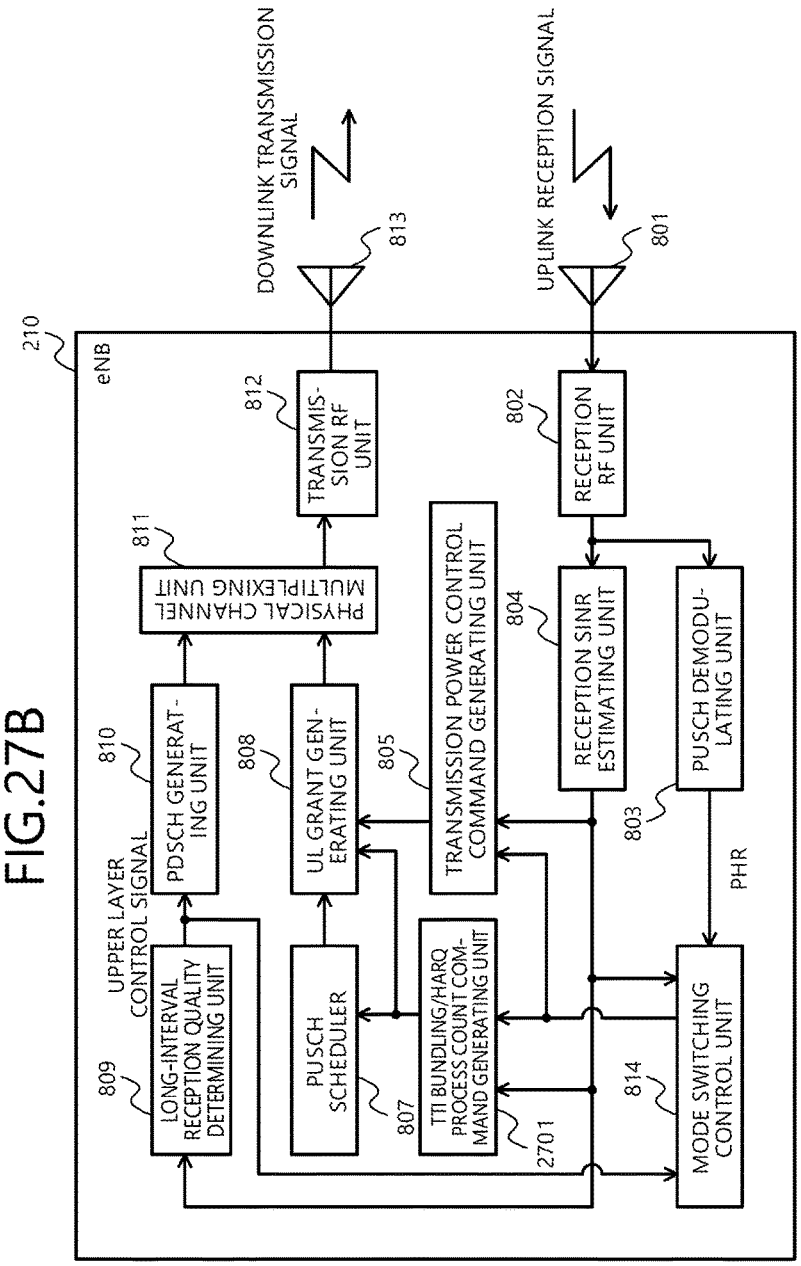
FIG. 27B is a diagram depicting one example of signal flow in the eNB depicted in FIG. 27A.

FIG. 27A is a diagram depicting one example of the eNB according to the fourth embodiment. FIG. 27B is a diagram depicting one example of signal flow in the eNB depicted in FIG. 27A. In FIGS. 27A and 27B, portions identical to those depicted in FIGS. 8A and 8B are given the same reference numerals used in FIGS. 8A and 8B and description thereof is omitted. As depicted in FIGS. 27A and 27B, according to the fourth embodiment the eNB 210 includes a TTI bundling/HARQ process count command generating unit 2701 in place of the TTI bundling command generating unit 806 depicted in FIGS. 8A and 8B. The TTI bundling/HARQ process count command generating unit 2701, for example, may be realized by the CPU 831 depicted in FIG. 8C.

The TTI bundling/HARQ process count command generating unit 2701 obtains the reception SINR output from the reception SINR estimating unit 804 in the TTI bundle size/the HARQ process count control mode, based on a switching result from the mode switching control unit 814. The TTI bundling/HARQ process count command generating unit 2701 generates a TTI bundling/the HARQ process count command for the UE 220 based on the obtained reception SINR. The TTI bundling/the HARQ process count command is information instructing a TTI bundle size and a HARQ process count. The TTI bundling/HARQ process count command generating unit 2701 outputs the generated TTI bundling/the HARQ process count command to the PUSCH scheduler 807 and the UL grant generating unit 808.

The mode switching control unit 814 begins switching control of the TTI bundle size/the HARQ process count control mode and the transmission power control mode, when TTI bundling between the eNB 210 and the UE 220 is enabled.

The control unit 112 in FIGS. 1A and 1B may be realized by the transmission power control command generating unit 805, the TTI bundling/HARQ process count command generating unit 2701, the UL grant generating unit 808, the long-interval reception quality determining unit 809, and the mode switching control unit 814.

Figure 28A:
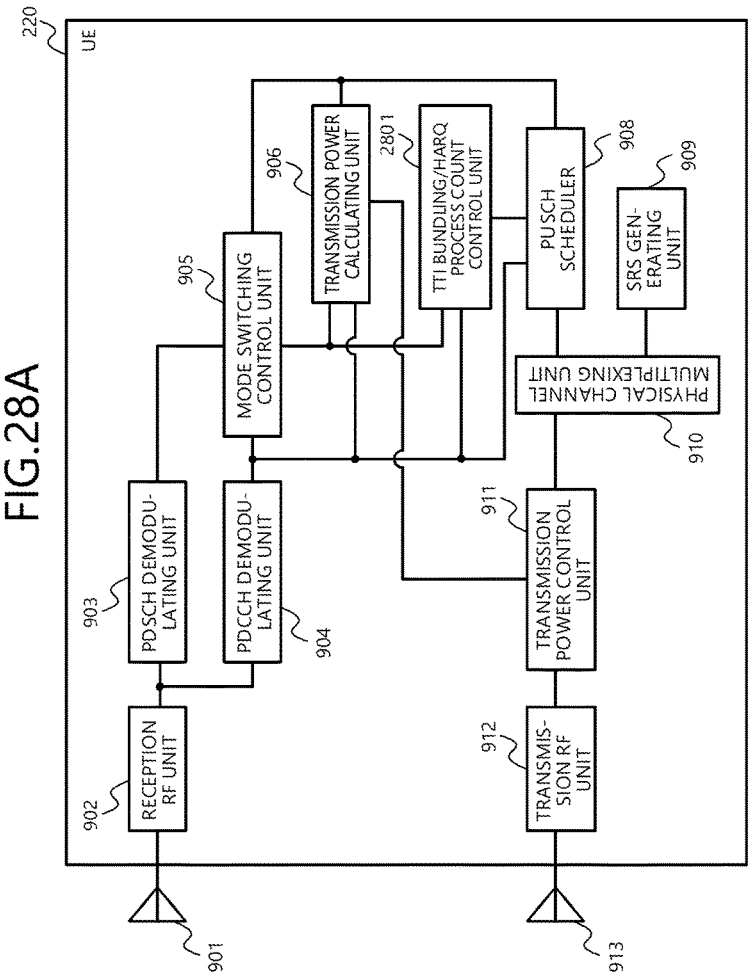
FIG. 28A is a diagram depicting one example of the UE according to the fourth embodiment.
Figure 28B:
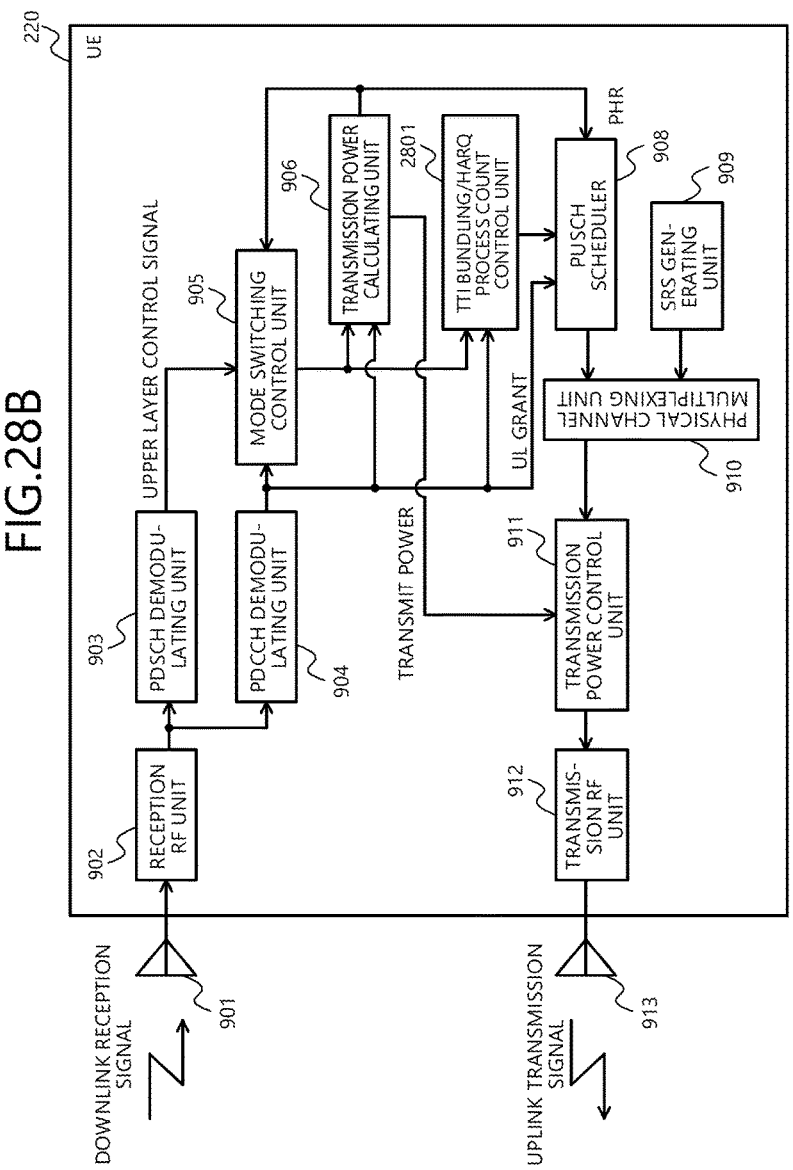
FIG. 28B is a diagram depicting one example of signal flow in the UE depicted in FIG. 28A.

FIG. 28A is a diagram depicting one example of the UE according to the fourth embodiment. FIG. 28B is a diagram depicting one example of signal flow in the UE depicted in FIG. 28A. In FIGS. 28A and 28B, portions identical to those depicted in FIGS. 9A and 9B are given the same reference numerals used in FIGS. 9A and 9B and description thereof is omitted. As depicted in FIGS. 27A and 27B, the UE 220 according to the fourth embodiment includes a TTI bundling/HARQ process count control unit 2801 in place of the TTI bundling control unit 907 depicted in FIGS. 9A and 9B. The TTI bundling/HARQ process count control unit 2801, for example, may be realized by the CPU 931 depicted in FIG. 9C.

The mode switching control unit 905 begins switching control of the TTI bundle size/the HARQ process count control mode and the transmission power control mode, when TTI bundling is enabled with the eNB 210. For example, the mode switching control unit 905 switches to the TTI bundle size/the HARQ process count control mode from the next transmission, when the PHR output from the transmission power calculating unit 906 is 0 or less.

The TTI bundling/HARQ process count control unit 2801 sets the TTI bundle size and the HARQ process count, in the TTI bundle size/the HARQ process count control mode, based on a switching result output from the mode switching control unit 905. In particular, the TTI bundling/HARQ process count control unit 2801 sets the TTI bundle size and the HARQ process count based on the TPC command stored in the UL grant output from the PDCCH demodulating unit 904. The TTI bundling/HARQ process count control unit 2801 notifies the PUSCH scheduler 908 of the set TTI bundle size and the HARQ process count.

The PUSCH scheduler 908 performs PUSCH scheduling such that successive retransmission and HARQ are performed by TTI bundle size and the HARQ process count output from the TTI bundling/HARQ process count control unit 2801.

The control unit 122 depicted in FIGS. 1A and 1B, for example, may be realized by the mode switching control unit 905, the transmission power calculating unit 906, and the TTI bundling/HARQ process count control unit 2801.

Figure 29A:
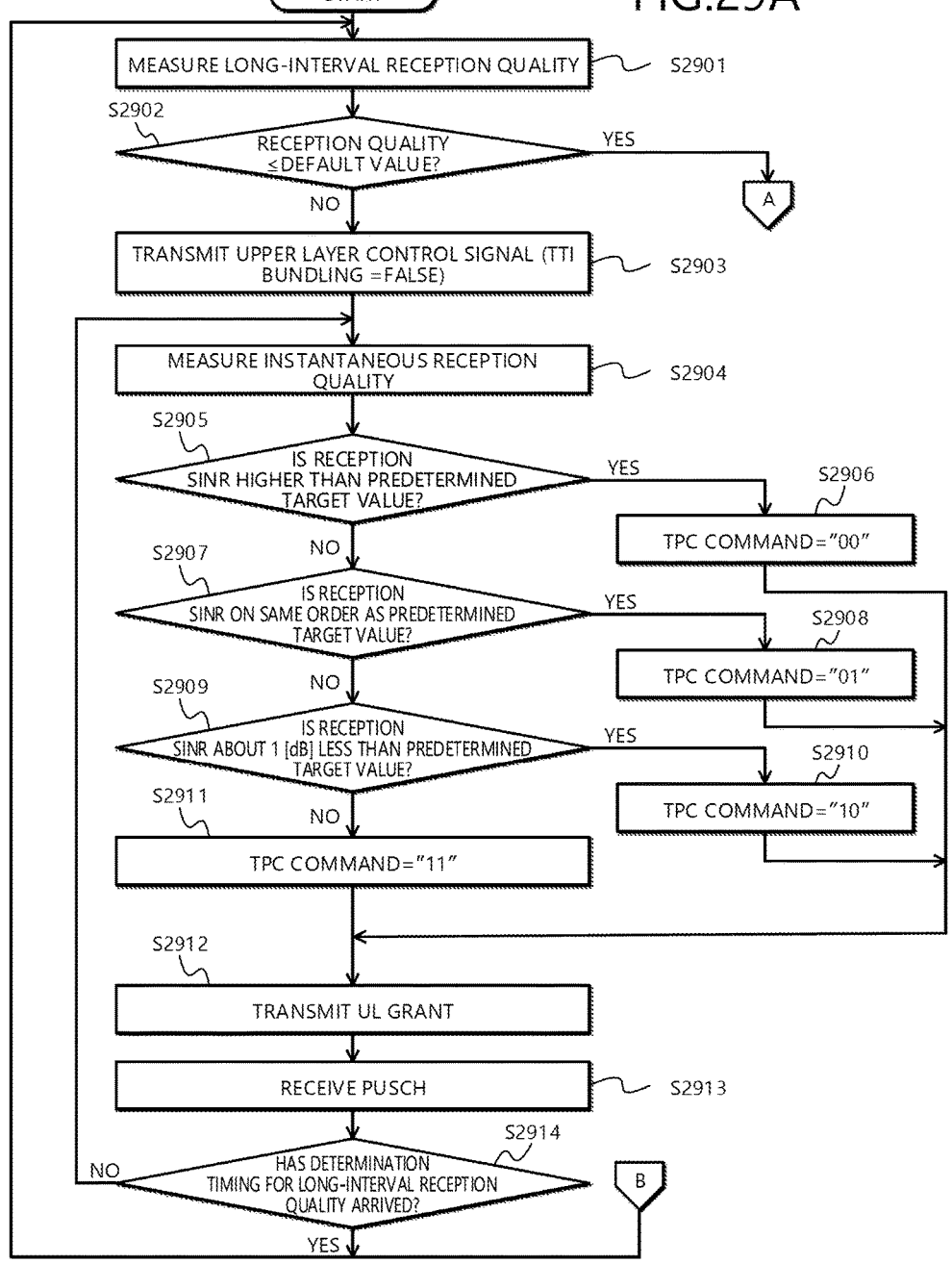
FIG. 29A is a flowchart (part 1) of an example of processing by the eNB according to the fourth embodiment.
Figure 29B:
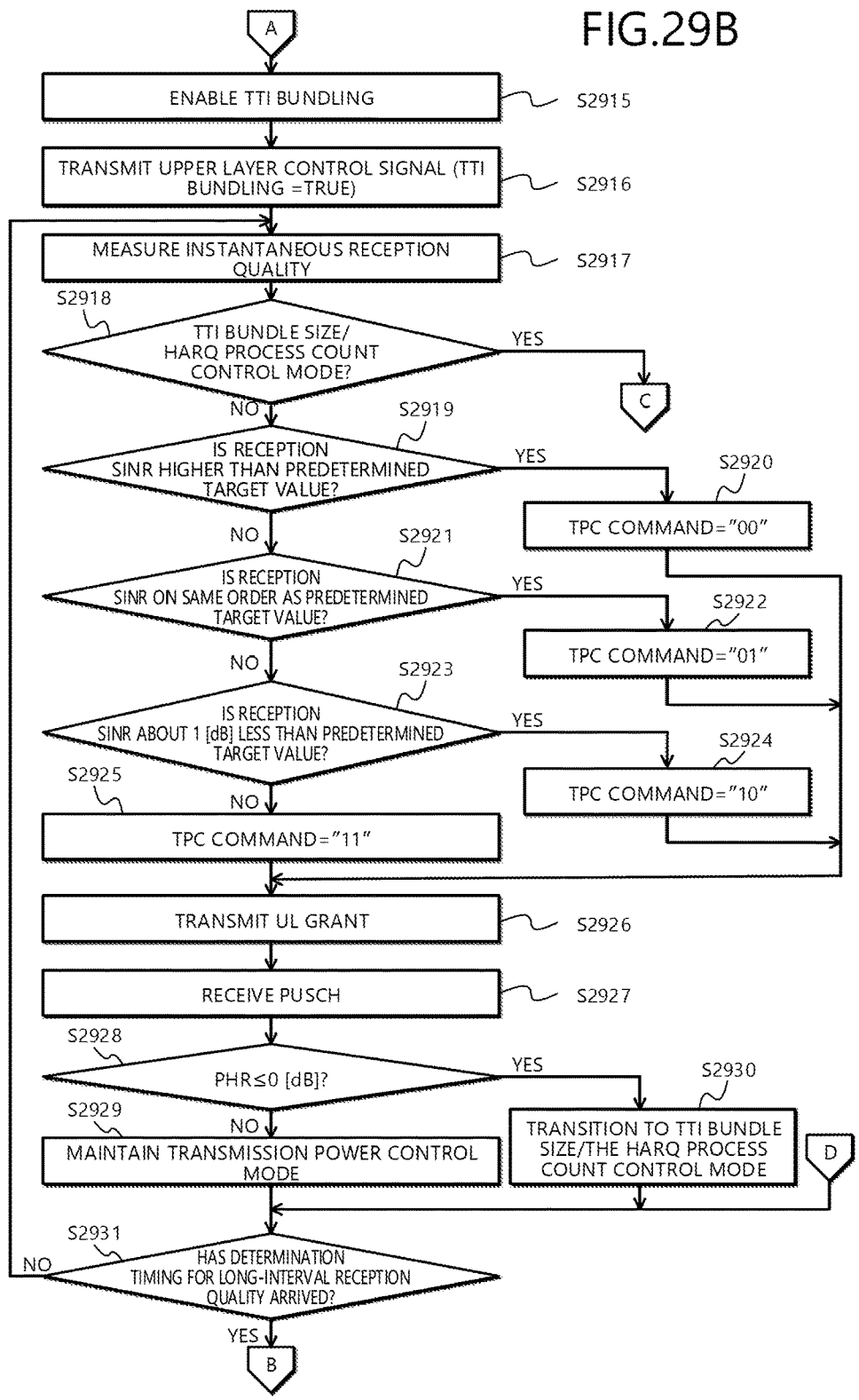
FIG. 29B is a flowchart (part 2) of an example of processing by the eNB according to the fourth embodiment.

FIGS. 29A, 29B, and 29C are flowcharts of an example of processing by the eNB according to the fourth embodiment. The eNB 210 according to the fourth embodiment, for example, executes the steps depicted in FIGS. 29A to 29C. Steps S2901 to S2931 depicted n FIGS. 29A and 29B are identical to steps S1001 to S1031 depicted in FIGS. 10A to 10B. However, at step S2930, the eNB 210 transitions to the TTI bundle size/the HARQ process count control mode (step S2930).

Further, at step S2918, the eNB 210 determines whether the current mode is the TTI bundle size/the HARQ process count control mode (step S2918). If the current mode is not the TTI bundle size/the HARQ process count control mode (step S2918: NO), the eNB 210 transitions to step S2919.

At step S2918, if the current mode is the TTI bundle size/the HARQ process count control mode (step S2918: YES), the eNB 210 transitions to step S2932. In other words, the eNB 210 sets the adjustment amount of the HARQ process count of the UE 220, based on the difference of the reception SINR measured at step S2917 and a predetermined target value (step S2932).

The eNB 210 determines whether the HARQ process count of the UE 220 after adjustment based on the adjustment amount set at step S2932 is less than 1 (step S2933). If the HARQ process count is less than 1 (step S2933: YES), the eNB 210 configures the TPC command to be "00" (step S2934), and transitions to step S2940.

At step S2933, if the HARQ process count after adjustment is not 1 or less (step S2933: NO), the eNB 210 determines whether the HARQ process count after adjustment is 1 (step S2935). If the HARQ process count after adjustment is 1 (step S2935: YES), the eNB 210 configures the TPC command to be "01" (step S2936), and transitions to step S2940.

At step S2935, if the HARQ process count after adjustment is not 1 (step S2935: NO), the eNB 210 determines whether the HARQ process count after adjustment is 2 (step S2937). If the HARQ process count after adjustment is 2 (step S2937: YES), the eNB 210 configures the TPC command to be "10" (step S2938), and transitions to step S2940.

At step S2937, if the HARQ process count after adjusting is not 2 (step S2937: NO), the eNB 210 configures the TPC command to be "11" (step S2939), and transitions to step S2940.

The eNB 210 transmits to the UE 220, a UL grant storing the TPC command configured by steps S2933 to S2939 (step S2940). The eNB 210 receives a PUSCH from the UE 220 by a radio resource instructed by the UL grant transmitted at step S2940 (step S2941). The eNB 210 determines whether the TPC command configured by steps S2933 to S2939 is "00" (step S2942).

At step S2942, if the TPC command is not "00" (step S2942: NO), the eNB 210 maintains the TTI bundle size/the HARQ process count control mode (step S2943), and transitions to step S2931. If the TPC command is "00" (step S2942: YES), the eNB 210 transitions to the transmission power control mode (step S2944), and transitions to step S2931.

Figure 30A:
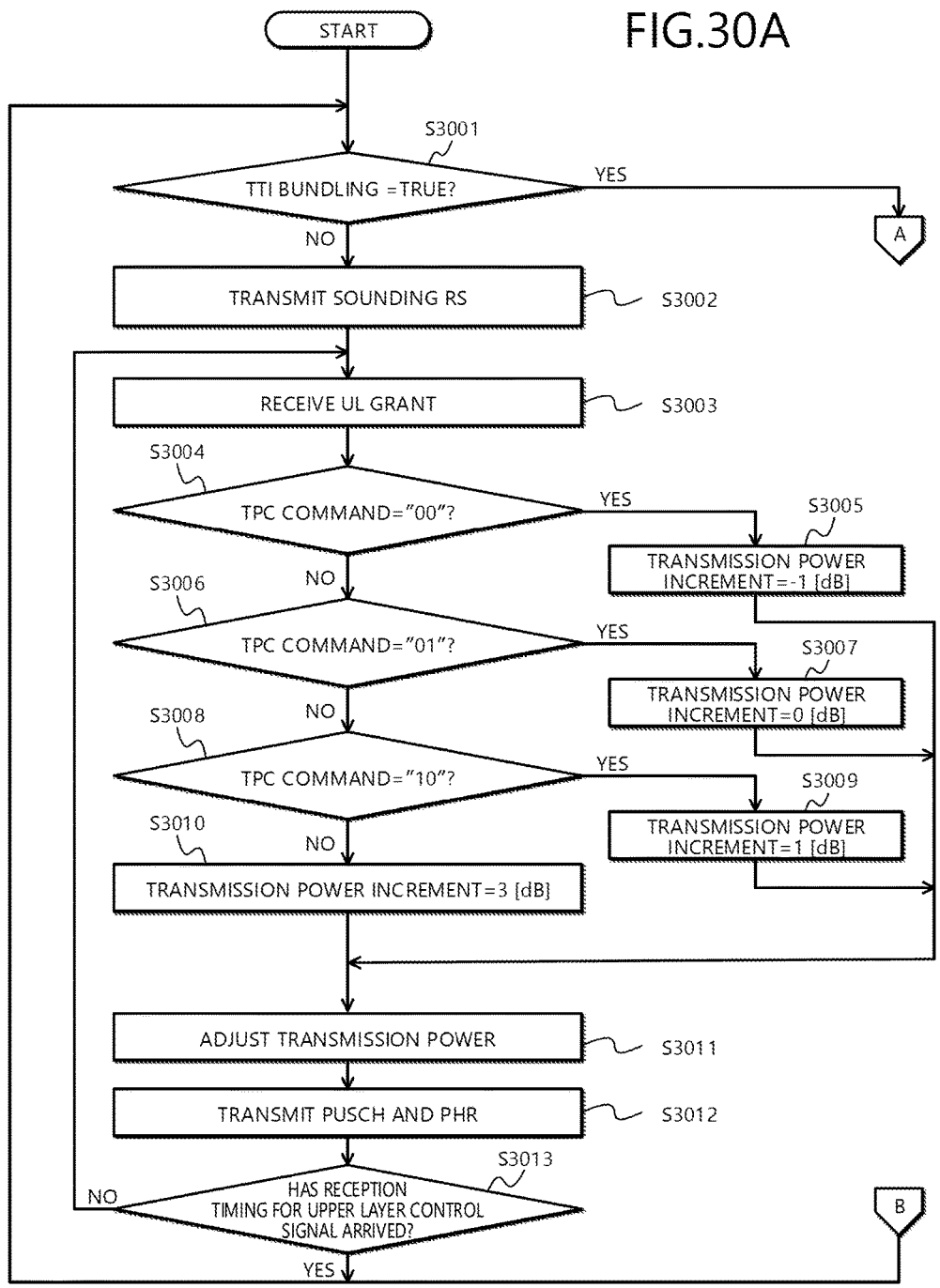
FIG. 30A is a flowchart (part 1) of an example of processing by the UE according to the fourth embodiment.
Figure 30B:
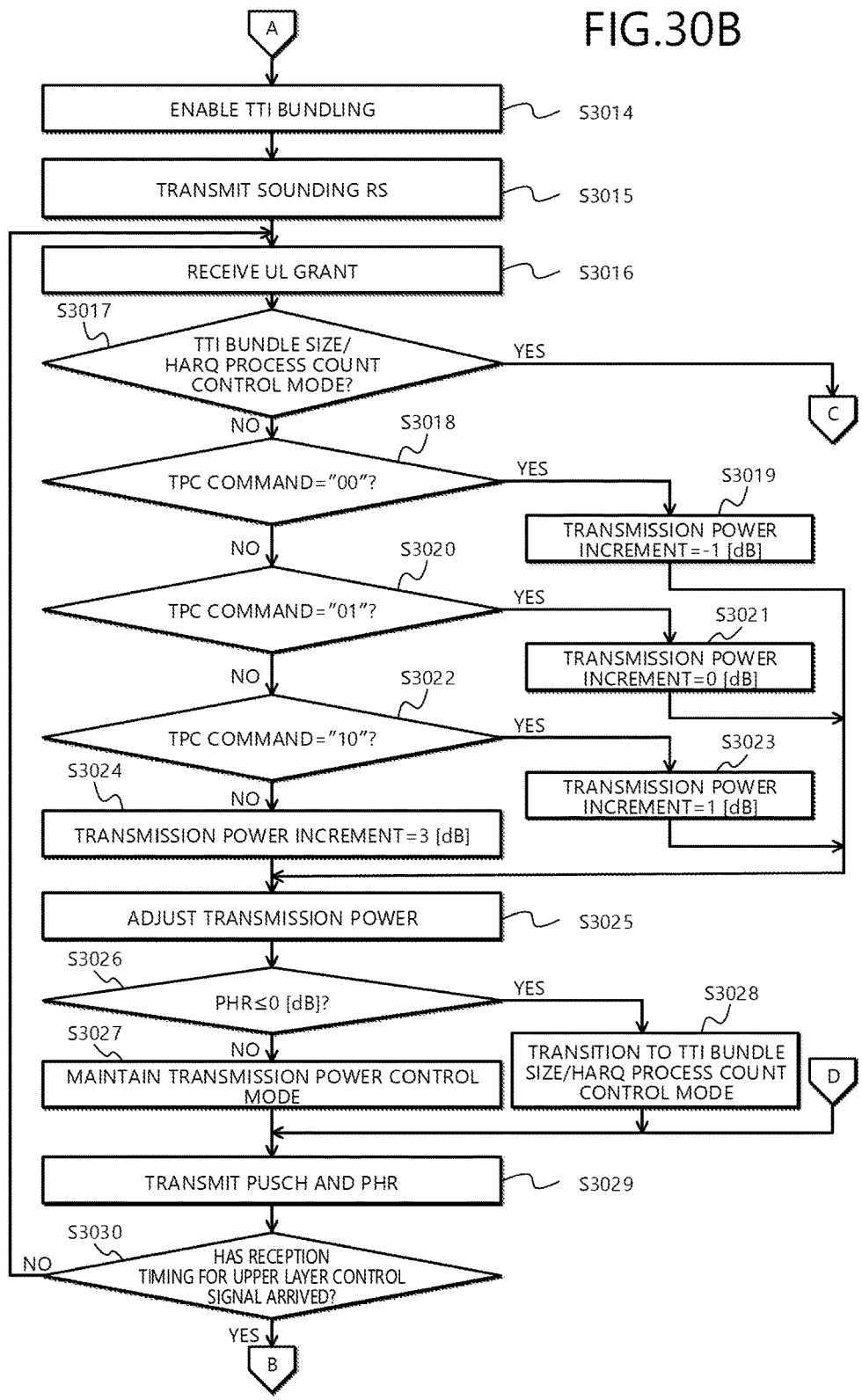
FIG. 30B is a flowchart (part 2) of an example of processing by the UE according to the fourth embodiment.
Figure 30C:
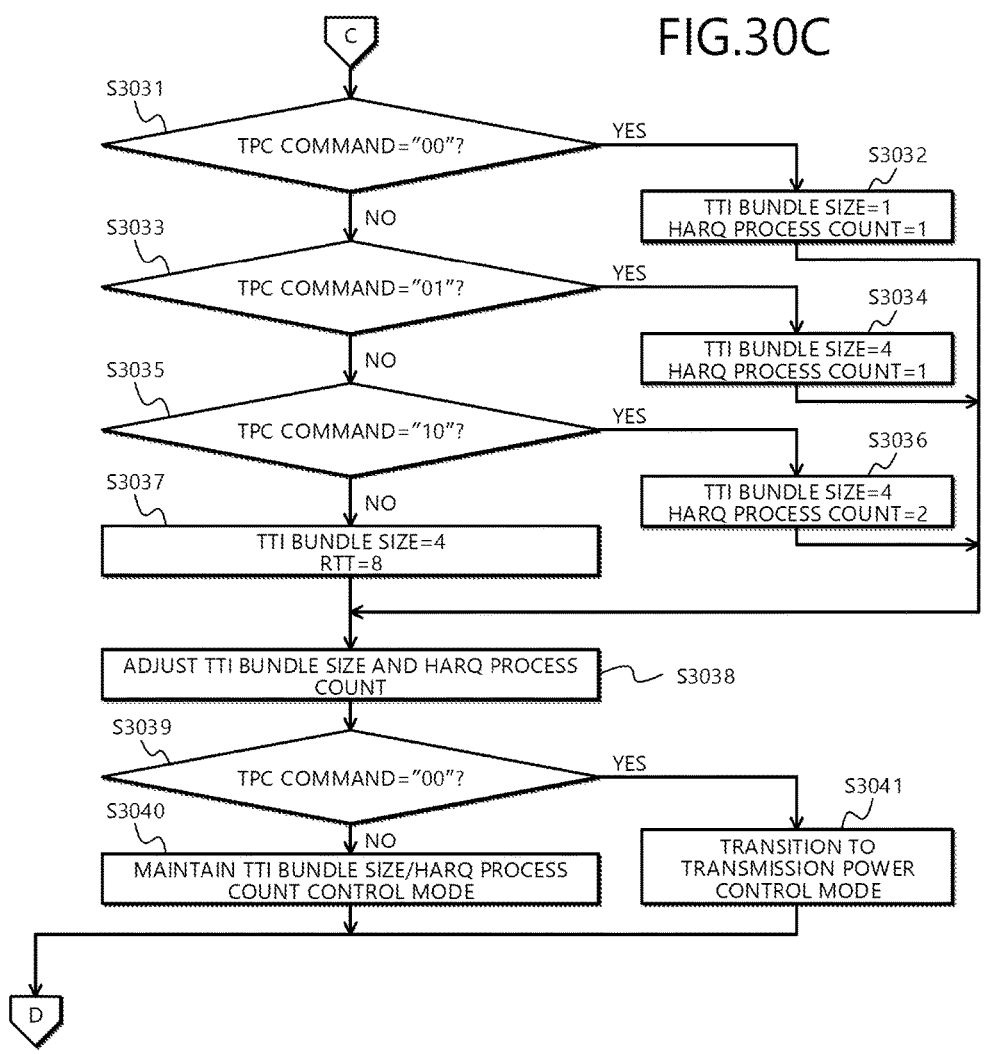
FIG. 30C is a flowchart (part 3) of an example of processing by the UE according to the fourth embodiment.

FIGS. 30A, 30B, and 30C are flowcharts of an example of processing by the UE according to the fourth embodiment. The UE 220 according to the fourth embodiment, for example, executes the steps depicted in FIGS. 30A to 30C. Steps S3001 to S3030 depicted in FIGS. 30A and 30B are identical to steps S1101 to S1130 depicted in FIGS. 11A and 11B.

However, at step S3028, the UE 220 transitions to the TTI bundle size/the HARQ process count control mode (step S3028). Further, at step S3017, the UE 220 determines whether the current mode is the TTI bundle size/the HARQ process count control mode (step S3017). If the current mode is the transmission power control mode and not the TTI bundle size/the HARQ process count control mode (step S3017: NO), the UE 220 transitions to step S3018.

At step S3017, if the current mode is the TTI bundle size/the HARQ process count control mode (step S3017: YES), the UE 220 transitions to step S3031. In other words, the UE 220 determines whether the TPC command stored in the UL grant received at step S3016 is "00" (step S3031). If the TPC command is "00" (step S3031: YES), the UE 220 determines that the TTI bundle size is 1 and the HARQ process count is 1 (step S3032), and transitions to step S3038.

At step S3031, if the TPC command is not "00" (step S3031: NO), the UE 220 determines whether the TPC command is "01" (step S3033). If the TPC command is "01" (step S3033: YES), the UE 220 determines that the TTI bundle size is 4 and the HARQ process count is 1 (step S3034), and transitions to step S3038.

At step S3033, if the TPC command is not "01" (step S3033: NO), the UE 220 determines whether the TPC command is "10" (step S3035). If the TPC command is "10" (step S3035: YES), the UE 220 determines that the TTI bundle size is 4 and the HARQ process count is 2 (step S3036), and transitions to step S3038.

At step S3035, if the TPC command is not "10" (step S3035: NO), the UE 220 determines that the TTI bundle size is 4 and the HARQ process count is 4 (step S3037), and transitions to step S3038.

The UE 220 adjusts the TTI bundle size and the HARQ process count by the TTI bundle size and the HARQ process count determined at steps S3031 to S3037 (step S3038). The UE 220 determines whether the TPC command stored in the UL grant received at step S3016 is "00" (step S3039).

At step S3039, if the TPC command is not "00" (step S3039: NO), the UE 220 maintains the TTI bundle size/the HARQ process count control mode (step S3040), and transitions to step S3029. If the TPC command is "00" (step S3039: YES), the UE 220 transitions to the transmission power control mode (step S3041), and transitions to step S3029.

In this manner, according to the fourth embodiment, a TPC command of a UL grant used in controlling the transmission power of the UE 220 may be used to give combined notification of the HARQ process count and the TTI bundle size of the UE 220. As a result, the HARQ process count and the TTI bundle size of the UE 220 may be made variable and increases in the overhead of control information accompanying notification of the TTI bundle size and the HARQ process count from the eNB 210 to the UE 220 may be suppressed.

Further, a case of combined control of the TTI bundle size and the HARQ process count using a TPC command, in the TTI bundle size/the HARQ process count control mode has been described. In this regard, configuration may be such that the HARQ process count alone (TTI bundle size is fixed) is controlled. In this case, the HARQ process count of the UE 220 may be made variable and increases in the overhead of control information accompanying notification of the HARQ process count from the eNB 210 to the UE 220 may be suppressed.

As described, according to the wireless communications system, the base station, the terminal, and the process method, a predetermined region of control information used for transmission power control of the terminal may be used to give notification of parameters related to uplink communication other than the transmission power of the terminal. As a result, the parameters may be made variable and increases in the overhead of control information accompanying notification of the parameters from the base station to the terminal may be suppressed.

For example, techniques of coverage expansion (coverage enhancements) of LTE are under consideration. For example, as Rel-11 SI, when an LTE system independently builds a network, probing of a physical channel limiting coverage characteristics is under consideration (3GPP TR36.824 V11.0.0). Further, as Rel-12 WI, coverage enhancement techniques of ULVoIP, etc. are under consideration (3GPP RP-130833).

The contents under consideration are mainly classified as Alt.1, Alt.6.1, Alt.6.2, and Alt.6.3. Alt.1 is reduction of the RTT from 16 [ms] to 12 [ms]. As a result, more retransmission packets may be synthesized within the allowed delay period, increasing gain. Alt.6.1 is changing of the TTI bundle size at a new transmission and retransmission. As a result, the TTI bundle size at a new transmission may be increased, whereby gain increases.

Alt.6.2 is use of multiple HARQ processes to transmit 1 transport block. As a result, more retransmission packets may be synthesized within the allowed delay period, increasing gain. Alt.6.3 is making the TTI bundle size variable according to a control signal. As a result, gain may be adjusted more flexibly.

For example, conventionally, the enabling and disabling of TTI bundling is switched by a control signal of an higher layer (for example, RLC layer) and therefore, changing configurations consumes time, making control that follows wireless channel quality difficult.

Therefore, conventionally, for example, in cases where the wireless channel quality improves rapidly when TTI bundling is enabled, time-frequency resources may be wasted for excess gain. On the other hand, in cases where the wireless channel quality rapidly deteriorates when TTI bundling is enabled, sufficient gain is not obtained and reception characteristics may degrade. Similarly, concerning the RTT and the HARQ process count, flexible adjustment cannot be performed corresponding to the wireless channel quality and therefore, communication cannot be performed efficiently.

In this regard, conceivably, the TTI bundle size, the RTT, the HARQ process count, etc. may be made variable. However, the overhead of control information for giving notification of the adjustment instruction from the base station to the terminal increases.

According to the embodiments described above, for example, a TPC command of a UL grant used in controlling the transmission power of the UE 220 may be used to further give notification of the TTI bundle size of the UE 22, etc. as well. As a result, the TTI bundle size of the UE 220, etc. may be made variable and increases in the overhead of control information accompanying notification of the TTI bundle size from the eNB 21 to the UE 220 may be suppressed.

Here, for example, when application of TTI bundling is necessary, the transmission power of the UE 220 has a high possibility of nearly reaching the maximum transmission power. On the other hand, when the transmission power of the UE 220 is adjusted, there is a high possibility that sufficient gain may be obtained without applying TTI bundling. Therefore, merits of concurrently performing control of the transmission power and control of TTI bundling are few.

In contrast, according to the embodiments described above, for example, one of transmission power and TTI bundle size may be fixed while the other is controlled by a TPC command. As a result, control of the transmission power and control of the TTI bundle size commonly use the TPC command, enabling increases in the overhead of control information to be suppressed.

Similarly, merits of concurrently performing control of the transmission power and control of RTT are few. In contrast, according to the embodiments described above, for example, one of transmission power and RTT may be fixed while the other is controlled by a TPC command. As a result, control of the transmission power and control of the RTT commonly use the TPC command, enabling increases in the overhead of control information to be suppressed.

Similarly, merits of concurrently performing control of the transmission power and control of the HARQ process count are few. In contrast, according to the embodiments described above, for example, one of transmission power and HARQ process count may be fixed while the other is controlled by a TPC command. As a result, control of the transmission power and control of the HARQ process count commonly use the TPC command, enabling increases in the overhead of control information to be suppressed.

Further, with the conventional techniques, for example, when a terminal is able to vary the transmission count of successive transmissions of the same data, the overhead of control information accompanying notification of the transmission count from the base station to the terminal may increase.

According to one aspect of the present invention, an effect is achieved in that increases in the overhead of control information may be suppressed.

The following notes are further disclosed concerning the embodiments above.

(Note 1) A wireless communications system comprising:
a base station configured to switch a first state of storing to a predetermined region of control information transmitted to a terminal, a value instructing a transmission power of the terminal, and a second state of storing to the predetermined region, a value instructing a transmission count of successive transmissions of a same data by the terminal; and the terminal configured to switch a third state of adjusting the transmission power based on the value of the predetermined region of the control information received from the base station in the first state, and a fourth state of adjusting the transmission count of successive transmissions of the same data by the terminal, based on the value of the predetermined region of the control information received from the base station in the second state.

(Note 2) The wireless communications system according to note 1, wherein the terminal refrains from adjusting the transmission count based on the value of the predetermined region when in the third state, and refrains from adjusting the transmission power based on the value of the predetermined region when in the fourth state.

(Note 3) The wireless communications system according to note 1 or 2, wherein the base station, when in the first state, stores to the predetermined region, a value selected from among a value instructing the transmission power and a value instructing switching to the fourth state, and the base station, when in the second state, stores to the predetermined region, a value selected from among a value instructing the transmission count and a value instructing switching to the third state, the terminal transitions to the fourth state and the base station transitions to the second state, when the base station stores to the predetermined region, the value instructing transition to the fourth state, and the terminal transitions to the third state and the base station transitions to the first state, when the base station stores to the predetermined region, the value instructing transition to the third state.

(Note 4) The wireless communications system according to note 1 or 2, wherein the terminal transmits to base station, information that corresponds to the transmission power of the terminal;

the base station switches to one of the first state and the second state, corresponding to the information that corresponds to the transmission power of the terminal, and the terminal switches to one of the third state and the fourth state, corresponding to the information that corresponds to the transmission power of the terminal.

(Note 5) The wireless communications system according to note 4, wherein the base station, when in the first state, switches to the second state, when the information that corresponds to the transmission power becomes a predetermined value, the terminal, when in the third state, switches to the fourth state, when the information that corresponds to the transmission power becomes the predetermined value, the base station, when in the second state, stores to the predetermined region, a value selected from among a value instructing the transmission count and a value instructing switching to the third state, the base station switching to the first state when the selected value is a value instructing switching to the first state, and the terminal, when in the fourth state, switches to the third state when the value of the predetermined region is the value instructing switching to the third state.

(Note 6) The wireless communications system according to note 4 or 5, wherein the information that corresponds to the transmission power of the terminal is information indicating a difference of the transmission power of the terminal and a maximum transmission power of the terminal.

(Note 7) The wireless communications system according to any one of notes 1 to 6, wherein the terminal adjusts the transmission count concerning a new transmission among the new transmission and retransmission of data.

(Note 8) The wireless communications system according to any one of notes 1 to 6, wherein the base station, when in the second state, stores to the predetermined region, a value indicating a combination of the transmission count and a period from when the terminal transmits data until the terminal retransmits the data, and the terminal, when in the fourth state, adjusts based on the value of the predetermined region, the combination of the transmission count and the period from when the terminal transmits data until the terminal retransmits the data.

(Note 9) The wireless communications system according to any one of notes 1 to 7, wherein the base station, when in the second state, stores to the predetermined region, a value indicating a combination of the transmission count and a process count of performing for a same data, a process of successively transmitting the same data by the terminal, and the terminal, when in the fourth state, adjusts based on the value of the predetermined region, the combination of the transmission count and the process count of performing for the same data, the process of successively transmitting the same data by the terminal.

(Note 10) The wireless communications system according to note 9, wherein the process is a process of hybrid automatic repeat request (HARQ).

(Note 11) The wireless communications system according to any one of notes 1 to 10, wherein the control information is information indicating a radio resource assigned by the base station to a transmission of a wireless signal from the terminal to the base station.

(Note 12) The wireless communications system according to any one of notes 1 to 11, wherein the transmission count of successive transmissions of the same data is a transmission time interval (TTI) bundle size in TTI bundling.

(Note 13) A base station comprising:

a transmitting circuit configured to transmit control information to a terminal; and a control circuit configured to switch a first state of storing to a predetermined region of the control information transmitted by the transmitting circuit, a value instructing a transmission power of the terminal, and a second state of storing to the predetermined region, a value instructing a transmission count of successive transmissions of a same data by the terminal.

(Note 14) A terminal comprising:

a receiving circuit configured to receive control information from a base station configured to switch a first state of storing to a predetermined region of the control information transmitted to the terminal, a value instructing a transmission power of the terminal, and a second state of storing to the predetermined region, a value instructing a transmission count of successive transmissions of a same data by the terminal; and a control circuit configured to switch a third state of adjusting the transmission power based on the value of the predetermined region of the control information received from the base station in the first state by the receiving circuit, and a fourth state of adjusting the transmission count of successive transmissions of the same data by the terminal, based on the value of the predetermined region of the control information received from the base station in the second state by the receiving circuit.

(Note 15) A process method at a base station, the method comprising:

transmitting control information to a terminal; and switching a first state of storing to a predetermined region of the transmitted control information, a value instructing a transmission power of the terminal, and a second state of storing to the predetermined region, a value instructing a transmission count of successive transmissions of a same data by the terminal.

(Note 16) A process method at a terminal, the method comprising:

receiving control information from a base station configured to switch a first state of storing to a predetermined region of the control information transmitted to the terminal, a value instructing a transmission power of the terminal, and a second state of storing to the predetermined region, a value instructing a transmission count of successive transmissions of a same data by the terminal; and switching a third state of adjusting the transmission power based on the value of the predetermined region of the control information received from the base station in the first state, and a fourth state of adjusting the transmission count of successive transmissions of the same data by the terminal, based on the value of the predetermined region of the control information received from the base station in the second state.

(Note 17) A wireless communications system comprising:

a base station configured to switch a first state of storing to a predetermined region of control information transmitted to a terminal, a value instructing a transmission power of the terminal, and a second state of storing to the predetermined region a value instructing a period from when the terminal transmits data until the terminal retransmits the data; and the terminal configured to switch a third state of adjusting the transmission power based on the value of the predetermined region of the control information received from the base station in the first state, and a fourth state of adjusting the period from when the terminal transmits data until the terminal retransmits the data, based on the value of the predetermined region of the control information received from the base station in the second state.

(Note 18) A wireless communications system comprising:

a base station configured to switch a first state of storing to a predetermined region of control information transmitted to a terminal, a value instructing a transmission power of the terminal, and a second state of storing to the predetermined region, a value instructing a process count of performing for a same data, a process of successively transmitting the same data by the terminal; and the terminal configured to switch a third state of adjusting the transmission power based on the value of the predetermined region of the control information received from the base station in the first state, and a fourth state of adjusting the process count of performing for a same data, a process of successively transmitting the same data by the terminal.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A wireless communications system comprising:
    a base station configured to switch a first state of storing to control information transmitted to a terminal, a value instructing a transmission power of the terminal, and a second state of storing to the control information, a value instructing a transmission count of multiple transmissions of a same data by the terminal; and
    the terminal configured to switch a third state of adjusting the transmission power based on the value stored to the control information received from the base station in the first state, and a fourth state of adjusting the transmission count of multiple transmissions of the same data by the terminal, based on the value stored to the control information received from the base station in the second state.

2. The wireless communications system according to claim 1, wherein
    the control information includes a predetermined region storing the value instructing the transmission power of the terminal, in the first state, and a predetermined region storing the value instructing the transmission count of multiple transmissions of the same data by the terminal.

3. The wireless communications system according to claim 1, wherein the terminal refrains from adjusting the transmission power when in the fourth state.

4. The wireless communications system according to claim 1, wherein
    the base station, when in the first state, stores to the control information, a value selected from among a value instructing the transmission power and a value instructing switching to the fourth state, and the base station, when in the second state, stores to the control information, a value selected from among a value instructing the transmission count and a value instructing switching to the third state,
    the terminal transitions to the fourth state and the base station transitions to the second state, when the base station stores to the control information, the value instructing transition to the fourth state, and
    the terminal transitions to the third state and the base station transitions to the first state, when the base station stores to the control information, the value instructing transition to the third state.

5. The wireless communications system according to claim 1, wherein
    the terminal transmits to base station, information that corresponds to the transmission power of the terminal;
    the base station switches to one of the first state and the second state, corresponding to the information that corresponds to the transmission power of the terminal, and the terminal switches to one of the third state and the fourth state, corresponding to the information that corresponds to the transmission power of the terminal.

6. The wireless communications system according to claim 5, wherein
    the base station, when in the first state, switches to the second state, when the information that corresponds to the transmission power becomes a predetermined value,
    the terminal, when in the third state, switches to the fourth state, when the information that corresponds to the transmission power becomes the predetermined value,
    the base station, when in the second state, stores to the control information, a value selected from among a value instructing the transmission count and a value instructing switching to the third state, the base station switching to the first state when the selected value is a value instructing switching to the first state, and
    the terminal, when in the fourth state, switches to the third state when the value stored to the control information is the value instructing switching to the third state.

7. The wireless communications system according to claim 5, wherein the information that corresponds to the transmission power of the terminal is information indicating a difference of the transmission power of the terminal and a maximum transmission power of the terminal.

8. The wireless communications system according to claim 1, wherein the terminal adjusts the transmission count concerning a new transmission among the new transmission and retransmission of data.

9. The wireless communications system according to claim 1, wherein
    the base station, when in the second state, stores to the control information, a value indicating a combination of the transmission count and a period from when the terminal transmits data until retransmission of the data, and
    the terminal, when in the fourth state, adjusts based on the value stored to the control information, the combination of the transmission count and the period from when the terminal transmits data until retransmission of the data.

10. The wireless communications system according to claim 1, wherein
    the base station, when in the second state, stores to the control information, a value indicating a combination of the transmission count and a process count of performing for a same data, a process of transmitting the same data multiple times, and
    the terminal, when in the fourth state, adjusts based on the value of the predetermined region, the combination of the transmission count and the process count of performing for the same data, the process of transmitting the same data multiple times by the terminal.

11. The wireless communications system according to claim 10, wherein the process is a process of hybrid automatic repeat request (HARQ).

12. The wireless communications system according to claim 1, wherein the control information is information indicating a radio resource assigned by the base station to a transmission of a wireless signal from the terminal to the base station.

13. The wireless communications system according to claim 1, wherein the transmission count of multiple transmissions of the same data is a transmission time interval (TTI) bundle size in TTI bundling.

14. A base station comprising:
a transmitting circuit configured to transmit control information to a terminal; and
a control circuit configured to switch a first state of storing to a predetermined region of the control information transmitted by the transmitting circuit, a value instructing a transmission power of the terminal, and a second state of storing to the predetermined region of the control information, a value instructing a transmission count of multiple transmissions of a same data by the terminal.

15. A terminal comprising:
a receiving circuit configured to receive control information from a base station configured to switch a first state of storing to the control information transmitted to the terminal, a value instructing a transmission power of the terminal, and a second state of storing to the control information, a value instructing a transmission count of multiple transmissions of a same data by the terminal; and
a control circuit configured to switch a third state of adjusting the transmission power based on the value stored to the control information received from the base station in the first state by the receiving circuit, and a fourth state of adjusting the transmission count of multiple transmissions of the same data by the terminal, based on the value stored to the control information received from the base station in the second state by the receiving circuit.

16. The terminal according to claim 15, wherein the control information includes a predetermined region storing the value instructing the transmission power of the terminal, in the first state, and a predetermined region storing the value instructing the transmission count of multiple transmissions of the same data by the terminal.

17. A process method at a base station, the method comprising:
transmitting control information to a terminal; and
switching a first state of storing to a predetermined region of the transmitted control information, a value instructing a transmission power of the terminal, and a second state of storing to the predetermined region of the control information, a value instructing a transmission count of multiple transmissions of a same data by the terminal.

18. A process method at a terminal, the method comprising:
receiving control information from a base station configured to switch a first state of storing to the control information transmitted to the terminal, a value instructing a transmission power of the terminal, and a second state of storing to the control information, a value instructing a transmission count of multiple transmissions of a same data by the terminal; and
switching a third state of adjusting the transmission power based on the value stored to the control information received from the base station in the first state, and a fourth state of adjusting the transmission count of multiple transmissions of the same data by the terminal, based on the value stored to the control information received from the base station in the second state.

19. A wireless communications system comprising:
a base station configured to switch a first state of storing to control information transmitted to a terminal, a value instructing a transmission power of the terminal, and a second state of storing to the control information a value instructing a period from when the terminal transmits data until retransmission of the data; and
the terminal configured to switch a third state of adjusting the transmission power based on the value stored to the control information received from the base station in the first state, and a fourth state of adjusting the period from when the terminal transmits data until retransmission of the data, based on the value stored to the control information received from the base station in the second state.

20. A wireless communications system comprising:
a base station configured to switch a first state of storing to control information transmitted to a terminal, a value instructing a transmission power of the terminal, and a second state of storing to the control information, a value instructing a process count of performing for a same data, a process of transmitting the same data multiple times by the terminal; and
the terminal configured to switch a third state of adjusting the transmission power based on the value stored to the control information received from the base station in the first state, and a fourth state of adjusting the process count of performing for a same data, a process of transmitting the same data multiple times by the terminal.

* * * * *